US008521569B1

(12) United States Patent
Bent et al.

(10) Patent No.: US 8,521,569 B1
(45) Date of Patent: *Aug. 27, 2013

(54) METHOD AND SYSTEM FOR ALLOCATING FUNDS OVER A PLURALITY OF TIME DEPOSIT INSTRUMENTS IN DEPOSITORY INSTITUTIONS

(71) Applicant: Island Intellectual Property LLC, Manhasset, NY (US)

(72) Inventors: Bruce Bent, Manhasset, NY (US); Bruce Bent, II, Manhasset, NY (US); Rebecca Gareis Bent, Manhasset, NY (US); David Edgar Gareis, Carlsbad, CA (US)

(73) Assignee: Island Intellectual Property LLC, Manhasset, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,631

(22) Filed: Jan. 7, 2013

Related U.S. Application Data

(63) Continuation of application No. 12/953,221, filed on Nov. 23, 2010, now Pat. No. 8,370,236.

(60) Provisional application No. 61/264,077, filed on Nov. 24, 2009.

(51) Int. Cl.
*G06Q 40/00* (2012.01)
*G06Q 40/08* (2012.01)
*G06Q 40/06* (2012.01)
*G06Q 20/00* (2012.01)

(52) U.S. Cl.
CPC .............. *G06Q 40/00* (2013.01); *G06Q 40/08* (2013.01); *G06Q 40/06* (2013.01); *G06Q 20/00* (2013.01)
USPC .................................. 705/4; 705/35; 705/39

(58) Field of Classification Search
CPC ....... G06Q 40/00; G06Q 40/08; G06Q 40/06; G06Q 20/10
USPC .................................. 705/4, 35, 39
See application file for complete search history.

(56) References Cited

U.S. PATENT DOCUMENTS 4,232,367 A * 11/1980 Youden et al. .................. 705/38
4,346,442 A    8/1982 Musmanno
(Continued)

FOREIGN PATENT DOCUMENTS

JP        10-0495590 A    2/1998
WO       WO-95/23379 A1   8/1995
(Continued)

OTHER PUBLICATIONS

Wenninger, J., & Partlan, J. (1992). Small time deposits and the recent weakness in M2. Federal Reserve Bank of New York Quarterly Review, 17(1), 21-21. Retrieved Apr. 4, 2013.*

(Continued)

*Primary Examiner* — Kito R Robinson
(74) *Attorney, Agent, or Firm* — Foley & Lardner LLP

(57) ABSTRACT

A method, system and program product, the method in one embodiment comprising: A method, comprising: accessing databases comprising: client information for each of a plurality of respective clients, comprising a balance of funds of the client; a distribution percent value, $X_i$, for tranches; information for each of multiple government backed-insured aggregated time deposit instruments holding a tranche of client funds, comprising: a rate; an identification of the depository institution; a term; and determining a given client available distribution amount, $D_i$; determining an amount of a client tranche to be deposited in each of $N_i$ depository institutions based at least in part on the percentage, $X_i$, in order that the client tranches are approximately equal and are insured; determining $N_i$ depository institutions to distribute the client tranches; allocating substantially equally respective client tranches to the $N_i$ depository institutions; generating data for instructions to transfer the respective client tranches; updating, the databases.

30 Claims, 6 Drawing Sheets

(56) References Cited

U.S. PATENT DOCUMENTS

| | | |
|---|---|---|
| 4,376,978 A | 3/1983 | Musmanno |
| 4,597,046 A | 6/1986 | Musmanno et al. |
| 4,674,044 A | 6/1987 | Kalmus et al. |
| 4,694,397 A | 9/1987 | Grant et al. |
| 4,700,297 A | 10/1987 | Hagel et al. |
| 4,751,640 A | 6/1988 | Lucas et al. |
| 4,953,085 A | 8/1990 | Atkins |
| 4,985,833 A | 1/1991 | Oncken |
| 5,126,936 A | 6/1992 | Champion et al. |
| 5,206,803 A | 4/1993 | Vitagliano et al. |
| 5,220,501 A | 6/1993 | Lawlor et al. |
| 5,235,507 A | 8/1993 | Sackler et al. |
| 5,262,942 A | 11/1993 | Earle |
| 5,270,922 A | 12/1993 | Higgins |
| 5,291,398 A * | 3/1994 | Hagan ............................. 705/4 |
| 5,297,032 A | 3/1994 | Trojan et al. |
| 5,644,727 A | 7/1997 | Atkins |
| 5,649,116 A | 7/1997 | McCoy et al. |
| 5,671,363 A | 9/1997 | Cristofich et al. |
| 5,689,650 A | 11/1997 | McClelland et al. |
| 5,710,889 A | 1/1998 | Clark et al. |
| 5,765,144 A | 6/1998 | Larche et al. |
| 5,774,880 A | 6/1998 | Ginsberg |
| 5,781,654 A | 7/1998 | Carney |
| 5,802,499 A | 9/1998 | Sampson et al. |
| 5,806,048 A | 9/1998 | Kiron et al. |
| 5,806,049 A | 9/1998 | Petruzzi |
| 5,812,987 A | 9/1998 | Luskin et al. |
| 5,826,243 A | 10/1998 | Musmanno et al. |
| 5,848,400 A | 12/1998 | Chang |
| 5,852,811 A | 12/1998 | Atkins |
| 5,864,685 A | 1/1999 | Hagan |
| 5,875,437 A | 2/1999 | Atkins |
| 5,878,258 A | 3/1999 | Pizi et al. |
| 5,878,405 A | 3/1999 | Grant et al. |
| 5,884,285 A | 3/1999 | Atkins |
| 5,890,141 A | 3/1999 | Carney et al. |
| 5,893,078 A | 4/1999 | Paulson |
| 5,903,881 A | 5/1999 | Schrader et al. |
| 5,905,974 A | 5/1999 | Fraser et al. |
| 5,940,809 A | 8/1999 | Musmanno et al. |
| 5,941,996 A | 8/1999 | Smith et al. |
| 5,946,667 A | 8/1999 | Tull et al. |
| 5,950,175 A | 9/1999 | Austin |
| 5,974,390 A | 10/1999 | Ross |
| 5,978,779 A | 11/1999 | Stein et al. |
| 6,014,642 A | 1/2000 | El-Kadi et al. |
| 6,016,482 A | 1/2000 | Molinari et al. |
| 6,026,438 A | 2/2000 | Piazza et al. |
| 6,032,133 A | 2/2000 | Hilt et al. |
| 6,044,371 A | 3/2000 | Person et al. |
| 6,047,324 A | 4/2000 | Ford et al. |
| 6,049,782 A * | 4/2000 | Gottesman et al. ......... 705/36 R |
| 6,052,673 A | 4/2000 | Leon et al. |
| 6,088,685 A | 7/2000 | Kiron et al. |
| 6,092,056 A | 7/2000 | Tull et al. |
| 6,105,005 A | 8/2000 | Fuhrer |
| 6,108,641 A | 8/2000 | Kenna et al. |
| 6,119,093 A | 9/2000 | Walker et al. |
| 6,131,810 A | 10/2000 | Weiss et al. |
| 6,154,770 A | 11/2000 | Kostakos |
| 6,192,347 B1 | 2/2001 | Graff |
| 6,226,623 B1 | 5/2001 | Schein et al. |
| 6,317,783 B1 | 11/2001 | Freishtat et al. |
| 6,324,523 B1 | 11/2001 | Killeen et al. |
| 6,363,360 B1 | 3/2002 | Madden |
| 6,374,231 B1 | 4/2002 | Bent et al. |
| 6,408,336 B1 | 6/2002 | Schneider et al. |
| 6,513,020 B1 | 1/2003 | Weiss et al. |
| 6,970,843 B1 | 11/2005 | Forte |
| 7,089,202 B1 | 8/2006 | McNamar et al. |
| 7,124,101 B1 | 10/2006 | Mikurak |
| 7,133,840 B1 | 11/2006 | Kenna et al. |
| 7,203,845 B2 | 4/2007 | Sokolic et al. |
| 7,321,874 B2 | 1/2008 | Dilip et al. |
| 7,321,875 B2 | 1/2008 | Dilip et al. |
| 7,328,179 B2 | 2/2008 | Sheehan et al. |
| 7,376,606 B2 | 5/2008 | Jacobsen |
| 7,383,223 B1 | 6/2008 | Dilip et al. |
| 7,383,227 B2 | 6/2008 | Weinflash et al. |
| 7,392,222 B1 | 6/2008 | Hamilton et al. |
| 7,401,037 B2 | 7/2008 | Arena et al. |
| 7,440,914 B2 | 10/2008 | Jacobsen |
| 7,505,937 B2 | 3/2009 | Dilip et al. |
| 7,509,286 B1 | 3/2009 | Bent et al. |
| 7,519,551 B2 | 4/2009 | Bent et al. |
| 7,529,709 B2 | 5/2009 | Volchek et al. |
| 7,536,340 B2 | 5/2009 | Dheer et al. |
| 7,536,350 B1 * | 5/2009 | Bent et al. ........................ 705/39 |
| 7,596,522 B1 | 9/2009 | Jacobsen |
| 7,603,307 B2 | 10/2009 | Jacobsen |
| 7,640,199 B1 | 12/2009 | Hyland |
| 7,657,761 B2 | 2/2010 | Sokolic et al. |
| 7,668,771 B1 | 2/2010 | Bent et al. |
| 7,668,772 B1 | 2/2010 | Bent et al. |
| 7,672,886 B2 | 3/2010 | Bent et al. |
| 7,672,901 B1 | 3/2010 | Bent et al. |
| 7,672,902 B1 | 3/2010 | Bent et al. |
| 7,680,716 B1 | 3/2010 | Bent et al. |
| 7,680,734 B1 | 3/2010 | Bent et al. |
| 7,716,131 B2 | 5/2010 | Bent et al. |
| 7,720,755 B1 | 5/2010 | Coyle |
| 7,729,987 B1 | 6/2010 | Wakim et al. |
| 7,752,107 B1 | 7/2010 | Bent et al. |
| 7,752,129 B2 | 7/2010 | Bent et al. |
| 7,756,767 B2 | 7/2010 | Cluse et al. |
| 7,769,688 B1 | 8/2010 | Bent et al. |
| 7,788,235 B1 | 8/2010 | Yeo |
| 7,797,207 B1 | 9/2010 | Dilip et al. |
| 7,809,640 B1 | 10/2010 | Bent et al. |
| 7,814,017 B2 | 10/2010 | Vancini et al. |
| 7,837,100 B2 | 11/2010 | Bonalle et al. |
| 7,860,771 B2 | 12/2010 | Colvin |
| 7,873,571 B1 | 1/2011 | Wehmer |
| 7,873,573 B2 | 1/2011 | Realini |
| 7,873,677 B2 | 1/2011 | Messing et al. |
| 7,886,969 B2 | 2/2011 | Antoo et al. |
| 7,895,098 B2 | 2/2011 | Beard |
| 7,895,099 B2 | 2/2011 | Whiting et al. |
| 7,899,743 B2 | 3/2011 | Jacobsen |
| 7,899,745 B1 | 3/2011 | Jacobsen |
| 7,899,746 B1 | 3/2011 | Jacobsen |
| 7,899,747 B1 | 3/2011 | Jacobsen |
| 7,904,372 B2 | 3/2011 | Whiting et al. |
| 7,917,433 B2 | 3/2011 | Jacobsen |
| 7,921,057 B1 | 4/2011 | Jacobsen |
| 7,933,821 B1 | 4/2011 | Bent et al. |
| 7,945,511 B2 | 5/2011 | O'Brien et al. |
| 7,996,308 B1 | 8/2011 | Bent et al. |
| 8,015,085 B2 | 9/2011 | Blagg et al. |
| 8,019,667 B1 | 9/2011 | Bent et al. |
| 8,019,668 B1 | 9/2011 | Bent et al. |
| 8,032,456 B1 | 10/2011 | Bent et al. |
| 8,036,986 B2 | 10/2011 | Jacobsen |
| 8,051,004 B2 | 11/2011 | Jacobsen |
| 8,051,005 B2 | 11/2011 | Jacobsen |
| 8,086,508 B2 | 12/2011 | Dheer et al. |
| 8,090,651 B2 | 1/2012 | Winslow et al. |
| 8,103,582 B1 | 1/2012 | Zettner |
| RE43,246 E | 3/2012 | Bent et al. |
| 8,150,766 B1 | 4/2012 | Bent et al. |
| 8,191,156 B2 | 5/2012 | Kubo |
| 8,239,321 B1 | 8/2012 | Bent et al. |
| 8,260,697 B1 | 9/2012 | Bent et al. |
| 8,260,705 B1 | 9/2012 | Bent et al. |
| 8,290,859 B1 | 10/2012 | Bent et al. |
| 8,290,860 B1 | 10/2012 | Bent et al. |
| 8,290,861 B1 | 10/2012 | Bent et al. |
| 8,311,916 B1 | 11/2012 | Bent et al. |
| 8,311,939 B1 | 11/2012 | Bent et al. |
| 8,352,342 B1 | 1/2013 | Bent et al. |
| 8,355,985 B1 | 1/2013 | Bent et al. |
| 8,359,267 B1 | 1/2013 | Bent et al. |
| 8,370,236 B1 | 2/2013 | Bent |

| | | |
|---|---|---|
| 8,380,621 B1 | 2/2013 | Bent et al. |
| 8,401,962 B1 | 3/2013 | Bent |
| 2001/0023414 A1 | 9/2001 | Kumar et al. |
| 2002/0046144 A1 | 4/2002 | Graff |
| 2002/0069147 A1 | 6/2002 | Sheehan et al. |
| 2002/0082981 A1 | 6/2002 | Madden |
| 2002/0087454 A1 | 7/2002 | Calo et al. |
| 2002/0091637 A1 | 7/2002 | Bent |
| 2002/0095592 A1 | 7/2002 | Daniell et al. |
| 2002/0128951 A1 | 9/2002 | Kiron et al. |
| 2002/0174048 A1 | 11/2002 | Dheer et al. |
| 2002/0194099 A1 | 12/2002 | Weiss |
| 2003/0023529 A1 | 1/2003 | Jacobsen |
| 2003/0041003 A1 | 2/2003 | Kayser, III |
| 2003/0080185 A1 | 5/2003 | Werther |
| 2003/0135437 A1 | 7/2003 | Jacobsen |
| 2003/0163403 A1 | 8/2003 | Chen et al. |
| 2003/0200174 A1 | 10/2003 | Star |
| 2003/0208438 A1 | 11/2003 | Rothman |
| 2004/0138974 A1 | 7/2004 | Shimamura et al. |
| 2004/0153398 A1 | 8/2004 | Baumgartner et al. |
| 2004/0177036 A1 | 9/2004 | Nutahara et al. |
| 2004/0249741 A1 | 12/2004 | Understein |
| 2005/0108149 A1 | 5/2005 | Bent et al. |
| 2005/0228733 A1 | 10/2005 | Bent et al. |
| 2006/0004655 A1 | 1/2006 | Alexander et al. |
| 2006/0047593 A1 | 3/2006 | Naratil et al. |
| 2006/0212385 A2 | 9/2006 | Bent et al. |
| 2006/0212389 A2 | 9/2006 | Bent et al. |
| 2006/0213980 A1 | 9/2006 | Geller et al. |
| 2007/0083938 A1 | 4/2007 | Aoki et al. |
| 2007/0118449 A1 | 5/2007 | De La Motte et al. |
| 2007/0130065 A1 | 6/2007 | Staab et al. |
| 2007/0143196 A1 | 6/2007 | Colvin |
| 2007/0255655 A1 | 11/2007 | Kemper et al. |
| 2007/0271174 A2 | 11/2007 | Bent et al. |
| 2008/0065532 A1 | 3/2008 | De La Motte |
| 2008/0077996 A1 | 3/2008 | Kubo |
| 2008/0120228 A1 | 5/2008 | Bent et al. |
| 2008/0133396 A1 | 6/2008 | De La Motte |
| 2008/0195534 A1 | 8/2008 | Landis et al. |
| 2008/0222053 A1 | 9/2008 | Jacobsen |
| 2008/0288398 A1 | 11/2008 | Maricondi |
| 2009/0006985 A1 | 1/2009 | Fong et al. |
| 2009/0012899 A1 | 1/2009 | Friesen |
| 2009/0024496 A1 | 1/2009 | Balachandran et al. |
| 2009/0138412 A1 | 5/2009 | Jacobsen |
| 2009/0241197 A1 | 9/2009 | Troyansky |
| 2009/0327154 A1 | 12/2009 | Van Vooren et al. |
| 2010/0268668 A1 | 10/2010 | Burdette |
| 2010/0274687 A1 | 10/2010 | Ghosh et al. |
| 2010/0274718 A1 | 10/2010 | Ghosh et al. |
| 2011/0106703 A1 | 5/2011 | Jay et al. |
| 2011/0208640 A1 | 8/2011 | Geoghegan et al. |
| 2011/0246359 A1 | 10/2011 | O'Brien et al. |
| 2011/0270720 A1 | 11/2011 | Manohar |
| 2011/0276473 A1 | 11/2011 | Blok |

FOREIGN PATENT DOCUMENTS

| | | | |
|---|---|---|---|
| WO | WO-02/42952 A1 | | 5/2002 |
| WO | WO-03/012580 A2 | | 2/2003 |

OTHER PUBLICATIONS

U.S. Appl. No. 12/453,387, filed May 8, 2009, Bruce Bent.
U.S. Appl. No. 12/453,388, filed May 8, 2009, Bruce Bent.
U.S. Appl. No. 12/622,979, filed Nov. 20, 2009, Bruce Bent.
U.S. Appl. No. 12/638,544, filed Dec. 15, 2009, Bruce Bent.
U.S. Appl. No. 12/794,448, filed Jun. 4, 2010, Bruce Bent.
U.S. Appl. No. 13/032,456, filed Feb. 22, 2011, David Edgar Gareis.
U.S. Appl. No. 13/032,467, filed Feb. 22, 2011, Thomas O'Donnell.
U.S. Appl. No. 13/228,031, filed Sep. 8, 2011, Thomas O'Donnell.
U.S. Appl. No. 13/237,699, filed Sep. 20, 2011, Bruce Bent.
U.S. Appl. No. 13/248,647, filed Sep. 29, 2011, Bruce Bent.
U.S. Appl. No. 13/529,540, filed Jun. 21, 2012, Bruce Bent.
U.S. Appl. No. 13/562,961, filed Jul. 31, 2012, Bruce Bent.
U.S. Appl. No. 13/591,793, filed Aug. 22, 2012, Bruce Bent.
U.S. Appl. No. 13/591,818, filed Aug. 22, 2012, Bruce Bent.
U.S. Appl. No. 13/650,927, filed Oct. 12, 2012, David Edgar Gareis.
U.S. Appl. No. 13/651,932, filed Oct. 15, 2012, Bruce Bent.
U.S. Appl. No. 13/710,999, filed Dec. 11, 2012, Bruce Bent, II.
U.S. Appl. No. 13/715,370, filed Dec. 14, 2012, Bruce Bent.
U.S. Appl. No. 13/733,645, filed Jan. 3, 2013, Bent.
U.S. Appl. No. 13/735,631, filed Jan. 7, 2013, Bent.
U.S. Appl. No. 13/736,515, filed Jan. 8, 2013, Bent.
U.S. Appl. No. 13/759,434, filed Feb. 5, 2013, Bent.
U.S. Appl. No. 13/801,501, filed Mar. 13, 2013, Bent.
U.S. Appl. No. 13/801,874, filed Mar. 13, 2013, Bent.
U.S. Appl. No. 13/828,468, filed Mar. 14, 2013, Gareis.
U.S. Appl. No. 13/828,929, filed Mar. 14, 2013, Gareis.
U.S. Appl. No. 13/829,309, filed Mar. 14, 2013, O'Donnell.
U.S. Appl. No. 13/829,747, filed Mar. 14, 2013, O'Donnell.
U.S. Appl. No. 13/829,974, filed Mar. 14, 2013, Bent.
U.S. Appl. No. 13/830,143, filed Mar. 14, 2013, Bent.
U.S. Appl. No. 13/839,890, filed Mar. 15, 2013, Bent.
U.S. Appl. No. 13/840,685, filed Mar. 15, 2013, Bent.
U.S. Appl. No. 13/841,778, filed Mar. 15, 2013, Bent.
U.S. Appl. No. 13/842,360, filed Mar. 15, 2013, Bent.
U.S. Appl. No. 13/842,630, filed Mar. 15, 2013, Bent.
Cynamon et al ; Redefining the Monetary Aggregates: A Clean Sweep; Eastern Economic Journal, vol. 32, No. 4, Fall 2006; pp. 661-672.
Hencke, Christopher; New Rules for FDIC Deposit Insurance; ABA Bank Compliance, Jul./Aug. 1999, 20,7; pp. 31-37.
U.S. Appl. No. 12/794,448, filed Jun. 4, 2010, Bruce Bent et al.
U.S. Appl. No. 12/829,961, filed Jul. 2, 2010, Bruce Bent et al.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
"Man Bites Dog: Funds Move Into Banking," IBC's Money Fund Selector, 2 Sheets, Nov. 6, 1998.
"Reverse Ups Insurance Limit on Money Market Account," Thomson Financial Inc., Mutual Fund Market News, 1 Sheet, Aug. 26, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
12 CFR Part 329—Interest on Deposit, Source: 51 FR 10808, Mar. 31, 1986, 5 Sheets.
AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006 pp. 1-3.
AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.
AB 2011 Assembly Bill—Chaptered, http://www.leginfo.ca.gov/pub/bill/asm/ab_2001-2050/ab_2011_bill_20060925_chaptered.html, 2006, pp. 1-3.
AB 2011 Assembly Bill—Enrolled, http://www.leginfo.ca.gov/pub/bill/asm/ab_2001-2050/ab_2011_bill_20060816_enrolled.html, 2006, pp. 1-3.
AB 2011 Assembly Bill—History, Complete Bill History, http://www.leginfo.ca.gov/pub/bill/asm/ab_2001-2050/ab_2011_bill_20060925_history.html, 2006, p. 1.
About iMoneyNet, Inc., About iMoneyNet's Money Funds Division, 4 Sheets, Aug. 21, 2003, http://www.ibcdata.com/about.htm.
Adler, Joe, "Promontory to Roll Out Deposit Service Insuring Liquid Funds", American Banker, Feb. 22, 2010, 1 sheet.
An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.

Bank Deposit Program, Online http://web.archive.org/web/20030620100115/http:/www.smithbarney.com/products_servi, Jan. 19, 2001, 4 Sheets.
Bent, "Bruce Bent Makes Money Market Funds Act Like Bank Accounts," Equity BBDP, Oct. 5, 1998, 3 Sheets.
Blackwell, "ABA to Approve System for Sharing Deposit Coverage," American Banker, 2 Sheets, Feb. 11, 2003.
Blackwell, "New Pitch: Deposit Insurance Sharing," American Banker Online, 4 Sheets, Jan. 21, 2003.
Board of Governors of the Federal Reserve System, 1984 Fed. Res. Interp. Ltr. LEXIS 56, Nov. 16, 1984, 3 Sheets.
Board of Governors of the Federal Reserve System, 1988 Fed. Res. Interp. Ltr. LEXIS 141, Jun. 22, 1988, 3 Sheets.
Board of Governors of the Federal Reserve System, 1989 Fed. Res. Interp. Ltr. LEXIS 154, Jun. 21, 1989, 2 Sheets.
Board of Governors of the Federal Reserve System, 1989 Fed. Res. Interp. Ltr. LEXIS 77, Mar. 14, 1989, 2 Sheets.
Board of Governors of the Federal Reserve System, 1990 Fed. Res. Interp. Ltr. LEXIS 94, Feb. 1, 1990, 1 Sheet.
Board of Governors of the Federal Reserve System, 1991 Fed. Res. Interp. Ltr. LEXIS 232, Jan. 30, 1991, 2 Sheets.
Board of Governors of the Federal Reserve System, 1994 Fed. Res. Interp. Ltr. LEXIS 156, Jun. 24, 1994, 3 Sheets.
Board of Governors of the Federal Reserve System, 1994 Fed. Res. Interp. Ltr. LEXIS 314, Oct. 17, 1994, 2 Sheets.
Board of Governors of the Federal Reserve System, 1994 Fed. Res. Interp. Ltr. LEXIS 419, Oct. 14, 1994, 4 Sheets.
Britt, "Struggling with Sweep Accounts," America's Community Banker, vol. 6, No. 12, 11 Sheets, Dec. 1, 1997.
California Independent Bankers, ICBA Independent Community Bankers of America, Banker Bulletin, 2006, CIB 16th Annual Convention, vol. 4, issue 6, http://www.cib.org/banker_bulletin.htm.
Capital Briefs: Corporate Checking Account Relief Sought, American Banker, vol. 162, Jul. 28, 1997, 1 Sheet.
Certificate of Deposit Registry Service: Keeping Deposits in the Corn Patch, Banknews, 2 Sheets. Mar. 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Chapelle, "Merrill's Rivals Say They, Too. Offer Services Beyond Banking," Securities Data Publishing on Wall Street, 2 Sheets, Feb. 1, 2003.
CMA, Insured Savings Account Fact Sheet, Merrill Lynch, Pierce, Fenner & Smith Incorporated, 1997, pp. 49-57.
CMA, Insured Savings Account Fact Sheet, Merrill Lynch, Pierce, Fenner & Smith Incorporated, Jul. 1994, pp. 47-54.
CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
CMA, The Merrill Lynch Cash Management Account Financial Service, Merrill Lynch, Pierce, Fenner & Smith Incorporated, Jan. 1997, 35 Sheets.
Litigation Notice After Payment of Issue Fee filed in Parent U.S. Appl. No. 10/382,946, Apr. 3, 2009, 160 pages.
Coyle, "A Look at commercial Demand Deposit Options," America's Community Banker, vol. 9, Issue 2, Bell & Howell Information and Learning Company, 9 Sheets, Feb. 1, 2000.
Crockett, "Big Banks Found Stepping Up Marketing of 'Sweep' Accounts," American Banker, vol. 159, No. 198, American Banker Inc., 3 Sheets, Oct. 13, 1994.
Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.

Declaration of Mr. Bruce Bent II, Vice Chairman and Registrant of Applicant. (3 Sheets) and Exhibits A, B, C and D, Mar. 1, 2007, (6 Sheets).
Deposit Growth Strategies for Financial Institutions, New Sweep Account Helps Retain $40 Million in Business Deposits, vol. 7, No. 12, The Reserve Funds, May 2001, 1 Sheet.
Deutsche Bank Insured Deposit Program, Marketing Literature 2007, 3 pages.
DI 48, Excerpts of Transcript of Hearing, U.S. Dist. Ct., District of Delaware, Civil Action No. 82-680, Apr. 8, 1983, 5 sheets.
DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630, May 30, 1984, 6 Sheets.
Dreyfus Insured Deposit Program, Disclosure Statement and Terms and Conditions, Dreyfus A BNY Mellon Company, Jan. 2008, 8 Sheets.
Dreyfus Insured Deposit Program, Multiple List Program—Effective May 11, 2009, 1 Sheet.
Email from Olivia Kim to Charles Macedo on Jun. 9, 2010 with attachment of Lawsuit by *Island Intellectual Property LLC, Lids Capital LLC, Double Rock Corporation*, and *Intrasweep LLC* against *Deutshe Bank Trust Company Americas* and *Total Bank Solutions, LLC*, Defendant Deutsche Bank Trust Company America's responses to Intrasweep's common interrogatory Nos. 1-5, Confidential-Attorneys only, Civil Action No. 09 Civ. 2675 (VM) (AJP).
Email from Olivia Kim to Charles Macedo on May 13, 2010 with attachment of Lawsuit by *Island Intellectual Property LLC, Lids Capital LLC, Double Rock Corporation*, and *Intrasweep LLC* against *Deutshe Bank Trust Company Americas* and *Total Bank Solutions, LLC*, Defendent Deutsche Bank Trust Company America's responses to Double Rock's Common interrogatory Nos. 1-10 to defendents Reservation of Right, Civil Action No. 09 Civ. 2675 (VM) (AJP).
Email from Olivia Kim to Charles Macedo on May 13, 2010 with attachment of Lawsuit by *Island Intellectual Property LLC, Lids Capital LLC, Double Rock Corporation*, and *Intrasweep LLC* against *Deutshe Bank Trust Company Americas* and *Total Bank Solutions, LLC*, Defendent Total Bank Solutions, LLC's responses to Double Rock's Common interrogatory Nos. 1-10 to defendents, Reservation of Right, Civil Action No. 09 Civ. 2675 (VM) (AJP).
FDIC, Federal Deposit Insurance Corporation, Letter to Mr. Ronald Rexter, Feb. 28, 2003, From Michelle M. Borzillo, Counsel Supervision and Legislation Section, 2 Sheets.
Federal Register: Oct. 9, 1997 (vol. 62, No. 196), pp. 52809-52868. http://www.fdic.gov/news/news/inactivefinancial/1997/fil97111b.html.
Financial Services Industry, "Web Watch: Trading Company Bundles CDs for Better Rates," Community Banker, Jun. 2002, online, http://findarticles.com/p/articles/mi_qa5344/is_200206/ai_n21313883/.
Finistar Reg. No. 2,939,558, Registered Apr. 12, 2005.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Frost Bank, Member FDIC, Checking Accounts, 1 Sheet, Sep. 19, 2003, https://www.frostbank.com/cgi-bin/ecomm/frost1/scripts/products/product_detail.jsp?BV_ . . . .
Garmhausen, "Matching Small Banks with Large Muni Deposits," American Banker, Online The Financial Services Resource, Oct. 4, 2005, 4 pages, http://www.finstar.com/docs/AmericanBanker.html.
Heavyweight Funding, Bankers News, Mar. 4, 2003, vol. II, Issue No. 5, 2 Sheets.
Hencke, "New Rules for FDIC deposit Insurance", ABA Bank Compliance, vol. 20, No. 7, Jul./Aug. 1999, pp. 31-37.
Hoffman, "Reserve's FDIC-Insured Account Draws Regionals; But some see little need for insurance," Crain Communications Inc., Investment News, 2 Sheets, Jun. 4, 2001.
IDC Deposits, online, http://idcdeposits.com/ , 2009, 1 Sheet.
In the Know, Important Information About Your Account, Smith Barney Citigroup, 2005, 6 Sheets.
Insured Bank Deposit Program Summary Information Statement, Information Statement, and list of Eligible Program Banks Effective Feb. 10, 2005, 11 pages.

Insured Cash Account Program Disclosure Booklet, LPL Financial Services, Linsco/Private Ledger, Member NASD/SIPC, Apr. 2006, 14 pages.

Jong et al., "The Valuation and Hedging of Variable Rate Savings Accounts," University of Amsterdam, Nov. 15, 2001, 23 Sheets.

Keenan, "Tapping Brokerages for Alternative to CDs," American Banker, The Financial Services Daily, 3 Sheets, Feb. 18, 2004.

Lake Forest Bank & Trust Company, Introducing MaxSafe Deposit Accounts with up to $3.75 Million in FDIC Insurance, www.lakeforestbank.com/maxsafe, Nov. 21, 2008, 2 Sheets.

Lavine, "Check Out High-Yield Checking Accounts," Broward Daily Business Review, vol. 39, No. 102, 2 Sheets, Apr. 27, 1998.

Lawsuit by *Island Intellectual Property LLC, Double Rock Corporation* and *Intrasweep LLC*, against *Promontory Interfinancial Network, LLC, Deutsche Bank AG, Deutsche Bank Trust Company Americas* and *Total Bank Solutions, LLC*, Complaint, Apr. 14, 2009, Case No. 09 CV 3750.

Lawsuit by *Carlo DeBlasio et al.* against *Merrill Lynch & Co., Inc. et al.*, Declaration of Andrew W. Stern, including Exhibits A, B, C, D, E and F, Nov. 12, 2007, Case No. 07-cv-318 (RJS).

Lawsuit by *Carlo DeBlasio et al.* against *Merrill Lynch & Co., Inc. et al.*, Declaration of Joel P. Laitman in Support of Plaintiffs' Memorandum of Law in Opposition to Defendents' Motion for Dismissal of the Second Amended Class Action Complaint, Including: "Client Commitment"; "Get Started Today"; "Total Merrill"; "Guideline for Business Conduct"; "Commitment to Clarity"; "Cash Management Account"; "Information Statement Regarding Charges to Interest Rates of Deposits in Merrill Lynch Banks", Feb. 5, 2008.

Lawsuit by *Carlo DeBlasio et al.* against *Merrill Lynch & Co., Inc. et al.*, Declaration of Joel P. Laitman in Support of Plaintiffs' Memorandum of Law in Opposition to Defendents' Motion for Dismissal of the Second Amended Class Action Complaint, Including: . . . Feb. 5, 2008 (Document 72).

Lawsuit by *Carlo DeBlasio et al.* against *Merrill Lynch & Co., Inc. et al.*, Declaration of Joel P. Laitman in Support of Plaintiffs' Memorandum of Law in Opposition to Defendents' Motion for Dismissal of the Second Amended Class Action Complaint, Including: . . . Feb. 5, 2008 (Document 73).

Lawsuit by *Carlo DeBlasio et al.* against *Merrill Lynch & Co., Inc. et al.*, Declaration of Joel P. Laitman in Support of Plaintiffs' Memorandum of Law in Opposition to Defendents' Motion for Dismissal of the Second Amended Class Action Complaint, Including: . . . Feb. 5, 2008 (Document 74).

Lawsuit by *Carlo DeBlasio et al.* against *Merrill Lynch & Co., Inc. et al.*, Declaration of Joel P. Laitman in Support of Plaintiffs' Memorandum of Law in Opposition to Defendents' Motion for Dismissal of the Second Amended Class Action Complaint, Including: . . . Feb. 5, 2008 (Document 75).

Lawsuit by *Carlo DeBlasio et al.* against *Merrill Lynch & Co., Inc. et al.*, Declaration of Kenneth I. Schacter, including Exhibits A, B, C, D, F, G, H, I, J, K, L, M, N, O, P, Q and R, Nov. 14, 2007, Case No. 07-cv-318 (RJS) (Document 69).

Lawsuit by *Carlo DeBlasio et al.* against *Merrill Lynch & Co., Inc. et al.*, Declaration of Mathew J. Terry in Support of Motion to Dismiss by Defendants Wachovia Corporation, Wachovia Securities, LLC, Wachovia Bank, N.A., and Wachovia Bank of Delaware, N.A., including Exhibits A, B, C and D, Nov. 14, 2007, Case No. 07-318 (RJS) (Document 67).

Lawsuit by *Carlo DeBlasio et al.* against *Merrill Lynch & Co., Inc. et al.*, Declaration of Scott D. Musoff in Support of the Merrill Lynch Defendants' Motion to Dismiss the Second Amended Class Action Complaint, ECF Case, Nov. 12, 2007, Case No. 07-cv-318 (RJS) (Document 64).

Lawsuit by *Carlo DeBlasio et al.* against *Merrill Lynch & Co., Inc. et al.*, Reply Declaration of Kenneth Schacter including Exhibits S and T, Mar. 6, 2008, Case No. 07-cv-318 (RJS) (Document 81).

Lawsuit by *Carlo DeBlasio et al.* against *Merrill Lynch & Co., Inc. et al.*, Second Amended Class Action Complaint, Jury Trial Demanded, Introduction and Summary of Allegations, Jun. 11, 2007, Case No. 07-cv-318-VM.

Lawsuit by *Carlo DeBlasio et al.* against *Merrill Lynch & Co., Inc. et al.*, Supplemental Declaration of Matthew J. Terry in Support of Motion to Dismiss by Defendents Wachovia Corp., Wachovia Securities, LLC, Wachovia Bank N.A., and Wachovia Bank of Delaware, N.A., including Exhibits A and B, Mar. 6, 2008, Case No. 07-cv-318 (RJS) (Document 79).

Lawsuit by *Carlo DeBlasio, et al.* against *Merrill Lynch & Co., Inc., et al.*, Opinion and Order Regarding Motions, Jul. 27, 2009, Case No. 07 CIV 318(RJS).

Lawsuit by *Island Intellectual Property LLC* and *Intrasweep LLC* against *Deutsche Bank Trust Company Americas* and *Total Bank Solutions, LLC*, Deutsche Bank Trust Company Americas' answer to plaintiffs' Feb. 23, 2010 complaint and counterclaims, May 4, 2010, Civil Action No. 09 Civ. 2675 (VM) (AJP)(Document 111).

Lawsuit by *Island Intellectual Property LLC* and *Intrasweep LLC* against *Deutsche Bank Trust Company Americas* and *Total Bank Solutions, LLC*, Total Bank Solutions, LLC's answer to plaintiffs' Feb. 23, 2010 complaint and counterclaims, May 4, 2010, Civil Action No. 09 Civ. 2675 (VM) (AJP)(Document 112).

Lawsuit by *Island Intellectual Property LLC* and *Intrasweep LLC* against *Institutional Deposits Corp.* The Island Plaintiffs' Complaint against Defendant Institutional Deposits Corp., Nov. 4, 2009, Civil Action No. 1 09-CV-3079.

Lawsuit by *Island Intellectual Property LLC* and *Intrasweep LLC* against *Institutional Deposits Corp.*, Complaint for Patent Infringement, Jury Trial Demanded, Nov. 4, 2009, Civil Action No. 09 CV 3079.

Lawsuit by *Island Intellectual Property LLC* and *Intrasweep LLC* against *Institutional Deposits Corp.*, Consent Order, Apr. 21, 2010, Case No. 09-CV-3079 (Document 44).

Lawsuit by Island Intellectual Property LLC and Intrasweep LLC, Answer of Defendent Institutional Deposits Corp. to Complaint for Patent Infringement, Dec. 10, 2009, Case No. 09 CV 03079 (JEC), (Document 16).

Lawsuit by *Island Intellectual Property LLC* and *Lids Capital LLC* against *Deutsche Bank Trust Company Americas* and *Total Bank Solutions, LLC*, Deutsche Bank Trust Company answer to plaintiffs' Mar. 16, 2010 complaint and counterclaims, May 4, 2010, Civil Action No. 09 Civ. 2675 (VM) (AJP) (Document 113).

Lawsuit by *Island Intellectual Property LLC* and *Lids Capital LLC* against *Deutsche Bank Trust Company Americas* and *Total Bank Solutions, LLC*, Total Bank Solutions, LLC's answer to plaintiffs' Mar. 16, 2010 complaint and counterclaims, May 4, 2010, Civil Action No. 09 Civ. 2675 (VM) (Document 114).

Lawsuit by *Island Intellectual Property LLC et al.*, against *Deutsche Bank Trust Company Americas, et al.*; Expert Report of Richard T. Powers Concerning Invalidity of U.S. Patent Nos. 7,536,350; 7,668,771; 7,668,772, 7,672,886; and 7,680,734; and Exhibits A-R; Civil Action No. 09 Civ.2675(VM)(AJP), Oct. 28, 2010; 1.119 pages.

Lawsuit by *Island Intellectual Property LLC, et al.* against *Deutsche Bank Trust Company Americas, et al,.* Defendant Deutsch Bank Trust Company Americas' Responses to Double Rock's Interrogatories Nos. 1-10; May 2010; Civil Action No. 09 Civ. 2675 (VM)(AJP).

Lawsuit by *Island Intellectual Property LLC, et al.* against *Deutsche Bank Trust Company Americas, et al.*; Expert Report of Ivan Zatkovich Regarding Validity and Enforceability of the Asserted Claims of the Patents-in-Suit; Civil Action No. 09 Civ. 2675 (VM)(AJP); Nov. 23, 2010; 192 pages. The redacted items were designated as confidential in a Protective Order in this case.

Lawsuit by *Island Intellectual Property LLC, et al.* against *Deutsche Bank Trust Company Americas, et a.*; Expert Report of the Honorable Gerald J. Mossinghoff and Exhibits A-E; Civil Action No. 09 Civ. 2675 (VM)(AJP); Nov. 23, 2010; 107 pages.

Lawsuit by *Island Intellectual Property LLC, et al.* against *Deutsche Bank Trust Company Americas*; Defendant Total Bank Solutions, LLC's Responses to Double Rock's Common Interrogatory Nos. 1-10 to Defendants; May 2010; Civil Action No. 09 Civ. 2675 (VM)(AJP).

Lawsuit by *Island Intellectual Property LLC, et al.*, against *Deutsche Bank Trust Company Americas; et al.*; Defendant Deutsche Bank Trust Company Americas' Fifth Supplemental Responses to Island IP's First Set of Common Interrogatories to All Defendants (No. 7); Case No. 09 Civ. 2675 (VM)(AJP); Sep. 16, 2010; 9 pages.

Lawsuit by *Island Intellectual Property LLC, et al.*, against *Deutsche Bank Trust Company Americas, et al.*; Defendant Total Bank Solutions, LLC's Fifth Supplemental Responses to Island IP's First Set of Common Interrogatories to All Defendants (No. 7); Case No. 09 Civ. 2675 (VM)(AJP); Sep. 16, 2010; 9 pages.

Lawsuit by *Island Intellectual Property LLC, Intrasweep LLC* and *Double Rock Corporation* against *Deutsche Bank AG, Deutsche Bank Trust Company Americas* and *Total Bank Solutions, LLC*, Complaint for Patent Infringement, May 19, 2009, Case No. 09 CIV 4673.

Lawsuit by *Island Intellectual Property LLC, Lids Capital LLC*, and *Double Rock Corporation* against *Deutsche Bank AG, Deutsche Bank Trust Company Americas* and *Total Bank Solutions, LLC*, including Cover Sheet, Summons, Complaint and Rule 7.1 Statement, Mar. 24, 2009, Case No. 09 CV 2677.

Lawsuit by *Island Intellectual Property LLC, Lids Capital LLC*, and *Double Rock Corporation* against *Promontory Interfinancial Network, LLC* and *MBSC Securities Corporation*, including Cover Sheet, Summons, Complaint and Rule 7.1 Statement, Mar. 24, 2009, Case No. 09 CV 2675.

Lawsuit by *Island Intellectual Property LLC, Lids Capital LLC, Double Rock Corporation* and *Intrasweep LLC* against *Deutsche Bank AG, Deutsche Bank Trust Company Americas* and *Total Bank Solutions, LLC*, Stipulated Dismissal of Deutsche Bank AG Without Prejudice, Nov. 19, 2009, Civil Action No. 09 CIV 2675 (VM) (AJP) (Document 79).

Lawsuit by *Island Intellectual Property LLC, Lids Capital LLC, Double Rock Corporation* and *Intrasweep LLC* against *Deutsche Bank Trust Company Americas* and *Total Bank Solutions, LLC*, Deutsche Bank Trust Company Americas' First Amended Answer to Consolidated First Amended Complaint and Counterclaims, Dec. 4, 2009, Civil Action No. 09 CIV 2675 (VM) (AJP), (Document 86).

Lawsuit by *Island Intellectual Property LLC, Lids Capital LLC, Double Rock Corporation* and *Intrasweep LLC* against *Deutsche Bank Trust Company Americas* and *Total Bank Solutions, LLC*, Total Bank Solutions, LLC's First Amended Answer to Consolidated First Amended Complaint and Counterclaims Dec. 4, 2009, Civil Action No. 09 CIV 2675 (VM) (AJP) (Document 87).

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, Answer and Counter Claims, Answer of Defendant MBSC Securities Corporation, Jun. 25, 2009, Case No. 09 CV 2675.

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, Answer and Counter Claims, Answer of Defendant Promontory Interfinancial Network, LLC, Jun. 25, 2009, Case No. 09 CV 2675.

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, Consolidated First Amended Complaint, Jury Trial Demanded, Jun. 11, 2009, Civil Action No. 09 CIV 2675 (VM).

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, Jury Trial Demanded, Deutsche Bank AG's Answer to Consolidated First Amended Complaint, Jun. 25, 2009, Civil Action No. 09 CIV 2675.

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, Jury Trial Demanded, Deutsche Bank Trust Company Americas' Answer to Consolidated First Amended Complaint and Counter Claims, Jun. 25, 2009, Civil Action No. 09 CIV 2675.

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, Jury Trial Demanded, Total Bank Solutions, LLC's Answer to Consolidated First Amended Complaint and Counterclaims, Jun. 25, 2009, Civil Action No. 09 CIV 2675.

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, Stipulated Dismissal of Counts I-III of Defendent Promontory Interfinancial Network, LLC's, Counterclaim with Prejudice, Oct. 19, 2009, (Document 68).

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, Stipulation and Order, Oct. 29, 2009, Case No. 09 CV 2675 (VM) (AJP) (Document 73).

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, The Island Plaintiffs' Reply to Defendent Deutsche Bank Trust Company Americas' Counterclaims, Jul. 9, 2009, Civil Action No. 09 CIV 2675 (VM).

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, The Island Plaintiffs' Reply to Defendent MBSC Securities Corporation's Counterclaims, Jul. 9, 2009, Civil Action No. 09 CIV 2675 (VM).

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, The Island Plaintiffs' Reply to Defendent Promontory Interfinancial Network LLC's Counterclaims, Jul. 9, 2009, Civil Action No. 09 CIV 2675 (VM).

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, The Island Plaintiffs' Reply to Defendent Total Bank Solutions, LLC's Counterclaims, Jul. 9, 2009, Civil Action No. 09 CIV 2675 (VM).

Lawsuit by *Promontory Interfinancial Network, LLC* against *Double Rock Corporation p/k/a Reserve Management Corporation* and *Lids Capital LLC*, Amended Complaint, Mar. 27, 2009, Civil Action No. 1:09 CV 316.

Lawsuit by *Promontory Interfinancial Network, LLC* against *Double Rock Corporation p/k/a Reserve Management Corporation*, Complaint, Mar. 24, 2009, Civil Action No. 1:09 CV 316.

Lawsuit by *Promontory Interfinancial Network, LLC* against *Double Rock Corporation p/k/a Reserve Management Corporation, Island Intellectual Property LLC, Lids Capital LLC* and *Intrasweep LLC*, Amended Complaint, Apr. 15, 2009, Civil Action No. 3:09 CV 217.

Lawsuit by *Promontary Interfinancial Network, LLC* against *Double Rock Corporation p/k/a Reserve Management Corporation, Island Intellectual Property LLC, Lids Capital LLC* and *Intrasweep LLC*, Complaint, May 19, 2009, Civil Action No. 3:09 CV 322.

Lawsuit by *Promontory Interfinancial Network, LLC* against *Double Rock Corporation, p/k/a Reserve Management Corporation, Island Intellectual Property LLC* and *Lids Capital LLC*, including Cover Sheet, Summons and Complaint, Apr. 14, 2009, Civil Action No. 3:09 CV 217.

Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.

Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.
Letter From Joseph A. DiNuzzo, Counsel, Oct. 20, 1999, FDIC, Federal Deposit Insurance Corporation, 1 Sheet.
Letter From Merle Y. Waldman, LEXSEE 1985 Sec No-Act., Lexis 1593, Securities Exchange Act of 1934—Section 15(a), Jan. 8, 1985, 11 Sheets.
Letter from Michael Bradfield, General Counsel, Board of Governors of the Federal Reserve System, Nov. 16, 1984, 4 Sheets.
Letter From Oliver I. Ireland, Associate General Counsel, Board of Governors of the Federal Reserve System, Jun. 22, 1988, 5 Sheets.
Letter From Roger A. Hood, Assistant General Counsel, Jul. 16, 1986, FDIC, Federal Deposit Insurance Corporation, Legal Division, 1 Sheet.
Letter from Roger M. Zaitzeff, Seward & Kissel to Gilbert T. Schwartz, Associate General Counsel, Board of Governors of the Federal Reserve System; May 10, 1983, 5 sheets.
Letter from Stephanie Martin, Assoc. General Counsel, Board of Governors of the Federal Reserve System, Apr. 22, 2004, 8 Sheets.
Letter From William W. Wiles, Secretary of the Board, Board of Governors of the Federal Reserve System, Jun. 22, 1983, 6 Sheets.
Letter to Mr. James E. Creekman, Group Vice President, From Oliver Ireland, Associate General Counsel, Aug. 1, 1995, 4 Sheets.
Mr. Jonathan L. Levin, Esq., From Oliver Ireland, Associate General Counsel, Oct. 18, 1996, 2 Sheets.
Letter to Mr. L.P. Fleming, Jr., Esq., From Oliver Ireland, Associate General Counsel, Feb. 7, 1995, 3 Sheets.
Letter to Ms. Brenda L. Skidmore, Senior Vice President, From Oliver Ireland, Associate General Counsel, Aug. 30, 1995, 4 Sheets.
Letter to William R. Burdette, CEO, Apr. 6, 2009, FDIC, Federal Deposit Insurance Corporation, 2 pages.
Letter to William R. Burdette, CEO, Nov. 15, 2007, FDIC, Federal Deposit Insurance Corporation, 5 Sheets.
Liberman et al., Market Watch, "How Important are Banks?" FDIC Insurance on Deposits Just One Continuing Advantage, Oct. 17, 2006, 3 Sheets.
McReynolds et al. "Unusual Products for Unusual Times," Securities Data Publishing on Wall Street, 6 Sheets, May 1, 2001.
McReynolds, "The Power of CASH: Ho-hum cash can be great product (and lead to more business) in troubled times," Securities Data Publishing on Wall Street, 3 Sheets, Jun. 1, 2002.
Merriam-Webster Online Dictionary, 10th Edition, Definition of "Associated", Jan. 30, 2009, 2 Sheets.
Merrill Lynch & You, "Financial Services the Way You Want, When You Want Them," Jan. 2000, 4 Sheets.
Merrill Lynch Announces Beyond Banking, The Power of Advice for Smarter Cash Management, Jan. 8, 2 Sheets.
Merrill Lynch, Pierce, Fenner & Smith Incorporated, "Information Statement," 2000, 12 Sheets.
Merrill Moves CMA Cash to Bank, Street Talk, On Wall Street, Nov. 2000, p. 26.
Money Fund Report, Bank of New York Adds Insured Sweeps Option, Friday, May 3, 2002, The Reserve Funds, 1 Sheet.
Money Fund Report, IBC Financial Data, Inc., Nov. 6, 1998, 1 Sheet.
Money Fund Report, Insured Cash Sweep Options Proliferate, Friday, Jun. 1, 2001, The Reserve Funds, 1 Sheet.
Money Market Insight's, Goldman Sachs May Create Bank to Offer Insured Cash Sweeps, Aug. 2002 Issue, 3 Sheets.
Munk, Merrill Makes New Push Into Traditional Banking, Dow Jones Newswires, Jan. 3, 2003, 1 Sheet.
Mutual Fund Dealers Association, 1998; 1 page, (http://www.mfda.ca/.
Mutual Funds Magazine, Bargain Basement Funds, Oct. 1997, 1 Sheet.
Mutual Funds Magazine, Bargain Basement Funds, Oct. 1997, 2 Sheets.
News Article: "Regulators Support Demand Deposit Bill", Regulatory Compliance Watch—Mar. 9, 1998; 2 Sheets, vol. 9, No. 10.
Northbrook Bank & Trust Company, Seven Times the Security of a Normal CD, Introducing our MaxSafe CD, Nov. 12, 2002, 4 Sheets.

O'Brian, "Money-Market Funds Suit Many Investors, But Proud Creator Frets About Extra Risk," Re-Printed From The Wall Street Journal, Monday, Nov. 6, 2000, Dow Jones & Company, Inc., Nov. 25, 2002, 2 Sheets.
On Wall Street, Helping Brokers Build a More Successful Business, The Power of CASH, Jun. 2002, 2 Sheets.
On Wall Street, Helping Brokers Build a More Successful Business, Unusual Products for Unusual Times, May 2001, 2 Sheets.
Online, www.usabancshares.com, Brave New World, 1999, 2 Sheets.
Potter, "As Sweep Accounts Continue to Grow, So do Community Bank Options," America's Community Banker, vol. 9, Issue 8, Bell & Howell Information and Lerning Company, 3 Sheets, Aug. 1, 2000.
Promontory Interfinancial Network, Promontory Interfinancial Network Announces New Deposit Placement Service, Jan. 21, 2003, 3 Sheets.
Promontory Interfinancial Network: http://www.promnetwork.com/index.html, 2003.
Promontory Interfinancial Network: Frequently Asked Questions (FAQs), Feb. 5, 2003, 5 pages.
Promontory to Roll Out Deposit Service Insuring Liquid Funds, American Banker, by Joe Adler, Feb. 22, 2010, 2 sheets.
Reserve Insured Deposits, United States Patent and Trademark Office, Reg. No. 2,694,910, Registered Mar. 11, 2003, 1 Sheet.
Ring, National /Global, "Amex Spans the Globe in Retail Bank Buildup," Nov. 27, 2000, 1 Sheet.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking for Business; Says too Few Members Want it," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Sweeping Your Firm Into FDIC Insured Deposits, Harken Financial Services, Aug. 4, 2006, 8 Sheets.
Testimony of Bruce R. Bent, CEO of The Reserve Funds, Before the Financial Institutions and Consumer Credit Subcommittee House Financial Services Committee U.S. House of Representative, Hearing on H.R. 758 and H.R. 859, Mar. 5, 2003, 4 Sheets.
The Depository Trust Company, B#: 3875, Oct. 1, 2002, Settlement\Underwritting, From: Denise Russo, Director, Underwritting, 6 Sheets.
The Insured Savings Account, Issuer Guide to Offering MMDAs Through Merrill Lynch, Merrill Lynch Money Markets, Inc., "Operational Guide to the Merrill Lynch MMDA Program 1986", Sep. 1986 3 Sheets.
The Pershing Press, Dreyfus Insured Deposit Program, Issue 2, Aug. 2008, http://www.pershing.com/news/pershing_press/news_466244.html, 1 Sheets.
The Reserve Funds Press Release, "The Reserve Funds and Frontier Bank Partner to Offer Revolutionary Banking Product," 5 Sheets, Aug. 1, 2000.
The Reserve Funds, Objectives, Observations & Strategies for American Enterprises Inv., Oct. 18, 2000, 11 Sheets.
The Reserve Funds, NJBA Endorses New Sweep Account Offers New Jersey Banks Deposit Growth, Retention, For Immediate Release, May 23, 2001, 1 Sheet.
The Reserve Funds, Reserve Management and Irwin Union Bank and Trust Company Partnet to Offer the Reserve Return Sweep, For Immediate Release, Mar. 8, 2001, 2 Sheets.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
The Reserve, "Reserve Insured Deposits," 2 Sheets, Oct. 4, 2006, http://www.ther.com/ps/ps_fif.shtml.
The Reserve, "What Sets Us Apart," 2 Sheets, Oct. 4, 2006, http://www.ther.com/bank/bank_wsua.shtml.
Total Bank Solutions, Bank Sweep FAQs http://www.totalbanksolutions.com/sweepbnkfaqs.htm, Sep. 23, 2005, 2 pages.
Total Bank Solutions, Bank Sweep FAQs, http://www.totalbanksolutions.com/sweepbnkfaqs.htm, Nov. 2, 2005, 3 pages.

Total Bank Solutions, Bank Sweep Products, Deutsche Bank, http://www.totalbanksolutions.com/banksweep.htm, Sep. 23, 2005, 1 page.
Total Bank Solutions, Bank Sweep Products, http://www.totalbanksolutions.com/banksweep.htm, Appendix 3, Oct. 18, 2005, 2 pages.
Total Bank Solutions, Bank Sweep Products, http://www.totalbanksolutions.com/banksweep.htm, Nov. 2, 2005, 2 pages.
Total Bank Solutions, Brokerage Sweep FAQs, http://www.totalbanksolutions.com/brokerfaqs.htm, Nov. 2, 2005, 3 pages.
Total Bank Solutions, Brokerage Sweep, http://www.totalbanksolutions.com/brokersweep.htm, Nov. 2, 2005, 1 page.
Total Bank Solutions, Deposit Bank FAQs, http://www.totalbanksolutions.com/depositbnkfaqs.htm, Nov. 2, 2005, 2 pages.
Total Bank Solutions, Deposits, Deutsche Bank, http://www.totalbanksolutions.com/deposits.htm, Sep. 23, 2005, 1 page.
Total Bank Solutions, Deposits, http://www.totalbanksolutions.com/deposits.htm, Nov. 2, 2005, 2 pages.
Total Bank Solutions, Deutsche Bank Insured Deposit Program, DB Insured Deposit Program Features, http://www.totalbanksolutions.com/features.htm, Sep. 23, 2005, 2 pages.
Total Bank Solutions, Deutsche Bank Insured Deposit Program, http://www.totalbanksolutions.com/, Sep. 23, 2005, 1 page.
Total Bank Solutions, http://www.totalbanksolutions.com/, Mar. 16, 2007, 8 pages.
Total Bank Solutions, http://www.totalbanksolutions.com/overview.htm, Nov. 2, 2005, 1 page.
Total Bank Solutions, Insured Deposit Program Features, http://www.totalbanksolutions.com/features.htm, Nov. 2, 2005, 2 pages.
Total Bank Solutions, Insured Deposit Program, http://www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategtic Partners, Nov. 2, 2005, 1 page.
Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBS Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 7 pgs.
TotalBank Solutions, web.archive.org/web/20050126044216/http://totalbanksolutions.com, Jan. 26, 2005, 2 pgs.
USA Mutual Partners Insured Cash Shelter Account Terms and Conditions, 11 pages, 2009 USA Mutuals Partners, Inc.
Wachovia Securities, Important Information for Clients Concerning Charges in Automatic "Sweep" Arrangements, Oct. 1, 2003, 6 sheets.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Insured Savings Correspondent Agreement with Exhibits A-D, Dec. 1989; 28 pgs.
Product Bulletin from Bill McCain, Subject: Insured Savings Product Announcement, May 8, 1989, 7 pgs.
Insured Savings Project Team Meeting, Feb. 2, 1989, 16 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City—Austin deposit program to hold existing customers' deposits, Mar. 17, 1988, 7 pgs.
Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Insured Savings Rate Change Notice, Jul. 17, 1990, 1 pg.
Addendum to Insured Savings Agency Agreement, Jul. 17, 1990, 1 pg.
Letter to Paula Martin, Jul. 3, 1990, 1 pg.
Letter to John Lovell, Jul. 3, 1990, 1 pg.
Email from John Oncken re: Depository Levels at Insured Savings Depositories, Nov. 2, 1989, 1 pg.
Memorandum from Ed Piner, Subject: Discontinuation of Automatic Balance Monitoring in conjunction with Insured Savings Accounts, May 21, 1991, 1 pg.
Blank form letter from Edward N. Piner, May 24, 1991, 1 pg.
Letter from First City National Bank of Austin, Sep. 20, 1982, 5 pgs.
First City, Texas—Austin, Special Products, Feb. 20, 1992, with Schedule A & Schedule B, 6 pgs.
Letter From Oliver I. Ireland, Associate General Counsel, Board of Governors of the Federal System, Jun. 22, 1988, 5 Sheets.
Alliance Insured Account, Information Statement, Sep. 1999, 6 sheets.
Lawsuit by Carlo DeBlasio et al. and Merrill Lynch & Co., Inc. et al., Opinion and Order, Jul. 27, 2009, Civil Action No. 07 CIV. 318, 47 pgs.
Lawsuit by Carlo DeBlasio et al. and Merrill Lynch & Co., Inc. et al., Second Amended Class Action Complaint, Jury Trial Demanded, Jun. 11, 2007, Civil Action No. 07 cv 318, 137 pgs.
Investment Company Act of 1940—Section 3(a)(1), 2(a)(36); Securities Act of 1933—Section 2(1), Nov. 29, 1985, Kempter Financial Sevices, Inc., 9 pgs.
First National Bank in Brookings, Certificates of Deposit, Fuly 17, 2009, 5 sheets.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93-35, Jun. 28, 1993, 2 sheets.
§204.134, 12 CFR Ch. 11 (Jan. 1, 2009 Edition), 2 sheets.
Money Fund $$ Moving to Bank Deposits, 6 FRC Monitor, Dec. 2003, 2 sheets.
Crane, P. & Krasner, Mike, An iMoney Net Special ReportTM , "Brokerage Cash Sweep Options: The Shift from Money Funds to FDIC-Insured Bank Deposit Accounts", Nov. 2004, 64 pgs.
The May 1998 Senior Financial Officer Survey, Board of Govenors of the Federal Reserve System, with Appendix A, 48 pgs.
Interest Rate Review © A Publication of Meyer Weekly Interest Rate Survey, A Look at Tiers, vol. II, No. 4, Apr. 1987, 6 pgs.
Interest Rate Review © A Publication of Meyer Weekly Interest Rate Survey, A Study of Historical Rates and Yields, vol. II, No. 6, Jun. 1987, 8 pgs.
Blank form letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.
Merrill Lynch & Co., Inc. Form 10-K405 (Annual Report (Regulation S-K, item 405)), Filed Mar. 14, 2002 for the Period Ending Dec. 28, 2001, with Schedules, Exhibits, and 2001 Annual Report, 248 pgs.
Merrill Lynch & You, "Financial Services the Way You Want, When You Want Them," Jan. 2000 4 Sheets.

Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", On Wall Street, Nov. 2000, 1 sheet.
OCC Insured Bank Deposit Account, Jun. 1993; 3 sheets.
Insured Bank Deposit Account, Information Statement, Jul. 1, 2000, 2 sheets.
Letter from Marilyn J. Hensle, announcing Salomon Smith Barney Bank Deposit Program. SM, with Q&A, Aug. 16, 2000; 14 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
Insured Savings Account Fact Sheet, The Merrill Lynch Cash Management Account Financial Service, 1987, 11 pgs.
CMA Insured Savings Account Fact Sheet, 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, American Banker, Dec. 6, 2000, 2 pgs.
Insured Deposit Account (IDA), May 21, 1996, 11 pgs.
An Introduction to the Smith Barney Insured Deposit Account, 1995, 8 pgs.
Memorandum from Ted Hamilton re: Insured Deposit Account, Oct. 10, 1995, 13 pgs.
The Insured Deposit Account: "Money in the Bank", 1997, 2 sheets.
Merrill Joins Money Market Account, CMA; Broker Begins Testing With 12 Institutions, Lexis Nexis, Sep. 23, 1983, 4 pgs.
Form 8-K Merill Lynch & Co Inc—MER, Filed: Mar. 7, 2002, Report of unscheduled material events or corporate changes, 41 pgs.
Lawsuit by *Island Intellectual Property LLC* and *Intrasweep LLC* against *Deutsche Bank Trust Company Americas* and *Total Bank Solutions*, Complaint for Patent Infringement, Jury Trial Demanded, Feb. 23, 2010, Case No. 10 CV 1518, (Document 1).
Lawsuit by *Island Intellectual Property LLC* and *Lids Capital LLC* against *Deutsche Bank Trust Company Americas* and *Total Bank Solutions*, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Federally Insured Deposit Program for Banks, AmVest capital, Jan. 15, 2010, 2 sheets.
Flow Chart, AmVest Capital, Dec. 9, 2009, 1 sheet.
Participation Criteria for the FIDP, Federally Insured Deposit Program Participation Criteria, AmVest Capital, Jan. 15, 2010, 4 pgs.
Federally Insured Deposits/FAQ, Frequently Asked Questions on the Federally Insured Deposit Program, AmVest Capital, Jan. 15, 2010, 2 sheets.
Money Market Rates, Jan. 18, 2010, 2 sheets.
Money Market Rates, Jan. 6, 2010, 3 pgs.
Money Market Rates, Nov. 12, 2009, 3 pgs.
Scott & Stringfellow starts correspondent clearing business, News Release BB&T, Nov. 13, 2007, 2 sheets.
Curian Capital Introduces Custom Wealth Platform, Market Watch, Aug. 18, 2009, 3 pgs.
Ellie Behling, Curian Capital Introduces Custom Wealth Platform, Nov. 10, 2009, 3 sheets.
Curian Capital Introduces Custom Wealth Platform, Reuters, Aug. 18, 2009, 3 pgs.
Curian Capital Introduces Custom Wealth Platform, WSJ.com, Aug. 18, 2009, 3 pgs.
Curian Capital, LLC: Private Company Information, Business Week, Nov. 10, 2009, 3 pgs.
Curian Capital Introduces Custom Wealth Platform, Yahoo! Finance, Aug. 18, 2009, 3 pgs.
Bank Insured Deposit Program, D.A. Davidson & Co., Jan. 15, 2010, 2 sheets.
Bank Insured Deposit Program, D.A. Davidson & Co., Nov. 2, 2009, 2 sheets.
D.A. Davison & Co., Bank Insured Deposit Program, Disclosure Statement, Jan. 15, 2010, 4 sheets.
First Southwest Company, First Southwest Company Bank Insured Deposit Program, Sep. 28, 2009, 11 pgs.
Manage Cash in an Online Stock Portfolio: Folio Investing, Jan. 15, 2010, 2 sheets.
Folio Investing: Brokerage Features >> Cash Investments>> FDIC. PLUS Program, Jan. 14, 2010, 3 pgs.
Folio Investing: Brokerage Features >> Cash Investments>> Cash Seep Rates, Jan. 14, 2010, 2 sheets.
Folio Investing: Brokerage Features >> Cash Investments>> Cash Seep Banks, Jan. 15, 2010, 3 pgs.
Folio Investing: Brokerage Features >> Cash Investments>> Cash Sweep FAQ, Jan. 4, 2010, 3 pgs.
Folio Investing: Brokerage Features >> Cash Investments>> Cash Sweep FAQ, Jan. 18, 2010, 2 sheets.
Folio Investing: Brokerage Features >> Cash Investments>> Cash Sweep FAQ, Jan. 15, 2010, 2 sheets.
Folio Investing: Brokerage Features >> Cash Investments>> Sweep Terms & Conditions, Jan. 14, 2010, 2 sheets.
H.C. Denision Company, Sheboygan, WI, retrieved from internet Nov. 2, 2009; 1 sheet.
The LYRA Program with H.C. Denison Company, Sheboygan Wisconsin, Jan. 15, 2010, 2 sheets.
Current LYRA Program Rates, H.C. Denison Co., Jan. 15, 2010, 1 sheet.
Current LYRA Program Rates, H.C. Denison Co., Nov. 2, 2009, 1 sheet.
Current LYRA Program Banks, H.C. Denison Co. LYRA Program, Nov. 2, 2009, 1 sheet.
Authorization Form, H.S. Denison Company's Liquidity Insured Reserve Access Program (LYRA Program), Oct. 2009, 1 sheet.
Frequently Asked Questions for the LYRA Program, H.C. Denison Co., Jan. 15, 2010, 3 pgs.
Terms & Conditions for H.C. Denison Company's Liquidity Insured reserve Access Program (LYRA Program), Jan. 15, 2010, 4 pgs.
Terms & Conditions for H.C. Denison Company's Liquidity Insured reserve Access Program (LYRA Program), Nov. 2, 2009, 4 pgs.
Current Rates, http://currentrates.hillard.com/ Jan. 6, 2010, 1 sheet.
Current Rates, http://currentrates.hillard.com/ Nov. 2, 2009, 1 sheet.
Current Rates, Market Info, Hilliard Lyons, Nov. 2, 2009, 4 pgs.
Legent Insured Deposit, www.legentclearing.co/mmf/phf, Nov. 2, 2009, 2 sheets.
Legent Insured Deposit Program—Summary of Terms and Conditions, Nov. 2008, 4 pgs.
Cash Management, Mesirow Financial—B/D and IA Services, www.mesirowfinancial.com/bdia/cas_mgmt.jsp, Jan. 15, 2010, 2 sheets.
Frequent Asked Questions: FDIC Sweep Program, optionsXpress, retrieved from internet Jan. 6, 2010; vwww.optionsxpress.com/welcom/faq/aq/fdc.aspx#rate.
Frequently Asked Questions: FDIC Sweep Program, optionsXpress, www.optionsxpress.com/welcom/faq/fdic.aspx, Jan. 6, 2010, 3 pgs.
Frequently Asked Questions: FDIC Sweep Program, www.optionsxpress.com/welcom/faq/fdic.aspx, Nov. 12, 2009, 2 sheets.
Money Fund and FDIC-Insured Bank Programs, Pershing, www.pershing.com/money_fund.htm, Jan. 15, 2010, 1 sheet.
Money Market Mutual Fund & FDIC-Insured Deposits Program Rates & Bank Lists, www,pershing.com/rates.html, Jan. 6, 2010m 6 pgs.
Money Market Mutual Fund and FDIC-Insured Deposit Program Rates & Bank List, Jan. 5, 2010; www.pershing.com/rates.html, 1 sheet.
Clearing firms used by the top independent broker-dealers, Investment News, www.investmentnews/article/20081214/CHART/812119919, Jan. 15, 2010, 4 sheets.
Objective investment advice Building trust, Wayne Strout, www.waynestrout.com/more)info, Jan. 18, 2010, 5 pgs.
Eagle sweep disclosure, first republic Securities Company, Jun. 1, 2009, 12 pgs.
Update New FDIC product at IPI: Deutsche Bank Insured Deposit Program, Investment Professionals Inc, Feb. 4, 2009, 11 pgs.

Insured cash account, , http://lplfinancial.lpl.com/x68.xml, with LPL Financial insured cash account program disclosure booklet, LPL Financial Jan. 15, 2010, 23 pgs.
Insured deposit program, www.aigadvisorgroup.com/fdic/03.04.09.htm, Jan. 15, 2010, 3 pgs.
FlexInsured AccountSM , PrimeVest, http://primevest.com/flexInsured_account.asp, Jan. 14, 2010, 1 sheet.
FlexInsuredSM Account disclosure statement, PrimeVest, 2009, 5 pgs.
An independent broker-dealer, Royal Alliance, http://royalalliance.com, Jan. 15, 2010, 1 sheet.
Brokerage products and services, www.steerneagee.com/sali/pcg/pages/products-services.aspx, Nov. 4, 2009, 2 sheets.
Client account agreement to Sterne Agee Clearing, Inc, Sterne, Agee & Leach, Inc and its authorized agents, Feb. 3, 2009, 5 pgs.
Valet a full service asset management account, http://valetaccount.com/visaTerms.php, Nov. 12, 2009, 6 pgs.
We have your banking nees covered!, Greater Franklin, 2009, 2 sheets.
Insured MMA Seep Program, Circle Bank, www.circlebank.com/personalbanking)mma.aspx, Jan. 14, 2010, 2 sheets.
Insured MMA agency sweep agreement with rate sheet, Circle Bank, Dec. 3, 2009, 6 pgs.
Personal Banking—East West student plus program, East West Bank, www.eastwestbank.com/english/FDIC.asp, Nov. 10, 2009, 1 sheet.
Safe sound secure insured deposit programs, East West Bank, www.eastwestbank.com/English/SS_SIDPrograms.asp, Jan. 15, 2010, 2 sheets.
Money market insured deposit program, East West Bank, www.eastwestbank.com/English/MMarket_Insured.asp, Nov. 10, 2009, 1 sheet.
Insured deposit program bank list, www.eastwestbank.com/English/IDPB_list.htm, Nov. 10, 2009, 1 sheet.
FDIC information ofr United Commercial Ban, San Francisco, UCB, www.ibankunited.com/home.html, Nov. 12, 2009, 1 sheet.
Money market insured deposit program, Desert Community Bank, www.dck.org/MMarket_insured.html, Nov. 12, 2009, 1 sheet.
Insured deposit program bank list, www.dcbk.org/IDPB_list.htm, Nov. 12, 2009, 1 sheet.
Evolve and others team up with Deutsche Bank to provide higher FDIC coverage limits, www.insureddeposit online.com/content/view/31/86/, Nov. 12, 2009, 1 sheet.
Protect your cash portfolio!, http://insureddepositsonline.com, Jan. 15, 2010, 1 sheet.
Protect your cash portfolio!, www.insureddepositsonline.com/component/option.com_frontpage/Itemid,1/, Nov. 2, 2009, 1 sheet.
Participating bank analysis, Insured Deposit Program, Evolve Bank & Trust, www.insureddepositsonline.com/content/view/45/113/, Nov. 15, 2010, 1 sheet.
Frequently asked questions, Evolve Bank & Trust, www.insureddepositsonline.com/content/view/38/120/, Jan. 15, 2010, 3 pgs.
Strategic Partners, Insured Deposit Program, Evolve Bank & Trust, www.insureddepositsonline.com/content/view/37/114/, Jan. 15, 2010, 1 sheet.
Who the program Benefits, Insured Deposit Program, Evolve Bank & Trust, www.insureddepositsonline.com/content/view/43/115/, Jan. 15, 2010, 1 sheet.
How the program works, Insured Deposit Program, Evolve Bank & Trust, www.insureddepositsonline.com/content/view/47/112/, Jan. 15, 2010, 1 sheet.
This new bank is over 80 years old, Insured Deposit Program, Evolve Bank & Trust, www.insureddepositsonline.com/content/view/44/116/, Nov. 2, 2009, 1 sheet.
Temporary liquidity guarantee program, Evolve Bank & Trust, www.getevolved.com/index.php?option=com_content&task=view&id=67&itemid=263, Nov. 2, 2009, 1 sheet.
Contact us, Insured Deposit Program, Evolve Bank & Trust, www.insureddepositsonline.com/content/view/40/119/, Nov. 2, 2009, 1 sheet.
How the program works, Insured deposit program, Evolve Bank & Trust, www.insureddepositsonline.com/content/view/47/112/, Nov. 4, 2009, 11 pgs.

Insured deposit online, The Insured Deposit Program, Evolve Bank & Trust, retrieved from internet Apr. 3, 2009; 2 sheets.
Insured deposit online, Frequently asked questions, Evolve Bank & Trust, www.insureddepositsonline.com/content/section/3/71, May 14, 2009, 3 pgs.
Insured deposit online, The Insured Deposit Program, Evolve Bank & Trust, Apr. 3, 2009, 2 pgs.
Personal Banking, Insured Deposit Program, Pulaski Bank, www.pulaskibankstl.com/personal/checking-personalinsured.htm, Jan. 26, 2010, 1 sheet.
Personal Banking, Insured Deposit Program, Pulaski Bank, www.pulaskibankstl.com/personal/currentrates.htm, Jan. 26, 2010, 2 sheets.
Personal Banking, Insured Deposit Program, Pulaski Bank, www.pulaskibankstl.com/personal/checking-personalinsured.htm, Dec. 8, 2009, 1 sheet.
Personal Banking, Insured Deposit Program, Pulaski Ban, www.pulaskibankstl.com/personal/checking-personalinsured.htm, May 14, 2009, 1 sheet.
Total Bank Solutions, Deposit Institutions, www.totalbanksolutions.com/deposit.cfm, Jan. 15, 2010, 2 sheets.
Total Bank Solutions, Insured Deposit Program, www.totalbanksolutions.com/insured-deposit.cfm, Jan. 15, 2010, 3 pgs.
Total Bank Solutions, Source Institutions, www.totalbanksolutions.com/source.cfm, Jan. 15, 2010, 3 pgs.
Total Bank Solutions, FAQs, www.totalbanksolutions.com/faqs.cfm, Jan. 15, 2010, 2 sheets.
Total Bank Solutions, Insured Deposit Program, TBS overview, www.totalbanksolutions.com/overview.htm, Nov. 3, 2009, 1 sheet.
Total Bank Solutions, Insured Deposit Program, Total Bank Solutions, www.totalbanksolutions.com, Nov. 3, 2009, 1 sheet.
Total Bank Solutions, Insured Deposit Program, Bank Sweep Program, www.totalbanksolutions.com/insured-deposit.cfm, Jan. 15, 2010, 3 pgs.
Total Bank Solutions, Insured Deposit Program, Bank Sweep Program, www.totalbanksolutions.com/banksweep.htm, Nov. 3, 2009, 2 sheets.
Total Bank Solutions, Insured Deposit Program, Brokerage Sweeps, www.totalbanksolutions.com/brokersweep.htm, Nov. 3, 2009, 2 sheets.
Total Bank Solutions, Insured Deposit Program, Deposits, www.totalbanksolutions.com/Deposits.htm, Nov. 3, 2009, 1 sheet.
Total Bank Solutions, Insured Deposit Program, Bank Sweep Program, www.totalbanksolutions.com/banksweep.htm, Mar. 6, 2009, 2 sheets.
Total Bank Solutions, Insured Deposit Program, Broker Sweep Program, www.totalbanksolutions.com/brokerweep.htm, Mar. 6, 2009, 2 sheets.
Total Bank Solutions, Insured Deposit Program, Deposit, www.totalbanksolutions.com/deposit.htm, Mar. 6, 2009, 2 sheets.
Total Bank Solutions, Insured Deposit Program, www.totalbanksolutions.com, Mar. 6, 2009, 2 sheets.
Total Bank Solutions, Insured Deposit Program, Partners & Affiliates, www.totalbanksolutions.com/partners.htm, Sep. 11, 2009, 2 sheets.
Christopher McCrum, LinkedIn, http://74.125.93.132/search?=cache:5hs9cebUSjgJ:www.linkedin.com/pub/christopher-mccrum/ . . . , Nov. 2, 2009, 2 sheets.
Kentucky Bankers Association, Alternative for excess deposit coverage FREE Webiners, http://209.235.145/cgi-bin/websuite/tcsassnwebsuite.pl? . . . , Nov. 2, 2009, 2 sheets.
Kentucky Bankers Association Detailed listening, http://member.kybanks.com/source/members . . . , Nov. 2, 2009, 1 sheet.
Letter from Ballard W. Cassady, Jr. President and Chief Executive Officer, Kentucky Bankers Association, Mar. 31, 2009, 1 sheet.
Oklahoma bankers association seeks extra security for deposits, http://findarticles.com/p/articles/mi_qn4182/is_20081128/ai_n31055289/, Nov. 2, 2009, 2 sheets.
Deutsche Bank, Deutsche Bank insured deposit program, retrieved from internet Dec. 18, 2009; 3 pgs.
Deutsche Bank Insured Deposits, Bank list as of Dec. 18, 2009, 1 sheet.

Letter to Robert E. Feldman, Federal Deposit Insurance Corporation, re: Proposed rule on risk-based assessments (RIN#3064-AD35), Dec. 17, 2008, 4 pgs.
Deutsche Bank Alex. Brown insured deposit program (IDP), Dec. 1, 2009, 10 pgs.
CD's pass agencies as largest holding in MMFs: Repo plunges in sept., www.cranedata.us/archives/news/2009/10/, Nov. 3, 2009, 14 pgs.
Lawsuit by *Island Intellectual Property LLC, Lids Capital LLC, Double Rock Corporation*, and *Intrasweep LLC* against *Deutsche Bank Trust Company Americas*, and *Total Bank Solutions, LLC*, Defendants' Preliminary Invalidity Contentions, Mar. 12, 2010, Civil Action No. 09 Civ. 2675 (VM) (AJP).
Lawsuit by *Island Intellectual Property LLC* and *Intrasweep LLC* against *Institutional Deposits Corp.*, Defendent Institutional Deposit Corp.'s Preliminary Invalidity Contentions, Case No. 09-CV-03079-JEC.
Exhibit 1, Invalidity Chart: IMA and Insurance Plus Service Agreement, U.S. Patent No. 7,509,286, 21 pgs.
Exhibit 2, Invalidity Chart: Investors Money AccountSM System, U.S. Patent No. 7,509,286, 26 pgs.
Exhibit 3, Invalidity Chart: Insured Money Account System, U.S. Patent No. 7,509,286, 26 pgs.
Exhibit 4, Invalidity Chart: U.S. Patent No. 4,985,833 (Oncken), U.S. Patent 7,509,286, 21 pgs.
Exhibit 5, Invalidity Chart: First City Bank of Texas' Insured Savings Program, U.S. Patent No. 7,509,286, 39 pgs.
Exhibit 6, Invalidity Chart: Quest Insured Account, U.S. Patent No. 7,509,286, 19 pgs.
Exhibit 7, Invalidity Chart: CIBC World Markets—Insured Bank Deposit Account, U.S. Patent No. 7,509,286, 16 pgs.
Exhibit 8, Invalidity Chart: Merrill Lynch CMA/ISA Service, U.S. Patent No. 7,509,286, 72 pgs.
Exhibit 9, Invalidity Chart: 1983 Fed Letter, U.S. Patent No. 7,509,286, 16 pgs.
Exhibit 10, Invalidity Chart: Merrill Lynch Banking Advantage Program ("MLBA Program"), U.S. Patent No. 7,509,286, 22 pgs.
Exhibit 11, Invalidity Chart: Merrill Lynch & You + MLBA Information Statement, U.S. Patent No. 7,509,286, 18 pgs.
Exhibit 12, Invalidity Chart: Smith Barney Insured Deposit Account, U.S. Patent No. 7,509,286, 22 pgs.
Exhibit 13, Invalidity Chart: Smith Barney Bank Deposit Program, U.S. Patent No. 7,509,286, 18 pgs.
Exhibit 14, Invalidity Chart: Alliance Insured Account, U.S. Patent No. 7,509,286, 16 pgs.
Exhibit 15, Invalidity Chart: Reserve's American Express Presentation, U.S. Patent No. 7,509,286, 16 pgs.
Exhibit 16, Invalidity Chart: U.S. Patent No. 7,376,606 (Jacobsen), U.S. Patent No. 7,536,350, 6 pgs.
Exhibit 17, Obviousness Combinations Chart, U.S. Patent No. 7,509,286, 351 pgs.
Garton, Thomas W.; Are LLC Banks in the Cards? Stay Tuned; Fredrikson & Byron, P.A.; Jun. 2003; http://www.fredlaw.com/articles/banking/bank_0306_twig.html; 2 pages.
Lawsuit by *Island Intellectual Property LLC* against *Clearview Correspondent Services, LLC, et al.*; Complaint for Patent Infringement; Civil Action No. 1:11-cv-448 (LO/TRJ); Apr. 26, 2011; 56 pages.
Lawsuit by *Island Intellectual Property LLC* against *First Southwest Company*; Complaint for Patent Infringement; Civil Action No. 1:11-cv-00371-UNA; Apr. 26, 2011; 42 pages.
Lawsuit by *Island Intellectual Property LLC* v. *Clearview Correspondent Services, LLC, et al.*; Branch Banking & Trust Company's Answer to Complaint and Counterclaims; Civil Action No. 1:11-cv-448-LO-IDD; Jun. 20, 2011; 13 pages.
Lawsuit by *Island Intellectual Property LLC* v. *Clearview Correspondent Services, LLC, et al.*; Clearview Correspondent Services, LLC's Answer to Complaint and Counterclaims; Civil Action No. 1:11-cv-448-LO-IDD; Jun. 20, 2011; 12 pages.
Lawsuit by *Island Intellectual Property LLC* v. *Clearview Correspondent Services, LLC, et al.*; Scott & Stringfellow, LLC's Answer to Complaint and Counterclaims; Civil Action No. 1:11-cv-448-LO-IDD; Jun. 20, 2011; 12 pages.
Lawsuit by *Island Intellectual Property LLC* v. *First Southwest Company*; First Southwest Company's Answer to Complaint and Counterclaims; Civil Action 1:11-cv-371-SD; Jun. 20, 2011; 11 pages.
Lawsuit by *Island Intellectual Property LLC, et al.* v. *Deutsch Bank Trust Company Americas, et al.*; Defendant Deutsche Bank Trust Company Americas' Second Supplemental Responses to Double Rock's Interrogatories Nos. 2, 8 and 9, Jul. 2010, 65 pages.
Exhibit 2, Invalidity Chart: U.S. Pat. No. 4,985,833 (Oncken)—U.S. Pat. 7,668,771, Jul. 2010, 14 pages.
Exhibit 5, Invalidity Chart: Merrill Lynch Business Advantage Program—U.S. Pat. No. 7,668,772, Jul. 2010, 7 pages.
Exhibit 8, Invalidity Chart: Harken Financial Services Sweep Product—U.S. Pat. No. 7,668,771, Jul. 2010, 9 pages.
Exhibit 9, Invalidity Chart: Wayne Hummer—Insured Bank Deposit Program—U.S. Pat. No. 7,668,771, Jul. 2010, 12 pages.
Exhibit 10, Invalidity Chart: U.S. Patent Application Publication No. 2007/0043666 (Burdette), U.S. Pat. No. 7,668,771, Jul. 2010, 9 pages.
Letter to R.M. Zaitzeff, from W.W. Wiles, dated Jun. 22, 1983 (response to May 10, 1983 letter re: offering of MMDAs), 6 pages.
Letter to G.T. Schwartz, from O.I. Ireland, dated Jun. 22, 1988 (response to Dec. 18, 1987 letter re: proposed modifications to Merrill Lynch's CMA Program), 5 pages.
Information Statement, "Alliance Insured Account," Sep. 1999, 6 pages.
Investors MoneyAccountSM and Insurance Plus Service Agreement, attached Schedule A (List of Banks Participating in the Insurance Plus Service), IMAD Mar. 1994, 3 pages.
Investors Money AccountSM (an FDIC-insured money market account), IMA-1 (Mar. 1994), 4 pages.
Investors MoneyAccountSM, "The FDIC-Insured Money Market Investment with an Important Plus," IMA Oct. 1995, 2 pages.
1985 SEC No-Act. LEXIS 2756, Investment Company Act of 1940—Section 3(a)(1), 2(a)(36): Securities Act of 1933—Section 2(1), Nov. 29, 1985, Kemper Financial Services, Inc., 9 pages.
Insured Money Account Program Agreement and Disclosure Statement, (attached Schedule A—Deposit Account Terms), faxed Mar. 28, 2000; 10 pages.
First National Bank in Brookings, Certificates of Deposit [online] [retrieved on Jul. 17, 2009]. Retrieved from the Internet: Certificates of Deposit, <URL: http://web.archive.org/web/20000524121111/www.firstnb.com/cd.htm>; Multi-Bank CDs, <URL: http://web.archive.org/web/20000524132934/www.firstnb.com/mbcd.htm>, 5 pages.
Summary of Commentary on Current Economic Conditions by Federal Reserve Districts, Jan. 1985, 44 pages.
12 CFR Ch. II (Jan. 1, 2009 Edition), pp. 124-125.
Product Strategy, "Money Fund $$ Moving to Bank Deposits, Distributors Start to Install Bank Deposit Accounts to Replace Money Funds," 6 FRC Monitor, Dec. 2003, 2 pages.
Board of Governors of the Federal Reserve System, "The May 1998 Senior Financial Officer Survey," May 1998, (attached Appendix A: Survey Questions and Responses; Appendix B: Glossary; Appendix C: Examples of Key Reserve Concepts), 48 pages.
Interest Rate Review, A Publication of the Meyer Weekly Interest Rate Survey, "A Look at Tiers," Apr. 1987, 6 pages, vol. 11, No. 4.
LexisNexis, The American Banker, "Merrill Joins Money Market Account, CMA; Broker Begins Testing With 12 Institutions," Sep. 23, 1983, 4 pages.
Bent et al., Office Action, U.S. Appl. No. 10/071,053, with attached SB08, date considered Mar. 10, 2009, 2 pages.
Merrill Lynch & You, "Financial Services the Way You Want, When You Want Them," Jan. 2000, 16 pages.
Exhibit 1, "FA/FB Account 1997 First Transactions, TRX Types: PU, PP, TA, PT," Aug. 2003, p. 1-2.
Advertisement: Where Your Interest is?, Mutual Funds, Oct. 1997; 1 page.
Advertisement: It's 1997, Do You Know Where Your Interest Is?, Mutual Funds, Dec. 1993, p. 46.
USPTO Office Action, Interview Summary, U.S. Appl. No. 11/767,827, Date Mailed Sep. 23, 2009, 4 pages.
USPTO Office Action, Office Action Summary, U.S. Appl. No. 11/767,827, Date Mailed Jun. 5, 2009, 35 pages.

Service Mark Application, Applicant: Reserve Management Corporation, Mark: Reserve Insured Deposits, (attached Power of Attorney, Declaration, Drawing Page, Sep. 21, 2001, 6 pages.
Letter to C.R. Macedo, from R.L. Rainey, Re: Promontory Interfinancial Network, LLC, dated Jul. 22, 2008, (attached Attachments A-E), 35 pages.
Letter to C.R. Macedo, from R.L. Rainey, Re: Promontory Interfinancial Network, LLC, dated Oct. 16, 2008, (attached Attachments A-C), 22 pages.
Letter to C.R. Macedo, from R.L. Rainey, Re: Promontory Interfinancial Network, LLC, dated Feb. 23, 2009, (attached Exhibit A-B), 21 pages.
Merrill Lynch & Co., Inc., Form 10-K405 (Annual Report (Regulation S-K, item 405)), Filed Mar. 14, 2002 for the Period Ending Dec. 28, 2001, 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
Information Statement, "Quest Insured Account," (attached Appendix A), 5 pages. Assume 2010 or earlier. For purposes of prosecution, the Examiner should assume that these references are prior art, but Applicants reserve the right to challenge the prior art atatus of the references in litigation.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit ProgramSM, (attached Q&A: Important Information about the New Salomon Smith Barney Bank Deposit Program), Aug. 16, 2002, 14 pages.
FDIC, FDIC Law, Regulations, Related Acts—4000—Advisory Opinions, Oct. 22, 1987, J. W. Via, Jr., Counsel [online] [Retrieved on Jan. 22, 2010]. Retrieved from the Internet: URL: <http://www.fdic.gov/regulations/law/rules/4000-2560.html>, 1 page.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <http://www.fdic.gov/regulations/laws/rules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/laws/rules/4000-2120.html#fdic400086-21>, 2 pages.
Merrill Lynch—Pierce, Fenner & Smith, Inc., "The Merrill Lynch Cash Management Account®," Financial Service, Jan. 1985, 18 pages.
Merrill Lynch, "Insured Savings™ Account Fact Sheet," The Merrill Lynch Cash Management Account® Financial Service, 1987; 11 pages.
CMA, "A Guide to Your CMA Account," Jan. 1995, 38 pages.
American Banker, Salomon's Sweep Plan Raises FDIC Fund Alarm [online], Dec. 6, 2000 [retrieved on Apr. 13, 2009]. Retrieved form the Internet: <URL: http://www.americanbanker.com/printthis.html?id=2000120603YJGEZD>, 2 pages.
The Insured Deposit Account: "Money in the Bank," p. 5; Three Little Letters. Three Big Ways to Save in 1998, p. 4.
LexisNexis, The American Banker, Sep. 23, 1983, Merrill Joins Money Market Account, CMA; Broker Begins Testing With 12 Institutions, Byline: A. Arvan, 4 pages.
Merrill Lynch & Co Inc—MER, 10k Wizard, Form 8-K, "Report of Unscheduled Material Events or Corporate Changes," Filed Mar. 7, 2002, 51 pages.
Federal Reserve System, LEXSEE 51 FR 9632, "Definition of Deposit and Technical Amendments," Action: Final Rule, Mar. 20, 1986, 13 pages.
Federal Reserve System, LEXSEE 56 FR 15494, "Regulation D—Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II (Jan. 1, 2010 Edition), pp. 94-128, Pt. 204-Pt. 205.

Letter to G.T. Schwartz, from O.I. Ireland, dated Jun. 22, 1988, Re: response to letter of Dec. 18, 1987 regarding proposed modifications to Merrill Lynch's CMA Program, 5 pages.
Federal Reserve System, LEXSEE 47 FR 55207, "Reserve Requirements of Depository Institutions; Money Market Deposit Account," Dec. 8, 1982, Action: Final Rule, 5 pages.
Insured Bank Deposits™ Program Summary Information Statement, Feb. 2005; 11 pages.
Insured Bank Deposits™ Program Information Statement, (attached List of Eligible Program Banks, Effective May 9, 2002; New Account Application, Joint Account Agreement), 11 pages.
Wayne Hummer Investments, "Insured Bank Deposits™ Program, Frequently Asked Questions," 4 pages. Assume 2002 or earlier. For purposes of prosecution, the Examiner should assume that these references are prior art, but Applicants reserve the right to challenge the prior art status of the references in litigation.
Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Correspondent Agreement," including Exhibits A-D, 1989; 28 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachments), 8 pages.
Merrill Lynch, Insured Savings Account Fact Sheet, The Merrill Lynch Cash Management Account® Financial Service, Jan. 1986, 4 pages.
Merrill Lynch Money Markets, Inc., Merrill Lynch Capital Markets, "The Insured Savings Account, Issuer Guide to Offering MMDAs through Merrill Lynch," Sep. 1986; 36 pages.
Merrill Lynch, The Merrill Lynch Capital BuilderSM Account Financial Service, Insured SavingsSM Account Participating Depository Institutions, 1996, 2 pages.
Insured Deposit Account, May 21, 1996, 14 pages.
An Introduction to the Smith Barney Insured Deposit Account, Sep. 1995; 8 pages.
Smith Barney Inc. Capital Markets, Debt Origination Group Memo, to Mandelbaum, from T. Hamilton, cc: R. Holloman, H. Bald, S. Becton, Re: Insured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Description for the Investor, Draft as of Sep. 20, 1995, 8 pages.
*Island Intellectual Property LLC et al.* v. *Deutsche Bank AG, et al.*; Memorandum and Order; Case 1:09-cv-02675-KBF; Doc. 289; Feb. 14, 2012; pp. 1-28.
*Island Intellectual Property LLC et al.* v. *Deutsche Bank AG, et al.*; Order; Case 1:09-cv-02675-KBF; Doc. 221; Feb. 14, 2012; pp. 1-34.
*Island Intellectual Property LLC et al.* v. *Deutsche Bank Trust Company Americas, et al.*; Declaration of Charles R. Macedo 2 in support of Plaintiffs' motions in limine Nos. 4-6; Case 1:09-cv-02675-KBF; Doc. 260; Feb. 3, 2012; pp. 1-3 and Exhibits.

*Island Intellectual Property LLC et al.* v. *Deutsche Bank Trust Company Americas, et al.*; Defendants' opposition to Plaintiffs' motion in limine #3 to preclude defendants' expert Richard T. Powers from testifying that the Merrill Lynch CMA/ISA product includes omnibus accounts. Case 1:09-cv-02675-KBF; Doc. 269; Feb. 6, 2012; pp. 1-18.

*Island Intellectual Property LLC et al.* v. *Deutsche Bank Trust Company Americas, et al.*; Defendants' opposition to Plaintiffs' motion in limine #4 to preclude evidence and argument regarding Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.

*Island Intellectual Property LLC et al.* v. *Deutsche Bank Trust Company Americas, et al.*; Memorandum and Order; Case 1:09-cv-02675-KBF; Doc. 265; Feb. 6, 2012; pp. 1-22.

*Island Intellectual Property LLC et al.* v. *Deutsche Bank Trust Company Americas, et al.*; Plaintiffs' brief in support of their motion in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.

*Island Intellectual Property LLC et al.* v. *Deutsche Bank Trust Company Americas, et al.*; Plaintiffs' memorandum of law in support of motion in limine #4 to preclude evidence and argument regarding Plaintiffs' confidential Oct. 18, 2000 presentation to American Enterprises Investment Services at trial; Case 1:09-cv-02675-KBF; Doc. 262; Feb. 6, 2012; pp. 1-10.

*Island Intellectual Property LLC et al.* v. *Deutsche Bank Trust Company Americas, et al.*; Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 3, 2012; pp. 1-10.

*Island Intellectual Property LLC et al.* v. *Deutsche Bank Trust Company Americas, et al.*; Plaintiffs' Notice of Motion and Motion in Limine #3 to preclude Defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF, Doc. 246; Jan. 30, 2012; pp. 1-2.

*Island Intellectual Property LLC et al.* v. *Deutsche Bank Trust Company Americas, et al.*; Plaintiffs' notice of motion and motion in limine #3 to preclude testimony of Gilbert Schwartz; Case 1:09-cv-02675-KBF; Doc. 259; Feb. 3, 2012; pp. 1-2.

*Island Intellectual Property LLC et al.* v. *Deutsche Bank Trust Company Americas, et al.*; Plaintiffs' notice of motion and motion in limine #4 to preclude evidence and argument regarding Plaintiffs' confidential Oct. 18, 2000 presentation to American Enterprises Investment Services at trial; Case 1:09-cv-02675-KBF; Doc. 256; Feb. 3, 2012; pp. 1-2.

Knight-Ridder; Money Matters, Tips you can use—Limits Apply as FDIC Insurance Covers Depositor, Not Account; Chicago Tribune; Feb. 4, 1998; 2 pages.

Lawsuit by *Island Intellectual Property LLC et al.* v. *Deutsche Bank Trust Company Americas et al.*; Joint Statement of Claims and Defenses to be Presented at Trial Set for Feb. 27, 2012; Jan. 16, 2012; Case 1:09-cv-02675-KBF (Document 227).

Lawsuit by *Island Intellectual Property LLC, et al.* v. *Deutsche Bank Trust Company Americas et al.*; Declaration of Olivia M. Kim in Support of Defendants' Motion for Summary Judgement of Invalidity Under 35 U.S.C. § 101; Oct. 6, 2011; Case 1:09-cv-02675-VM, Document 197.

Lawsuit by *Island Intellectual Property LLC, et al.* v. *Deutsche Bank Trust Company Americas, et al.* Plaintiffs' Memorandum of Law in Opposition to Defendants' Motion for Summary Judgement of Invalidity Under 35 U.S.C. § 101; Nov. 2, 2011; Case 1:09-cv-02675-VM, Document 201.

Lawsuit by *Island Intellectual Property LLC, et al.* v. *Deutsche Bank Trust Company Americas, et al.*; Defendants Reply in Support of Their Motion for Summary Judgment of Invalidity Under 35 U.S.C. § 101; Nov. 15, 2011; Case 1:09-cv-02675-VM, Document 208.

Lawsuit by *Island Intellectual Property LLC, et al.* v. *Deutsche Bank Trust Company Americas, et al.*; Defendants' Response to Plaintiffs' Statement of Additional Material Facts in Support of Plaintiffs' Opposition to Defendants' Motion for Summary Judgment of Invalidity Under 35 U.S.C. § 101; Nov. 15, 2011; Case 1:09-cv-02675-VM, Document 209.

Lawsuit by *Island Intellectual Property LLC, et al.* v. *Deutsche Bank Trust Company Americas, et al.*; Order; Dec. 7, 2011; Case 1:09-cv-02675-VM, Document 212.

Lawsuit by *Island Intellectual Property LLC, et al.* v. *Deutsche Bank Trust Company Americas, et al.*; Special Master's Report and Recommended Decision on Defendants' Summary Judgement Motion of Invalidity Under 35 U.S.C. § 101; Dec. 19, 2011.

Lawsuit by *Island Intellectual Property LLC, et al.* v. *Deutsche Bank Trust Company Americas, et al.*; Supplemental Declaration of Olivia M. Kim in Support of Defendants' Opening and Reply Claim Construction Briefs; Nov. 15, 2011; Case 1:09-cv-02675-VM, Document 207.

Martens, Don W.; letter to Hon. Victor Marrero re. supplement to letter of Nov. 28, 2011 on tentative rulings on claim construction in *Island Intellectual Property LLC et al.* v. *Deutsche Bank Trust Co., et al.*; Nov. 28, 2011; Case 1:09-cv-02675-VM; Document 211.

Martens, Don W.; letter to Hon. Victor Marrero re. tentative rulings on claim construction in *Island Intellectual Property LLC et al.* v. *Deutsche Bank Trust Co., et al.*; Nov. 28, 2011; Case 1:09-cv-02675-VM, Document 210.

Announcing Changes in Automatic "Sweep" Investment Options, LPL Financial Services, Linsco/Private Ledger, Member NASD/SIPC, Jun. 26, 2006; 26 Sheets.

Northbrook Bank & Trust Company, Introducing our MaxSafe CD with up to $700,000 of FDIC Insurance, Nov. 12, 2002; 4 Sheets.

Part: 2, Monetary Policy and Reserve Requirements, Subpart—Regulation D, Board Interpretations of Regulation D, Transaction Accounts—Linked to Time Deposits, vol. 1, Federal Reserve Regulatory Service, Mar. 1994; 2 Sheets.

Reserve Management Corporation, Reserve Insured Deposits, U.S. Appl. No. 76/315,600, Sep. 21, 2001; Issued The Unmatched Sweep Solution From The Cash Management Expert, 1999; 2 Sheets.

Waddell, "Sweeping Clean, " Advisor, The Advisor to Advisor, Oct. 2001; 2 Sheets.

First City, Texas Insured Savings Agency Agreement with Exhibits A-B and Insured Savings Program, 1996 or earlier; 10 pgs.

Insured Savings Remote Site Sweep Procedures, 1996 or earlier; 3 pgs.

Insured Savings Balance Limits form, 1996 or earlier; 1 sheet.

Cash Management Balance Monitoring Agreement Form, 1996 or earlier; 1 sheet.

Investors MoneyAccountSM and Insurance Plus Service Agreement, Schedule A, Mar. 1994; 3 sheets.

Investors Money AccountSM (an FDIC-insured money market account), Apr. 1996; 4 sheets.

Investors MoneyAccountSM The FDIC-Insured Money Market with and Important Plus., Apr. 1996; 2 sheets.

Insured Money Account Program Agreement and Disclosure Statement, Mar. 2000; 11 sheets.

Quest Insured Account, QUESTessentials, May 17, 1994; 3 sheets.

Quest Insured Account, Information Statement, 2002 or earlier; 5 sheets.

The Merrill Lynch Cash Management Account, Financial Service, 1982; 18 pgs.

The Insured Savings Account, Issuer Guide to Offering MMDAs through Merrill Lynch, Jul. 1986; 27 pgs.

i Investment Account Application, Cleared Through Legent Clearing, May 2006; 2 sheets.

Customer Agreement, Cleared Through Legent Clearing, May 2006; 3 pgs.

Terms & Conditions for optionsXpress' Bank Insured Deposit Program, optionsXpress, Oct. 14, 2009; 6 pgs.

The financial organizer, ProCash Plus, Apr. 2007; 12 pgs.

FAQs about the Deutsche Bank insured deposit program, Securities America, Jul. 17, 2009; 3 pgs.

Over $12,5 million of FDIC deposit insurance available, Insured Deposit Program, Deutsche Bank, www.insureddepositsonline.com, Apr. 2009; 1 sheet.

Insured deposit online, Deutsche Bank Insured Deposit Program, list of program banks, retrieved from Internet May 4, 2009; 2 sheets.

Who can benefit from the insured deposit program?, Insured Deposit Program, Pulaski Bank, Apr. 2009; 2 sheets.

Scottrade Bank Deposit Program—Terms, Conditions & Disclosures; Author unknown; Aug. 2011; pp. 1-3.

* cited by examiner

METHOD AND SYSTEM FOR ALLOCATING FUNDS OVER A PLURALITY OF TIME DEPOSIT INSTRUMENTS IN DEPOSITORY INSTITUTIONS

CROSS-REFERENCE TO RELATED PATENT APPLICATIONS

This application is a Continuation of U.S. application Ser. No. 12/953,221, filed Nov. 23, 2010, incorporated herein by reference in its entirety, which claims priority from Provisional Application U.S. Application 61/264,077, filed Nov. 24, 2009, incorporated herein by reference in its entirety.

FIELD OF THE INVENTION

The field of the invention relates generally to administering an allocation of funds for the purchase of time deposit instruments at a plurality of depository institutions and possibly other financial instruments.

SUMMARY OF THE INVENTION

Briefly, in one embodiment, a method is disclosed comprising: accessing, by one or more computers, one or more electronic databases, stored on one or more computer-readable media, comprising: (1) client information for each of a plurality of respective clients, i, comprising information on client funds held through a program in each of a plurality of depository institutions participating in the program, with information for a respective client comprising one or more of the following items: (i) a balance of funds of the client held through the program in each of multiple of the depository institutions holding funds of the respective client; (ii) a distribution percent value, $X_i$, of a given client deposit amount, to be distributed in tranches to each of $N_i$ depository institutions; (2) information for each of multiple government backed-insured aggregated time deposit instruments holding a tranche of client funds, comprising: (i) a rate for the respective aggregated time deposit instrument; (ii) an identification of the depository institution holding the respective aggregated time deposit instrument; (iii) a term of the respective aggregated time deposit instrument holding funds of the respective client; performing the following steps for each client, i, of multiple of the clients: (1) determining, by the one or more computers, a given client available distribution amount, $D_i$, for the respective client, i, comprising funds to be distributed over $N_i$ of the depository institutions for the respective client; (2) determining, by the one or more computers, an amount of a client tranche to be deposited in each of $N_i$ depository institutions based at least in part on the percentage, $X_i$, and the respective client available distribution amount, $D_i$; (3) determining, based at least in part on the percentage $X_i$, a value of $N_i$ depository institutions for the respective client, to distribute the client tranches; (4) allocating, by the one or more computers, respective client tranches to the $N_i$ depository institutions determined for the client, i; generating, by the one or more computers, data for instructions to transfer the respective client tranches and to purchase one or more financial instruments in each of the respective $N_i$ depository institutions, comprising a purchase of one or more aggregated time deposit instruments at multiple of the respective $N_i$ depository institutions; and updating, by the one or more computers, one or more of the electronic databases with update data for each of multiple of the clients, i, with the update data for each of the multiple clients, i, comprising data for respective client tranches transferred or to be transferred to purchase the one or more depository instruments at the respective $N_i$ depository institutions for the client.

In a further embodiment, the aggregated time deposit instruments holding the tranches may comprise one or more selected from the group of bonds, treasury bills, and certificates of deposit.

In a further embodiment, the generating instructions step comprises generating an instruction to transfer at least one of the respective client tranches for purchase for the client at one or more of the $N_i$ depository institutions a different type of depository instrument relative to the time deposit instrument where one or more withdrawals can be made without penalty.

In a yet further embodiment, the method comprises: receiving a request to withdraw an amount of funds for a given one of the clients; and generating, by one or more computers, data for an instruction based at least in part on the amount of the request to withdraw, to be taken from one or more of the different type of depository instrument.

In a yet further embodiment, the different type of depository instrument is an interest-bearing aggregated deposit account holding funds of a plurality of the clients and is insured by the Federal Deposit Insurance Corporation.

In a yet further embodiment, the different type of depository instrument is an aggregated money market deposit account.

In a yet further embodiment, the method comprises: aggregating, by the one or more computers, the respective client tranches of multiple of the different clients into a plurality of respective purchase amounts to purchase respective aggregated time deposit instrument from multiple of the depository institutions; and generating data for instructions to transfer the respective purchase amounts to the respective depository institutions.

In a yet further embodiment, the method comprises: selecting respective client tranches of multiple of the respective clients for aggregation into the respective purchase amounts for purchase of the aggregated time deposit instruments from multiple of the depository institutions based, at least in part, on one or more criteria. In one embodiment, one criterion is that only client tranches from client available distribution amounts, $D_i$, above a threshold amount, are aggregated into the respective purchase amounts for purchase of the aggregated time deposit instruments from the multiple depository institutions. In another embodiment, one criterion is that only client tranches from client available distribution amounts, $D_i$, associated in the one or more databases with a particular source institution are aggregated into the respective purchase amounts for purchase of the aggregated time deposit instruments from the multiple depository institutions. In another embodiment, one criterion is a term requested by the client for the client available deposit amount, $D_i$, meets at least one predetermined criterion.

In a yet further embodiment, the method comprises: purchasing the aggregated time deposit instrument electronically by the one or more computers and via one or more electronic networks.

In a yet further embodiment, the method comprises: receiving an order from a respective one of the depository institutions that is a source institution to distribute one or more client available distribution amounts, $D_i$ of funds of clients of the respective source depository institution, for the purchase of a plurality of aggregated time deposit instruments; wherein the one or more databases further comprise information designating a source depository institution for each of multiple of the respective client available distribution amounts, $D_i$; and wherein the allocating step further comprises: selecting, by the one or more computers, at least one of the depository institutions participating in the program for purchase of one or more aggregated time deposit instruments based, at least in part, on whether or not one or more orders have been received from the respective at least one depository institution to distribute one or more client available distribution amounts, $D_i$, of clients of that respective one depository institution for the purchase of a plurality of aggregated or non-aggregated financial instruments at other of the depository institutions participating in the program.

In a yet further embodiment, the selecting of the at least one depository institution for the purchase of one or more aggregated time deposit instruments is further based, at least in part, on whether a total of the one or more client available distribution amounts, $D_i$, of funds received from the respective at least one depository institution and distributed to other depository institutions in the program, is more than an amount that the respective at least one depository institution has received in client tranches associated with other source institutions participating in the program.

In a yet further embodiment, the method comprises: selecting, by the one or more computers, multiple of the depository institutions in the program for the purchase of one or more aggregated time deposit instruments based, at least in part, on how close a rate and term of an aggregated time deposit instrument available from the respective one depository institution matches a rate promised to the respective client, i; aggregating, by the one or more computers, the respective client tranches of multiple of the different clients into a plurality of respective purchase amounts to purchase respective aggregated time deposit instruments from the multiple respective selected depository institutions; and generating data for instructions to transfer the respective purchase amounts to the respective selected depository institutions.

In a yet further embodiment, the method comprises: selecting, by the one or more computers, at least one of the depository institutions for the purchase of one or more time deposit instruments based, at least in part, on a stability grade rating for the respective at least one depository institution.

In a yet further embodiment, the one or more databases further comprise data on a source institution for each of a plurality of the client available distribution amounts, $D_i$; and further comprising: selecting, by the one or more computers, one or more of the depository institutions for the purchase of one or more aggregated time deposit instruments based, at least in part, on whether the respective depository institution is affiliated with the source institution for one or more of the client available distribution amounts, $D_i$ to be used to purchase the one or more aggregated time deposit instruments; aggregating, by the one or more computers, the respective client tranches of multiple of the different clients into a plurality of respective purchase amounts to purchase respective aggregated time deposit instruments from the multiple respective selected depository institutions; and generating data for instructions to transfer the respective purchase amounts to the respective selected depository institutions.

In a yet further embodiment, the government backed insurance is Federal Deposit Insurance Corporation (FDIC) insurance.

In a yet further embodiment, the method comprises: determining, by the one or more computers, a fee for facilitating purchases of time deposit instruments and other depository instruments based on one or more criteria. In one embodiment, the fee is determined by comparing the client available distribution amount, $D_i$, to thresholds set forth in a tier table.

In a yet further embodiment, the method comprises: determining client eligibility for having a given client available distribution amount, $D_i$, distributed in tranches among $N_i$ depository institutions, based on one or more criteria; aggregating, by the one or more computers, respective client tranches of multiple of the different clients that are determined to be eligible, to form a plurality of respective purchase amounts to purchase respective aggregated time deposit instruments from the multiple respective selected depository institutions; and generating data for instructions to transfer the respective purchase amounts to the respective selected depository institutions. In one embodiment, one criterion comprises whether the client available distribution amount, $D_i$, for a given client equals or exceeds a threshold amount. In another embodiment, one criterion comprises a relationship level with one of the depository institutions.

In yet a further embodiment, the method comprises: reallocating funds of a first client from a respective time deposit instrument to a non-time deposit financial instrument, and allocating funds of a second client to the respective time deposit instrument in place thereof; and withdrawing an amount of the funds of the first client from the non-time deposit financial instrument.

In a yet further embodiment, a system is disclosed, comprising: one or more computers comprising memory wherein the memory stores computer-readable instructions comprising program code that, when executed, cause the one or more computers to perform the steps: accessing, by the one or more computers, one or more electronic databases, stored on one or more computer-readable media, comprising one or more of the following items: (1) client information for each of a plurality of respective clients, i, comprising information on client funds held through a program in each of a plurality of depository institutions participating in the program, with information for a respective client comprising: (i) a balance of funds of the client held through the program in each of multiple of the depository institutions holding funds of the respective client; (ii) a distribution percent value, $X_i$, of a given client deposit amount, to be distributed in tranches to each of $N_i$ depository institutions; information for each of multiple government backed-insured aggregated time deposit instruments holding a tranche of client funds, comprising: (i) a rate for the respective aggregated time deposit instrument; (ii) an identification of the depository institution holding the respective aggregated time deposit instrument; (iii) a term of the respective aggregated time deposit instrument holding funds of the respective client; and performing the following steps for each client, i, of multiple of the clients: (1) determining, by the one or more computers, a given client available distribution amount, $D_i$, for the respective client, i, comprising funds to be distributed over $N_i$ of the depository institutions for the respective client; (2) determining, by the one or more computers, an amount of a client tranche to be deposited in each of $N_i$ depository institutions based at least in part on the percentage, $X_i$, and the respective client available distribution amount, $D_i$; (3) determining, based at least in part on the percentage $X_i$, a value of $N_i$ depository institutions for the respective client, to distribute the client tranches; (4) allocating, by the one or more computers, respective client tranches to the $N_i$ depository institutions determined for the client, i; and generating, by the one or more computers, data for instructions to transfer the respective client tranches and to purchase one or more financial instruments in each of the respective $N_i$ depository institutions, comprising a purchase of one or more aggregated time deposit instruments at multiple of the respective $N_i$ depository institutions; and updating, by the one or more computers, one or more of the electronic databases with update data for each of multiple of the clients, i, with the update data for each of the multiple clients, i, comprising data for respective client tranches transferred or to be transferred to purchase the one or more depository instruments at the respective $N_i$ depository institutions for the client.

In a yet further embodiment, a distribution total percent value, $X_i$, for a first group of depository institutions $N_i$, is obtained, and a distribution total percent value, $Y_i$, for a second group of depository institutions, $M_i$, is obtained, for a respective client. The distribution total percent value, $X_i$, of the client available deposit amount, $D_i$, is to be allocated in tranches among the $N_i$ depository institutions, e.g., $D_i$ times $X_i$, divided by the number of depository institutions, $N_i$. Likewise, the distribution total percent value, $Y_i$, of the client available deposit amount, $D_i$, is to be allocated in tranches among the $M_i$, depository institutions, e.g., $D_i$ times $Y_i$, divided by the number of depository institutions, $M_i$. Note however, that the allocation of the percentage $X_i$ among the depository institutions $N_i$ may be unequal. Likewise, the allocation of the percentage $Y_i$ among the depository institutions $M_i$ may be unequal. Note that various permutations of this concept may be implemented in embodiments of the invention, as described in the specification.

In yet a further embodiment, a program product is disclosed for distributing respective client funds associated with a plurality of respective clients, comprising: at least one computer-readable media having computer-readable program code embodied therein or among them if more than one, to be executed by a computer, for causing one or more computers to perform the method: accessing, by one or more computers, one or more electronic databases, stored on one or more computer-readable media, comprising: (1) client information for each of a plurality of respective clients, i, comprising information on client funds held through a program in each of a plurality of depository institutions participating in the program, with information for a respective client comprising one or more of the following items: (i) a balance of funds of the client held through the program in each of multiple of the depository institutions holding funds of the respective client; (ii) a distribution percent value, $X_i$, of a given client deposit amount, to be distributed in tranches to each of $N_i$ depository institutions; (2) information for each of multiple government backed-insured aggregated time deposit instruments holding a tranche of client funds, comprising: (i) a rate for the respective aggregated time deposit instrument; (ii) an identification of the depository institution holding the respective aggregated time deposit instrument; (iii) a term of the respective aggregated time deposit instrument holding funds of the respective client; performing the following steps for each client, i, of multiple of the clients: (1) determining, by the one or more computers, a given client available distribution amount, $D_i$, for the respective client, i, comprising funds to be distributed over $N_i$ of the depository institutions for the respective client; (2) determining, by the one or more computers, an amount of a client tranche to be deposited in each of $N_i$ depository institutions based at least in part on the percentage, $X_i$, and the respective client available distribution amount, $D_i$; (3) determining, based at least in part on the percentage $X_i$, a value of $N_i$ depository institutions for the respective client, to distribute the client tranches; (4) allocating, by the one or more computers, respective client tranches to the $N_i$ depository institutions determined for the client, i; generating, by the one or more computers, data for instructions to transfer the respective client tranches and to purchase one or more financial instruments in each of the respective $N_i$ depository institutions, comprising a purchase of one or more aggregated time deposit instruments at multiple of the respective $N_i$ depository institutions; and updating, by the one or more computers, one or more of the electronic databases with update data for each of multiple of the clients, i, with the update data for each of the multiple clients, i, comprising data for respective client tranches transferred or to be transferred to purchase the one or more depository instruments at the respective $N_i$ depository institutions for the client.

In a yet further embodiment, a method, system and program product are disclosed, the method comprising: accessing, by one or more computers, one or more electronic databases stored on one or more computer readable media comprising information on client funds held through a program in each of a plurality of depository institutions participating in the program; and information for each of multiple government backed-insured aggregated time deposit instruments holding a tranche of client funds; determining, by the one of more computers, a client available distribution amount, $D_i$, comprising funds to be distributed to multiple of the depository institutions in the program; determining, by the one or more computers, a depository institution number tier, $T_i$, for the client available distribution amount, $D_i$, from among a plurality of tiers based on one or more criteria, wherein each tier has a number, $N_T$, of depository institutions electronically associated therewith or has associated with it a function for the tier for computing electronically the number, $N_T$, of depository institutions; allocating, by the one of more computers, the client available distribution amount, $D_i$, across a number of depository institutions, $N_T$, equal to the number associated electronically with the tier, $T_i$, or determined from a function associated with that tier, $T_i$, so that a respective client portion, $P_i$, of the client available distribution amount, D is allocated to each respective depository institution in the number of depository institutions, $N_T$, in the client's tier, $T_i$; generating, by the one of more computers, data for instructions to transfer funds for the purchase of financial instruments in $N_T$ depository institutions, comprising purchase of interest-bearing aggregated time deposit instruments in multiple of the depository institutions, based at least in part on the number of depository institutions, $N_T$, for the client; and updating, by the one of more computers, one or more of the electronic databases with update data for each of multiple of the clients, i.

The above and related objects, features and advantages of the present invention, will be more fully understood by reference to the following detailed description of the preferred, albeit illustrative, embodiments, of the present invention, when taken in conjunction with the accompanying figures, wherein:

DETAILED DESCRIPTION OF THE EMBODIMENTS

Figure 1:
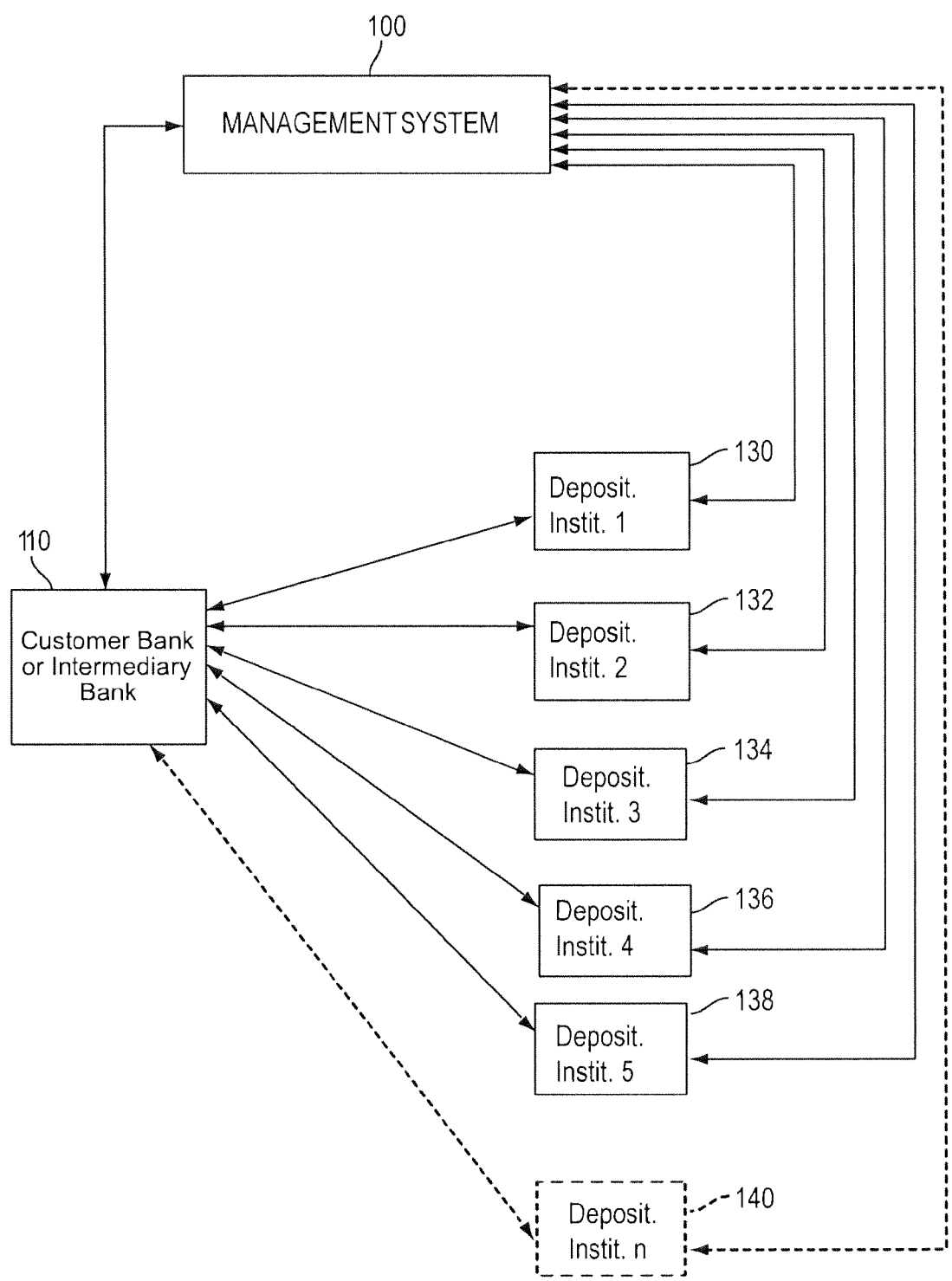
FIG. 1 is a schematic block diagram of one embodiment.

As noted, the field of the invention relates generally to administering an allocation of funds for the purchase of time deposit instruments at a plurality of depository institutions and possibly other financial instruments.

The term "depository institution" means any institution which is authorized to accept deposits and issue certificates of deposit. This would include state and national banks, state and federal savings banks, savings and loan associations, credit unions, and probably some industrial loan companies, depending on current law. Most but not necessarily all, would have government backed-insurance, such as Federal Deposit Insurance Corporation (FDIC) insurance, or the National Credit Union Share Insurance Fund (NCUSIF) for credit unions, or state insurance.

Source institutions of funds to the system may be banks, credit unions, other types of depository institutions, registered investment advisors, broker dealers, asset managers, trust companies, retirement programs, other financial institutions or intermediaries, to name a few. Typically, the source institutions are the institutions that interact with the clients that are placing or authorizing the respective clients' funds to go into and be managed by the system. Note that a source institution can be a clearing institution for one or more other source institutions or an intermediary for other source institutions. These terms will be discussed below.

One or more intermediary institutions may be used to facilitate the movement of funds between the source institution(s) and the depository institution(s) and/or to perform various recordkeeping functions. Such intermediaries may perform record keeping and/or fund transfer functions, and may include a bank or clearance bank through which fund transfers may be facilitated, a clearing firm, an administrator that performs recordkeeping functions and/or provides data to facilitate fund transfers, and/or other entities that perform fund transfer or recordkeeping functions. Note that multiple entities may also fulfill a single function or roll.

With respect to some types of source institutions, the source institution itself may clear its own client accounts or it may use another entity to clear its client accounts. If a source institution is a clearing entity, it may provide clearing services to other source institutions, such as broker-dealers, banks, depository advisors, to name a few. Such entities for which clearing services are performed by another entity are sometimes referred to as "correspondents." Under some guidelines, when a clearing entity is used to clear funds for one or more correspondents, the funds of the clearing entity and the one or more correspondents may be held together in an aggregated account such as an interest-bearing aggregated money market deposit account or an aggregated demand deposit account. In other embodiments, the funds from each different correspondent may be segregated in a separate aggregated account.

In some deposit systems, one entity may play the role of one or more of the above. For example, a source institution, such as a bank, may also be a depository institution. Similarly, a source institution, like a broker-dealer, or a bank, may be affiliated with one or more of the depository institutions.

Further, the administrator may also be either a source institution, a depository institution, a clearance bank, and/or another entity participating in deposit sweep functions. Likewise, a particular program may have one source institution or many source institutions. Similarly, a particular program may have one depository institution or many depository institutions.

The present invention may be used in the context of these or other fund movement systems.

In the description to follow, the term "client account" refers to client funds, such as, for example, consisting of funds of the client designated or determined for management by the deposit management system, to be described.

FIG. 1 discloses an embodiment of the invention, comprising a management system 100, which may be independent from or may comprise or be affiliated with a source institution or a depository institution, managing a program to distribute client funds in tranches across depository institutions to purchase time deposit instruments and other financial instruments. The system 100 purchases or generates data for the purchase of one or more time deposit instruments (which instrument may or may not own in its own name) in each of multiple of depository institutions 130-140. The system 100 may also generate data for a purchase of other financial products.

In one embodiment, the time deposit instruments are individual time deposit instruments held for the respective client, i. In another embodiment, the client tranches from multiple different clients are aggregated to form a plurality of purchase amounts for purchase of time deposit instruments in multiple of the depository institutions.

The amount of the client tranches for a respective client and/or the number of depository institutions used in the distribution is determined in accordance with one or more of the algorithms disclosed herein. In one embodiment, the funds for the purchase of the respective time deposit instruments are aggregated in one or more accounts in one or more intermediary banking institutions 110 to form amounts for the purchase of aggregated time deposit instruments. The one or more accounts in the intermediary banking institution 110 in this embodiment hold funds to be allocated and distributed for purchase of the time deposit instruments held in the depository institutions 130-140, and in some embodiments, one or more other financial products that are not time deposit instruments.

In one embodiment, the intermediary banking institution 110 distributes client funds, based on data from the system 100, to the depository institutions 130-140, to purchase time deposit instruments. In one embodiment, these time deposit instruments are aggregated time deposit instruments holding the funds of a plurality of clients, such as "jumbo CD's." In one embodiment, one or more of these aggregated or non-aggregated interest-bearing time deposit instruments are insured by the Federal Deposit Insurance Corporation (FDIC) or the National Credit Union Share Insurance Fund (NCUSIF) for credit unions, or another insurance entity. In the case of large denomination CD's, the CD's may be in the name of an agent or source institution or another entity as custodian for customers, and pass-through insurance may be available.

In one embodiment, a fee for aggregating client funds for these purchases is determined based on one or more criteria. In one embodiment, one of the criteria may comprise an amount to be deposited, or a cumulative amount deposited over a period of time by the client and/or his/her family and/or friends, relative to a threshold or multiple thresholds set forth in a tier table, or based on a relationship with a depository entity, or an amount invested by a given depository entity with the system, or the type and/or parameters of instrument obtained (term, rate, institution, etc.), to name a few. Where an amount is used as a criterion, the amount may be compared to thresholds set forth in a fee tier table. The system may perform the fee calculation, or may receive a fee amount determined by a third party. Thus, other criteria besides an amount may be used.

Likewise, in one embodiment, whether an opportunity is to be offered to the client to distribute funds in tranches across multiple program depository institutions may be determined based on one or more criteria. For example, in one embodiment, one of the criteria may comprise an amount to be deposited, or a cumulative amount deposited over a period of time by the client and/or his/her family and/or friends, relative to a threshold or multiple thresholds set forth in a tier table, or based on a relationship with a depository entity, or based on an amount invested by a given depository entity with the system, to name a few. Where an amount is used as a criterion, the amount may be compared to thresholds set forth in a tier table. As noted above, other criteria besides an amount may be used, e.g., the type and/or parameters of instrument obtained (term, rate, institution, etc.).

Figure 3:
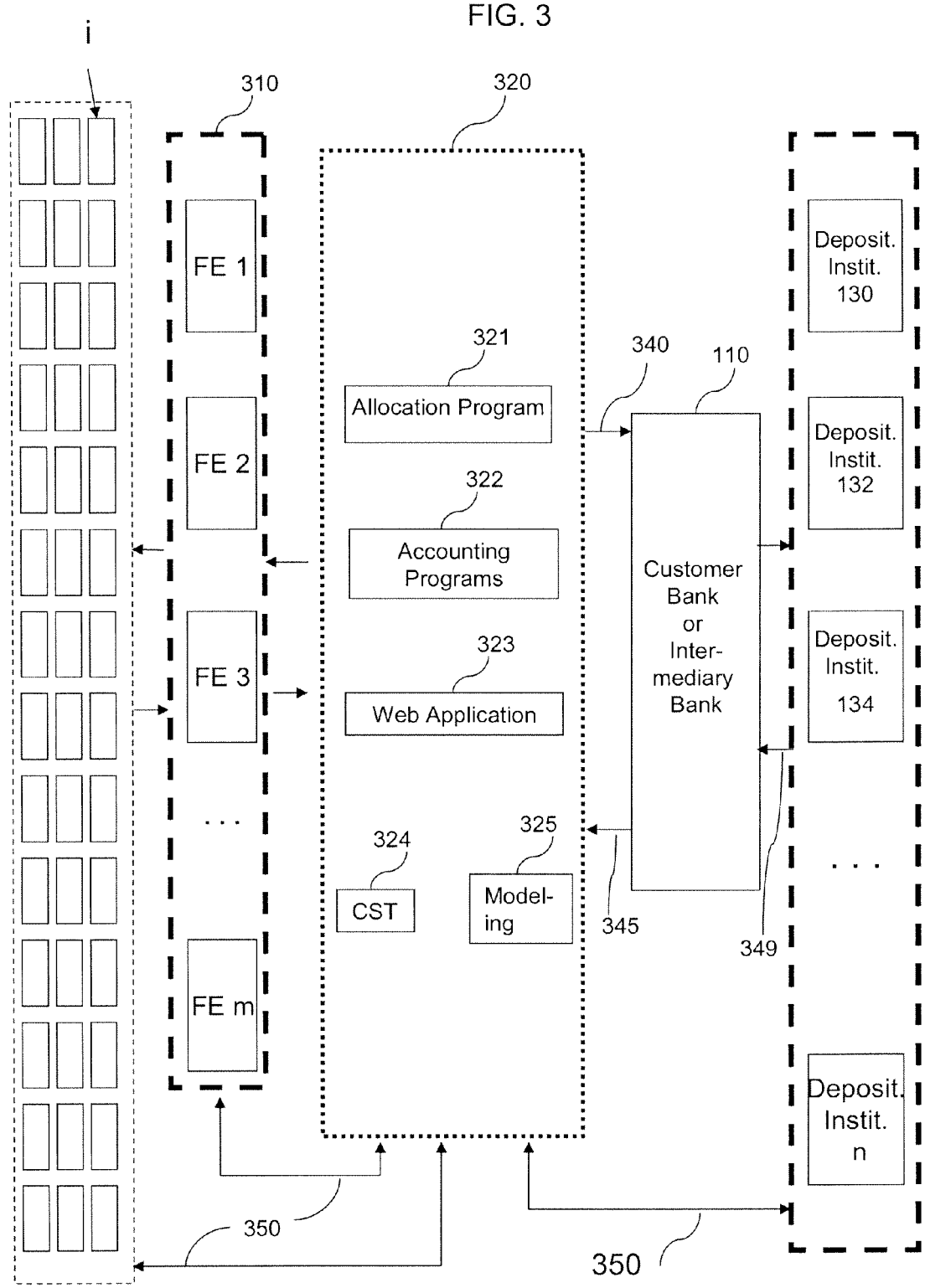
FIG. 3 is a schematic block diagram of a further embodiment.

FIG. 3 illustrates one embodiment of a system consistent with the present invention. The individual clients are represented in the figure by the small blocks i. The respective individual clients, i, may comprise individual investors and/or institutional investors. One or more source institutions, comprising broker dealers, and/or other depository entities, FE 1, FE 2, FE 3, and FE m, represented in block 310, maintain a relationship with these clients, i. The management system 100 and its one or more computers may be represented in FIG. 3 by block 320. The management system computers 320 may be configured with a client fund allocation computer program 321, and an accounting computer program 322 that maintains, in one or more databases, information on the client funds and the depository institutions holding the aggregated or non-aggregated time deposit instruments and other non-time deposit financial instruments, and the movement of funds. In one embodiment, this accounting program 322 may provide individual client accounting functions, sweep functions, and sweep processing based on computer implemented rules. The management system 320 may further comprise one or more web application programs 323. The management system 320 may further comprise, in one embodiment, one or more computer programs 324 for processing and generating combined statements, including monthly, year end and tax statements, programs for broker dealer or other depository entity administrative functions, programs for bank reconciliation processing, and programs for client inquiry processing. The management system 320 may further comprise, in one embodiment, a modeling program 325, for predicting a depository institution capacity for receiving funds based on one or more criteria. Other computer programs run by the management system are referenced in FIG. 5, to be discussed below.

The time deposit instruments may be certificates of deposit, municipal bonds, corporate bonds, treasury bills, and the like, to name a few. Time deposit instruments typically have a specified term and yield rate (or coupon rate) indicating the rate of interest on the principal invested. The rate of interest may be fixed, or may be a variable rate that may change over time, based on one or more criteria. Time deposit instruments may include penalties and other terms and conditions that may affect their liquidity and value. Ownership interest in the time deposit instruments may be prorated so that funds may be aggregated to obtain a large sum of money that can be deposited in one instrument, such as an aggregated certificate of deposit, at a banking institution or other depository institution, and held in a depository service entity's name as agent and on behalf of others, such that FDIC insurance or other applicable government-backed insurance may be available for each individual beneficiary with funds in the instrument up to the FDIC (or other insurance) limit.

FIG. 3 further shows a one customer banking institution or intermediary banking institution 110 that holds one or more control operating accounts. Also shown are a plurality of depository institutions 130, 132, 134 . . . 140. In one embodiment, client available distribution amounts, $D_i$, held in the relationship banking institutions or relationship broker dealers or other relationship source institution 310 for the respective client, are transferred into the one or more control operating accounts maintained in the customer or intermediary banking institution 110. The computers of the system 320 then allocates tranches of the respective client available distribution amounts, $D_i$, based on a percentage algorithm, a fixed amount algorithm, or a tier algorithm, or a combination thereof (to be discussed below), to a plurality of the depository institutions 130-140, and generates and sends data for instructions to have the funds transferred for the purchase of one or more time deposit instruments, at each of multiple of the depository institutions. In one embodiment, other depository products may also be purchased. The arrowed lines 340-349 represent the movement of funds to and from the various entities shown in the figure. The arrowed lines 350 represent a transmission of information on the movement of the funds, including the amount transferred, the timing of the movement, and the interest rate.

In one embodiment, the funds of a given client may be allocated to purchase individual time deposit instruments and in some embodiments, other individual financial instruments, for the respective client. In another embodiment, the transfer of funds into the control operating account from the various source institutions may be aggregated into purchase amounts and used to purchase aggregated time deposit instruments at multiple of the depository institutions. Such an aggregation may be accomplished in a variety of different manners, using a variety of different transfer algorithms or methods. The transfers of funds into the program for the purchase of the time deposit instruments may be ad hoc by the client or by the source institution that maintains a relationship with the individual client. Alternatively, one or more computer-implemented rules may be used by the administrator, or a source institution that maintains a relationship with the individual client, or the client itself, to implement an automatic sweep transfer from respective client for the purchase of time deposit instruments.

Referring again to FIG. 1, in one embodiment, the net transfer to or from one or more of the depository institutions 130-140 may be from one or more control operating accounts 110 held in the source institution having the client relationship, e.g., a depository entity that contains a bank. In another embodiment, the one or more control operating accounts for the transfer may be held in a bank controlled by or associated in some manner with the administrator of the system 100. In another embodiment, the one or more control operating accounts may be held in or on behalf of a deposit interchange entity that operates to distribute deposits across multiple depository institutions.

In one embodiment, one of the depository institutions 130-140 could be the same depository institution that maintains a relationship with one or more of the clients i. Alternatively, one or more of the depository institutions may be affiliated with the source institution maintaining the relationship with the clients. Alternatively, none of the depository institutions may be affiliated with a depository institution or other depository entity that maintains the relationship with the clients. Alternatively, one or more of the depository institutions participating in the program may be affiliated with the source institution maintaining the relationship with the clients, and one or more of the depository institutions may be non-affiliated with respect to the source institution. Alternatively, none of the depository institutions may be affiliated with the source institution maintaining the relationship with the clients.

In one embodiment, in order to obtain liquidity for funds of clients held in time deposit instruments, an exchange may be implemented wherein new funds received from other clients for investment in time deposit instruments may be used to offset all or a part of the amounts of one or more clients requesting withdrawal of funds from these time deposit instruments. The attribution of ownership of the funds in these time deposit instruments is then changed electronically in one or more databases to reflect this new ownership. The amount that can be withdrawn by a given client may be limited to the amount of incoming funds of other clients available for offset. Alternatively or in addition, funds can be obtained from another source or account that is not a time-deposit instrument, to accommodate the full withdrawal request. In one embodiment designed to accommodate liquidity, a certain amount of client funds may be placed in a non-time deposit depository product, such as for example, an aggregated money market deposit account holding funds of multiple clients. The funds in this other depository product may be used to offset withdrawals without penalty.

In one embodiment, an amount or percentage of liquidity provided for a given client may be determined based on one or more criteria, such as for example, a total amount of client funds held in the system, a stability of the client's funds held in the system determined over a period of time (e.g., an average or median held over the period of time in relation to one or more thresholds), an amount of a given client available distribution amount, $D_i$, relative to a threshold, a total amount of funds held with a given depository entity by family and/or friend accounts, a total amount held with the system by a given source institution, such as a broker dealer, a length of a client relationship with a given source institution, to name a few.

In an embodiment, the control operating account 110 is used to send tranches, determined by the system computers 100, from an individual client available distribution amounts, $D_i$, to a plurality of the depository institutions 130-140, to be aggregated in the respective depository institutions to form respective purchase amounts for the purchase of aggregated time deposit instruments in the respective depository institutions. In another embodiment, the system computers are used to form tranches of the individual clients amounts, $D_i$, and then to aggregate the tranches from a plurality of the clients, to form a respective purchase amount, for each of multiple of the depository institutions, for the purchase of at least one time deposit instrument in each of a plurality of the respective depository institutions. Instructions are then generated to transfer or have transferred these respective purchase amounts to the respective depository institutions to make the purchase of the respective aggregated time deposit instruments. In one embodiment, the system computers, may actually perform the purchase operations.

The control operating account 110 may be registered in the name of the agent or source institution for the exclusive benefits of its deposit clients. The control operating account 110, in one embodiment, may, but need not be, be zeroed, e.g., all or substantially all of the funds therein transferred out at one or more specific times of the day, or periodically, such as every hour, every few hours, every day, or every few days, or zeroed after the amount held therein reaches or exceeds a threshold amount. A database is updated to reflect these funds transfers.

In one embodiment, for each program with each different source institution (e.g., broker dealer), a separate set of aggregated time deposit instruments may be purchased by or for the administrator computers in a plurality of the depository institutions 130-140. In another embodiment, client funds from different programs of the same source institution or different depository entities may be commingled and aggregated to form purchase amounts for the purchase of a plurality of the aggregated time deposit instruments. Thus, in one embodiment, each broker dealer (an example of a source institution) can establish a separate program with the administrator computers to allocate funds from its respective clients into separate aggregated time deposit instruments, designated for that broker dealer, in multiple of the depository institutions 13-140. In another embodiment, the funds from client accounts of a plurality of broker dealers can be aggregated into a single set of aggregated time deposit instruments in multiple of the depository institutions.

In some embodiments, the management system 100 may maintain some or all of the account information for each of the source institutions in one or more databases within its own system. Alternatively, one or more third parties may maintain some or all of the account information in one or more databases maintained. The management system 100 may report balances and other data with respect to client funds (listed in the database as a client account for the respective client), and amounts distributed in tranches for the purchase of the aggregated time deposit instruments and possibly other financial instruments, to the depository institutions holding the instruments, and/or to an originating source institution, e.g., broker dealer, that maintains the client relationship, or to the clients themselves. May maintain some information, all information, or no information.

In one embodiment, a process is disclosed that operates electronically to assign fund amounts to the depository institutions based on various rules, such as fitting within a maximum depository institution cap, and/or a minimum depository institution cap for a respective depository institution, and/or based on reciprocity issues to be discussed, or to obtain matching rates, or yields, or based on geographic regions, or terms of time deposit, and/or the availability of pass-through insurance.

The inventions relates to a plurality of embodiments for distributing tranches of client available distribution amounts, $D_i$, for the purchase of time deposit instruments and possibly other financial products in a plurality of depository institutions. In one embodiment, tranches of multiple clients are aggregated to form a purchase amount for a time deposit instrument, i.e., an aggregated time deposit instrument. The parameters for the formation and the distribution of client tranches may be selected by the respective client, or by the administrator, or automatically, based on one or more criteria. Examples of the parameters for the tranches comprises the number of depository institutions to which to transfer the tranches, and/or a percentage or other amount determining algorithm to be applied to the client available distribution amount, $D_i$, to determine the amount of the tranche. Other parameters for the distribution may comprise a term or rate or yield of the time deposit instruments and/or other financial instruments available from various depository institutions.

As noted, in one embodiment, a selection option for one or more of the tranche parameters is provided to the client. The tranche parameters may comprise a number of depository institutions for the distribution of the tranches, and/or a percentage of the client available distribution amounts, $D_i$, to be distributed in tranches to each of multiple of the depository institutions for the purchase of time deposit instruments and other financial products, the client percentages, $X_i$ and $Y_i$ for distribution, a term for the term deposit instrument, an interest rate for the term deposit instrument, a selection of other financial instruments, e.g., money market deposit accounts (MMDA's), demand deposit account (DDA's), NOW accounts, mutual funds, a particular set of depository institutions, a particular set of depository institutions for time deposit instruments and another set for different financial instruments, from which to choose for some percentage of the client's funds. In one embodiment, the selection option is only provided to the respective client if one or more criteria are met. The one or more criteria may comprise, an amount in a given client account, a composite amount held in a plurality of different accounts associated with the client, e.g., friends and/or family, for example, a number of the years the client has maintained a given relationship with a source institution, to name a few. A selection option for tranche parameters may be presented to the client electronically, for example, through an online portal in an Internet banking client application, or via an email communication, which, in one embodiment, may include a Web link. The Web link, if clicked, opens an interface that allows the client to select one or more parameters as described. The selection option for tranche parameters may also be presented to the client by mail or may be obtained by facsimile or by telephone or other means and keyed into the system.

After the client available distribution amount, $D_i$, has been obtained, then tranches thereof may be determined using an algorithm. In one embodiment, the algorithm comprises calculating or having calculated or otherwise determining a given percentage $X_i$ of the client available distribution amount, $D_i$. In another embodiment, the algorithm comprises using a set amount of the client available distribution amount, $D_i$, for each tranche, which amount is less than or more than the FDIC insurance limit, or other insurance limit, to each of $N_i$ depository institutions, where $N_i$ is all or a subset of the N depository institutions in a given program. This subset of depository institutions for the distribution may be determined, in one embodiment, based on the available distribution amount, $D_i$, and the allocation percentage. If there is a remainder amount after this allocation of tranches to the $N_i$ depository institutions, then an allocation may be made of this remainder amount across each of one or more of $M_i$ depository institutions (a subset of the depository institutions N), with the number of remainder depository institutions determined for the given client account, in one embodiment, based on the remainder amount for the given client account. In a further embodiment, the number of depository institutions $N_i$ for the distribution of tranches of the client available distribution amount, $D_i$, is based on tiers, selected based on one or more criteria, such as a balance in the client account representing client funds administered by the program, relative to one or more thresholds, or a composite of funds held in accounts of the client's family or friends, or an overall relationship with the client, or a broker-dealer or banking institution relationship, to name a few, relative to one or more threshold amounts. Other parameters used to determine the number of depository institutions and to select particular depository institutions for the distribution of tranches, may comprise a term and rate and yield of the time instruments available from the various depository institutions, and the locations of the various depository institutions.

Note that although embodiments of the invention to be described herein are designed to use tranches to purchase a plurality of time deposit instruments, as noted above, one or more of the tranches may also be used to purchase other financial products, such as money market deposit accounts, NOW accounts, money funds, securities, bonds, that may or may not have government backed insurance. These other financial products may be purchased with the individual tranches. Alternatively, the tranches of multiple clients may be aggregated to form purchase amounts for the purchase of such other aggregated financial products.

Figure 4:
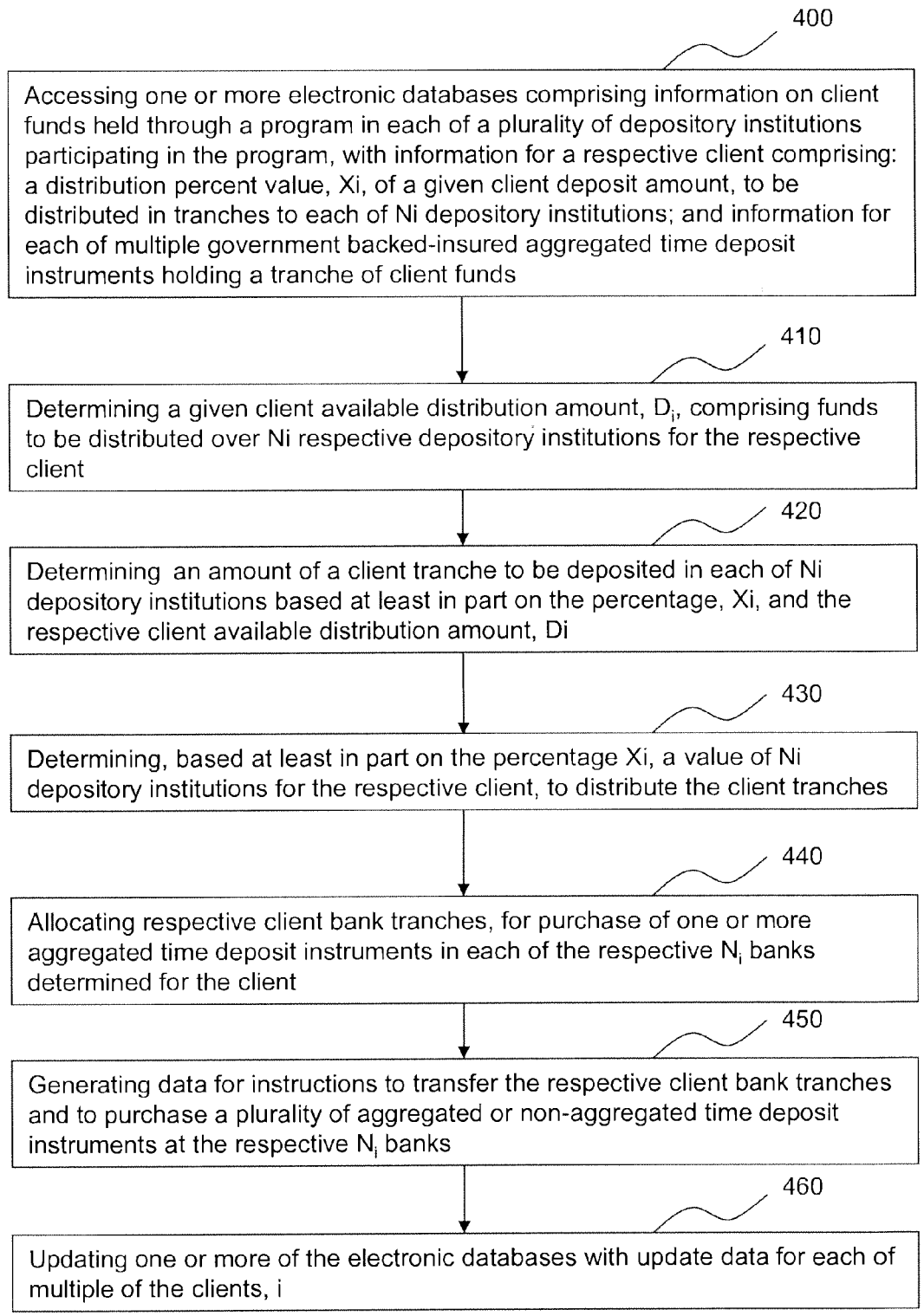
FIG. 4 is a schematic block diagram of a yet further embodiment.

FIG. 4 discloses an embodiment, referred to as Option 1, comprising a computer-implemented method, computer system configuration and program product, for managing funds of a plurality of respective clients to allocate a given percentage, $X_i$, of client assets across a group of depository institutions for the purchase of time deposit instruments and possibly other financial products, with the number of depository institutions, $N_i$, for the distribution varying based on the percentage $X_i$, e.g., for an $X_i$ of 20%, the number of depository institutions for the distribution would be 100%/20%=5. In one embodiment, multiple of these purchased instruments may be aggregated time deposit instruments, where the purchase amount is formed by aggregating the tranches of multiple clients. Such an allocation of tranches for a respective client is illustrated in Table I below, as Option 1. The funds to be allocated may be received via one or more interfaces with clients and/or source institutions. For example, an electronic interface may be set up to receive funds directly from clients, and/or from broker dealers or other source institutions, and/or from Internet depository institutions, to name a few.

TABLE I

| Bank | Amount for Distribution | | |
|---|---|---|---|
| | 100,000 Option 1, Scenario 1 | 100,000 Option 1, Scenario 2 | 1,000,000 Option 1, Scenario 3 |
| 1 | $20,000 | $18,000 | $180,000 |
| 2 | $20,000 | $18,000 | $180,000 |
| 3 | $20,000 | $18,000 | $180,000 |
| 4 | $20,000 | $18,000 | $180,000 |
| 5 | $20,000 | $18,000 | $180,000 |
| 6 | 0 | $10,000 | $100,000 |
| 7 | 0 | 0 | |
| 8 | 0 | 0 | 0 |
| 9 | 0 | 0 | 0 |
| 10 | 0 | 0 | 0 |
| Total | $100,000 | $100,000 | $1,000,000 |

In the embodiment of FIG. 4, one or more computers may be configured, for example with computer program code loaded in main memory, or via hard-wiring, to implement the allocation. The one or more computers may be configured, in one embodiment, to provide that the tranche amounts calculated will not exceed a predetermined value based on an account type insurance limit. In another embodiment, the tranche amounts may be determined, at least in part, so as not to cause a depository cap for the depository institution to be exceeded. Such a depository cap may be determined, for example, based at least in part, on collateral held by the depository institution or other safety measure or criteria for the depository institution. The tranche amount allocated may be substantially the same across all of the depository institutions, or may be varied, in some embodiments, based on computer-implemented rules applied for the allocation. Note that different computer-implemented rules may be applied depending on whether the client is a regular individual, a high net worth individual, a corporation, a partnership, or other entity type, or a client account balance, or based on other variables in a program.

In more detail, FIG. 4 discloses a computer-implemented operation 400 of accessing, by one or more computers, one or more electronic databases, stored on one or more computer-readable media. In one embodiment, the one or more electronic databases comprise: client information for each of a plurality of respective clients, i, comprising information on client funds held through a program in each of a plurality of depository institutions participating in the program, with information for a respective client comprising one or more of the following items: (i) a balance of funds of the client held through the program in each of multiple of the depository institutions holding funds of the respective client; (ii) a distribution percent value, $X_i$, of a given client deposit amount, to be distributed in tranches to each of $N_i$ depository institutions. Additionally, the one or more databases may comprise one or more items of information for each of multiple government backed-insured aggregated time deposit instruments holding a tranche of client funds, comprising: (i) a rate for the respective aggregated time deposit instrument; (ii) an identification of the depository institution holding the respective aggregated time deposit instrument; (iii) a term of the respective aggregated time deposit instrument holding funds of the respective client. In a further embodiment, the database may further comprise an interest rate promised to the respective client by the source institution. Information on other financial products holding client funds through the program may also be comprised in the one or more databases.

Note that the percentage, $X_i$, for a given client, i, may be determined based on one or more criteria, such as a total balance of the respective client i with a source institution, or a total balance of a respective client, or a client and friends and/or family with the source institution, relative to one or more thresholds, or relative to a set of thresholds in a tier table, or a number of years the respective client has maintained a relationship with the source institution or the program, and/or the term and rate and yield of the time deposit instruments available at that time, and the type of client entity (individual, or municipal entity, or corporate entity) making the deposit, to name a few. Alternatively, this percentage may be obtained from the client, or from the source institution.

The following steps 410, 420, 430 and 440 are then performed for each client, i, of a plurality of clients:

Block 410 comprises an operation of determining, by the one or more computers, a given client available distribution amount, $D_i$, for a respective client, i, comprising funds to be distributed in tranches over $N_i$ respective depository institutions for the respective client, for the purchase of aggregated or non-aggregated time deposit instruments and potentially one or more other financial products.

Block 420 comprises a computer-implemented operation of determining, by the one or more computers, an amount of a client tranche, by the one or more computers, based at least in part on the percentage, $X_i$, and the respective client available distribution amount, D. This determining operation may be performed for example by accessing a database, or a website, or by calculating or having calculated the amount of the client tranche. In one embodiment, the amount of the tranche is restricted to less than an insurance amount. In one embodiment, an algorithm used for the calculation of the tranches comprises simply multiplying the client available distribution amount, $D_i$, by the percentage $X_i$. In another embodiment, the calculation is based on the rate listed for (and promised to) the given client available distribution amount, $D_i$, of the respective client, and the rate for the respective aggregated or non-aggregated time deposit instrument to be provided by the respective depository institution offering the respective aggregated or non-aggregated time deposit instrument, and an algorithm to determine an amount of funds necessary for the client depository institution tranche to realize the rate listed for the given client available distribution amount, $D_i$, to obtain a return from that tranche from the respective aggregated or non-aggregated time deposit instrument, so that the rate promised to the client for the client available distribution amount, $D_i$, is achieved. For example, a source institution with a relationship with a respective client may be promising to pay 3% to the client for the client available distribution amount, $D_i$. However, the aggregated or non-aggregated certificate of deposit to be purchased from a particular depository institution may be paying 4%. The source institution, or the system 100, in one implementation may put in less money in a tranche for a given depository institution, i.e., a lower tranche amount than an amount determined by a simple division of the client available distribution amount, $D_i$, by the number of depository institutions in which time deposit instruments are to be purchased would indicate, to obtain the return of 3% promised to the client, in view of the actual 4% rate paid by this depository institution. Alternatively, it may be necessary to put in more money in the tranche for a given depository institution than a simple division of the given client available distribution amount, $D_i$, by number of depository institutions in which time deposit instruments are to be purchased would indicate, if the source bank promised to pay 3% to the client, but the aggregated or non-aggregated certificate of deposit to be purchased from the particular depository institution is only paying 2%.

Block 430 comprises a computer-implemented operation of determining, by the one or more computers, for a given tranche distribution percentage, $X_i$, to be distributed for the purchase of time deposit instruments, for a client available distribution amount $D_i$, a value of $N_i$ depository institutions for the respective client, wherein $N_i$ is a whole number and (X) times ($N_i$) is equal to or less than 100, e.g., if $X_i$, is 18%, then 100%/18%=$N_i$=5, plus a remainder. Alternatively, the number of depository institutions $N_i$ is a whole number which is equal to 100%/$X_i$, where $X_i$ is a distribution percent value to be distributed to each of the $N_i$ depository institutions for the respective client account, e.g., if $X_i$, is 20%, then 100%/20%=N=5, with no remainder amount in this example. Note that in one embodiment, the operation may be subject to one or more criteria, such as that the respective client available distribution amount, $D_i$, to be distributed in tranches, equals or exceeds a threshold value, and/or that the operation is permitted only if a logic element is set, based on a particular relationship between the depository entity and the client, to name a few. For example, in one embodiment, this step may only be performed on client available distribution amounts $D_i$ that are above or below a threshold amount, e.g., less than an FDIC-insured limit or other insurance limit or collateral limit, multiplied by the determined $N_i$ depository institutions.

Block 440 comprises a computer-implemented operation of allocating, by the one or more computers, respective client depository institution tranches, for purchase of one or more aggregated or non-aggregated time deposit instruments in each of the respective $N_i$ depository institutions determined for the client. In one embodiment, the respective depository institution would then aggregate the client depository institution tranches from a plurality of the clients to form a purchase amount to purchase an aggregated time deposit instrument. Note that the purchase amounts may vary from depository institution to depository institution based on one or more criteria such as, for example, a depository institution maximum or minimum cap, or a stability rating.

In one embodiment, this allocating step may further comprise determining client eligibility for having a given client available distribution amount, $D_i$, distributed in tranches among $N_i$ depository institutions, based on one or more criteria; and aggregating, by the one or more computers, respective client depository institution tranches of a plurality of respective clients that are determined to be eligible, into a respective purchase amount to purchase the aggregated or non-aggregated time deposit instrument from a respective depository institution. Note that client amounts that are not eligible to be distributed to multiple depository institutions because they do not meet one or more criteria may be also included in some embodiments in the aggregation for one or more depository institutions to form a purchase amount. In one embodiment one criteria for client eligibility may be an amount of the given client available distribution amount, $D_i$, relative to a threshold amount. In another embodiment, one criterion for client eligibility may be a total amount of the funds of the respective client managed in the program relative to a threshold amount. In another embodiment, one criterion may be a relationship of the client or an amount invested with a source institution. Note that the determining eligibility step may be performed by accessing a database or a website, or by making a comparison of a client available distribution amount, $D_i$, or a client total amount managed in the program to a threshold amount, or by keying in the eligibility data.

Block 450 comprises a computer-implemented operation of generating data and/or instructions, by the one or more computers, to transfer the respective client depository institution tranches and to purchase a plurality of aggregated or non-aggregated time deposit instruments at the respective $N_i$ depository institutions determined for the client. In one embodiment as noted above, the client depository institution tranches are to be transferred individually to the respective depository institutions to be accumulated by the respective depository institution for the purchase of aggregated time deposit instruments. In another embodiment, multiple of the client tranches designated for a particular depository institution, are aggregated by the system into a purchase amount for an aggregated time deposit instrument, and data and/or instructions are generated to send the respective purchase amount to the respective depository institution to purchase the aggregated time deposit instrument with purchase amount, or to be used for a further aggregation with other tranches, to form a purchase amount for an aggregated time deposit instrument. The instructions may contain an explicit or an implicit purchase request for the time deposit instruments.

Block 460 comprises a computer-implemented operation of updating, by the one or more computers, one or more of the electronic databases with update data for multiple of the clients, i, with the update data for each of these multiple clients, i, comprising respective client depository institution tranches transferred or to be transferred to purchase one or more aggregated or non-aggregated time deposit instruments at the respective client Ni depository institutions for the client, i.

In one embodiment, the operation is performed of selecting respective client depository institution tranches of a plurality of respective clients for aggregation into a respective purchase amount for an aggregated time deposit instrument from a particular depository institution, based, at least in part, on at least one criterion. In one embodiment, the at least one criterion is that only tranches from client available distribution amounts, $D_i$, above a threshold amount are aggregated into a respective purchase amount for purchase of an aggregated time deposit instrument from a particular respective depository institution or at a particular rate. In another embodiment, the at least one criterion is that only tranches from client available distribution amounts, $D_i$, below a threshold amount are aggregated into a respective purchase amount for purchase of an aggregated time deposit instrument from the respective depository institution. In yet another embodiment, the at least one criterion is that only tranches from client available distribution amounts, $D_i$, associated in the one or more databases, with a particular source institution are aggregated into a respective purchase amount for purchase of an aggregated time deposit instrument from a particular depository institution and/or at a particular rate. In another embodiment, the at least one criterion is that the term for the client available distribution amount, $D_i$, is a predetermined term. Various other criteria, e.g., total funds of the client, or the client and family and/or friends, with the source institution, or managed by the system 100, may be used to select tranches to form purchase amounts for aggregated time deposit instruments at a particular depository institution or at a particular rate and/or particular term.

In a further embodiment, the operation is performed of purchasing the aggregated time deposit instrument. In one embodiment, this purchasing step is performed electronically by the transmission of an electronic message by the one or more computers and via one or more electronic networks.

In a further embodiment, the system 100 determines a group of depository institutions to participate in a reciprocal program for distributing tranches for the purchase of aggregated time deposit instruments. By way of example, factors that may be taken into account in making a distribution of tranches comprise the fact and/or amount originating from a respective source institution, and any relationship of the source institution to the recipient institution, either a contractual relationship or a corporate affiliation, to name a few. In this further embodiment, the one or more databases may further comprise information on source institution activity of a respective depository institution, e.g., the funds brought into the system 100 for distribution to other depository institutions participating in the program. This sourcing activity would be considered in selecting which depository institutions are to receive tranches for the purchase of time deposit instruments and other financial instruments. In this embodiment, the steps may be performed of receiving an order from a respective source institution, to distribute one or more client available distribution amounts, $D_i$, of funds of clients of the source institution, for the purchase of a plurality of aggregated or non-aggregated time deposit instruments. In one embodiment, the order comprises one or more electronic documents and is received electronically by the one or more computers and via the one or more electronic networks. The allocating step in this embodiment further comprises: selecting, by the one or more computers, one of the depository institutions participating in the program, for purchase of one or more aggregated time deposit instruments based, at least in part, on whether or not one or more orders have been received from the respective one depository institution under consideration, to distribute one or more client available distribution amounts, $D_i$, of clients of that respective one depository institution for the purchase of a plurality of aggregated or non-aggregated financial instruments in other depository institutions participating in the program. As noted, a region, or contractual relationship of a corporate affiliation may also be taken into account.

In one implementation of this embodiment, the selection of the one depository institution participating in the program for the purchase of one or more aggregated time deposit instruments is based, at least in part, on whether the one or more orders received in the system 100 from the respective one depository institution, for distributing tranches from client available distribution amounts, $D_i$, of clients of the respective one depository institution to other program depository institutions, meets at least one criterion. The at least one criterion may be that a cumulative amount of the client available distribution amounts, $D_i$, from the one depository institution, that were distributed to other program depository institutions, is more than the respective one depository institution has received in client depository institution tranches associated with other program source institutions. Alternatively, one criterion may be that the cumulative amount of the client available distribution amounts, $D_i$, from the one depository institution, that were distributed to other program depository institutions equals or exceeds a threshold level. Money received can be taken into account, e.g., see the reference to reciprocity, above.

In a further embodiment, the steps are performed of selecting, by the one or more computers, one of the depository institutions for the purchase of one or more aggregated or non-aggregated time deposit instruments based, at least in part, on how close a rate and term of the aggregated or non-aggregated time deposit instrument available from the respective one depository institution matches a rate promised by the source institution for the given client available distribution amount, $D_i$, of funds of the respective client.

In a further embodiment, the step is performed of selecting, by the one or more computers, a respective one of the depository institutions for the purchase of one or more aggregated or non-aggregated time deposit instruments based, at least in part, on a safety grade rating for the respective one depository institution.

In a further embodiment, the step is performed of selecting, by the one or more computers, respective one or more of the depository institutions for the purchase of one or more aggregated or non-aggregated time deposit instruments based, at least in part, on whether the respective depository institution is affiliated with the source institution for one or more of the client available distribution amounts, $D_i$, to be used for the purchase. In this embodiment, the one or more databases comprise data on the source institution for each of a plurality of the client available distribution amounts, $D_i$.

In a yet further embodiment, the one or more databases comprise a list of depository institutions for holding tranches of the client available distribution amount, $D_i$, of a respective client, and/or a list of one or more depository institutions that are not to hold the clients' funds. In one embodiment, this list may be provided by the respective client or source institution for the respective client.

Table I, Scenario 1, discloses an example allocation for this embodiment where X equals 20% of $D_i$, for the purchase of one or more time deposit instruments in each of $N_i$ depository institutions, where $N_i$ is determined to be 100%/20%=5 depository institutions in the program, in the example. Note that the total number of depository institutions participating in the program in this example is 10.

In a variation to this embodiment, referred to as Scenario 2 of Option 1, a computer-implemented method is disclosed for allocating respective client tranches comprising a percentage, $X_i$, of the client available distribution amount, $D_i$, of $100,000 for the purchase of time deposit instruments, where there is a remainder, e.g., $X_i$=18%, resulting in 18% being distributed across 5 depository institutions in a program with 10 depository institutions. A remainder percentage, $R_i$, e.g., 10%, is then allocated across one or more remainder depository institutions, e.g., in a $6^{th}$ depository institution in Table I, Scenario 2. In this example, the funds for the remainder depository institution (e.g., the $6^{th}$ depository institution) may be placed in another depository instrument in a different financial instrument that does not have penalties for withdrawal, e.g., a money market deposit account (MMDA). Funds from this MMDA in the $6^{th}$ depository institution may be used to settle service transactions, such as debits, deposits, and transfers. This design, illustrated in Table I, as Option 1, Scenario 2, may also be used to minimize activity in the first group of depository institutions, e.g., depository institutions 1 through 5 in this example, and yet facilitate liquidity with the funds in the $6^{th}$ depository institution through this method.

One embodiment of this second scenario comprises, allocating at least a portion, $PR_i$, of a remainder amount, $R_i$, by the one or more computers, of the respective client available distribution amount, $D_i$, where $R_i$ ($D_i$)–($D_i$($N_i \cdot X_i$)/100), and $N_i$ is a whole number equal to $100\%/X_i$, to one or more of the depository institutions, $M_i$, up to a predetermined amount in each of the respective client $M_i$ depository institutions, where $M_i$, is one or more depository institutions. For the example shown in Table I, this equation would mean that $R_i$, would be equal to the amount ($D_i$) of $100,000 minus the quantity of $100,000 times the number of depository institutions $N_i$, which is a whole number of 5 in this case, e.g., 100%/18%, in which client account deposits are allocated, times the percentage of 18%, divided by 100, which results in $100,000-$100,000 (5×18)/100=$10,000. Thus, the remainder amount $R_i$, is $10,000 distributed to $M_i$ bank 6.

A Scenario 3 is also shown in Table I, and represents the situation for an individual with a large account balance, e.g., $1,180,000, in his/her respective client account. In this situation, a percentage, X, e.g., 18% in the example, is allocated across the 5 depository institutions; 18% of $1,000,000 is $180,000. A remaining balance, $R_i$, of $100,000, is allocated to a $6^{th}$ depository institution.

It is within the letter and spirit of the present invention that the number of depository institutions and percentages to be allocated may be varied.

In another embodiment of the invention, referred to as Option 2 and shown in Table II, a system, program product, and computer-implemented method are disclosed to approximately evenly allocate tranches for a client available distribution amount, $D_i$, across a fixed number of depository institutions, $N_i$, by taking the respective client's client available distribution amounts, $D_i$ and dividing, via the one or more computers, by the fixed number of depository institutions, $N_i$. In this embodiment, one or more computers may be configured, for example with computer program code loaded in main memory, or via hard-wiring, to implement the allocation. The one or more computers may be configured, in one embodiment, to provide that the amount allocated to a depository institution will not exceed the account type insurance limit (currently $250,000) and/or will not override a depository institution capacity—with an exception being an allocation to one or more safety depository institutions. Option 2, Scenario 1, is illustrated in Table II, for a client's account balance of $100,000, which is to be distributed approximately evenly across 10 depository institutions in a program, e.g., $100,000/10 (number of depository institutions)=$10,000 per depository institution.

TABLE II

| | Amount for Distribution | |
|---|---|---|
| Bank | 100,000 Option 2, Scenario 1 | 2,320,000 Option 2, Scenario 2 |
| 1 | $10,000 | $700,000 |
| 2 | $10,000 | $180,000 |
| 3 | $10,000 | $180,000 |
| 4 | $10,000 | $180,000 |
| 5 | $10,000 | $180,000 |
| 6 | $10,000 | $180,000 |
| 7 | $10,000 | $180,000 |
| 8 | $10,000 | $180,000 |

TABLE II-continued

|  | Amount for Distribution | |
| --- | --- | --- |
| Bank | 100,000 Option 2, Scenario 1 | 2,320,000 Option 2, Scenario 2 |
| 9 | $10,000 | $180,000 |
| 10 | $10,000 | $180,000 |
| Total | $100,000 | $2,320,000 |

In a Scenario 2 for this Option 2, shown in Table II, a client has a transaction balance of $2,320,000, a balance of $180,000 is allocated to each of depository institution 2-10. A remaining balance is allocated and sent to a safety depository institution 1, in a money fund or one or more other financial instrument instruments that may or may not be FDIC insured or have other insurance.

In another embodiment, $N_i$ may vary for each client account, i, based on one or more criteria, such as for example, a total amount a client, or the client and family and/or friends have on deposit in various accounts with a given source institution, or a total amount a client, or the client and family and/or friends have on deposit in the program, a number of available depository institutions with capacity, the parameters of the respective program, to name a few.

A yet further embodiment of a computer-implemented method comprises Option 3 shown in Table III. For Option 3, the one or more computers may be configured to calculate a percent of client assets, and allocate tranches of that percent amount across a first $N_i$ depository institutions in program. The remaining amount of client assets is then allocated in tranches across $M_i$ program depository institutions. Thus, a first percentage, $X_1$, a number of depository institutions, $N_i$, across which to distribute the first percentage, and a number of depository institutions, $M_i$, across which to distribute a second percentage, $Y_i$, may be specified by or for the respective client. In one embodiment, the amount allocated to each depository institution in one of the sets of depository institutions is determined to not exceed the account type insurance limit (currently $250,000) or not to cause a depository institution to exceed its capacity—with an exception being an allocation to one or more safety depository institutions.

Table III illustrates a Scenario 1 for this Option 3. In this Scenario 1, for a client with a total account balance of $500,000, an $X_i$ of 80% is allocated in tranches across an $N_i$ of the first two depository institutions, e.g., $200,000 in each of $N_i$ depository institutions 1 and 2, for the purchase of time deposit instruments. An $Y_i$ comprising the remaining 20% of the balance is allocated in tranches across the remaining $M_i$ depository institutions 3-10, e.g., $12,500 to each of depository institutions 3-10. The tranches allocated to depository institutions 3-10 may be used to purchase time deposit instruments, or other financial instruments, such as MMDA's, to facilitate liquidity.

A Scenario 2 for Option 3 is shown in the second column in Table III. In this Scenario 2, for a client with a total account balance of $499,997, an $X_i$ of approximately 50% is allocated in tranches among an $N_i$ of the first three depository institutions 1-3, e.g., $83,333 in each of depository institutions 1-3, for the purchase of time deposit instruments. The remaining $Y_i$ of approximately 50% is allocated in tranches across the remaining $M_i$ depository institutions 4-10, e.g., $35,714 to each of depository institutions 4-10, and may be used to purchase time deposit instruments, or other financial instruments, such as MMDA's, to facilitate liquidity.

Although convenient for purposes of illustration, note that the amounts allocated in tranches to the depository institutions in a given set of depository institutions, e.g., $N_i$, need not be equal. Also, note that the amount of the tranche in a given depository institution for a client may exceed the FDIC insurance limit. This is illustrated in a Scenario 3 shown in column 3. Column 3 shows the same percentage of 50% allocated in tranches to the first set of depository institutions, 1 and 2, as in column 1, but the amount in depository institution 1 is different from the amount in depository institution 2, and the total amount of the client available distribution amount, $D_i$, causes the balance for the client in multiple of the depository institutions to exceed the FDIC limit.

In one embodiment, one or more of the tranches may be invested in stocks, or bonds, municipal or ETF funds, or ETN's or other notes, or other financial instruments, via a broker or other financial intermediary, in the infrastructure of the banking entity or associated with the banking entity.

TABLE III

|  | Amount for Deposit | | | |
| --- | --- | --- | --- | --- |
| Depository Instr. | $500,000 Option 3, Scenario 1 | $499,997 Option 3, Scenario 2 | $5,200,000 Option 3 Scenario 3 | $1,800,000 Option 3 Scenario 4 |
| 1 | $200,000 | $83,333 | $1,500,000 | $500,000 |
| 2 | $200,000 | $83,333 | $1,100,000 | $500,000 |
| 3 | $12,500 | $83,333 | $325,000 | $200,000 |
| 4 | $12,500 | $35,714 | $325,000 | $200,000 |
| 5 | $12,500 | $35,714 | $325,000 | $100,000 |
| 6 | $12,500 | $35,714 | $325,000 | $100,000 |
| 7 | $12,500 | $35,714 | $325,000 | $50,000 |
| 8 | $12,500 | $35,714 | $325,000 | $50,000 |
| 9 | $12,500 | $35,714 | $325,000 | $50,000 |
| 10 | $12,500 | $35,714 | $325,000 | $50,000 |
| Total | $500,000 | $499,997 | $5,200,000 | $1,800,000 |

For the embodiments illustrated in column 1 of Table III, where the amount of a client's funds held in each depository institution in a first set of depository institutions, $N_i$ of 2 is made to be equal, the percentage $X_i$, of 80% is deposited across the depository institutions 1 and 2, e.g., 40% in each of the institutions 1 and 2. Then the amount that is remaining, in this example comprising $100,000, is distributed across a second set, $M_i$, of 8 depository institutions. In one embodiment, a client second percentage, $Y_i$, to be distributed in tranches across the depository institutions in this second set, e.g., the remaining 20% in this example, is divided by the number of depository institutions in the second set, e.g., 8, so that 20%/8=2.5% per tranche. This tranche percentage is then multiplied by the client available distribution amount, $D_i$, and distributed as a tranche to each of the depository institutions in this second set of depository institutions, e.g., $12,500 for the example of column 1. In one embodiment, the second percentage $Y_i$ equation is $(100\%-X_i)/(M_i)$. In the example illustrated in Table III, Option 3, Scenario 1, where $X_i=80\%$, the calculation for the second percentage is $Y=(100-80)/8=2.5\%$.

In a further embodiment, referred to as Scenario 4, and shown in column 4 of Table III, three sets of depository institutions are used, with a different percentage allocated across each set. Within the given set, the percentage allocated may be distributed equally across each of the depository institutions in the set. Alternatively, the tranche amounts in the depository institutions in the given set may be different and determined by one or more criteria. The depository products purchased may vary from set to set. For example, time deposit instruments may be purchased in depository institutions in the first set of depository institutions, e.g., depository institutions 1 and 2. Also, one of the sets of depository institutions may be determined based on one or more criteria, relating to client characteristics, such as a total balance of the client with a source institution or managed in the program, or any of the other criteria already set forth herein, or based on one or more criteria related to the depository institution or source institution, such as the capacity of the depository institution, the balance sheet and safety of the depository institution, to name a few. In the example shown in column 4, the first set comprises depository institutions 1 and 2, and has allocated to the set a percentage of 50% to be split up in tranches for the respective depository institutions in the first set. The second set of depository institutions may be determined based on one or more criteria, and comprises in this example, depository institutions 3, 4, 5 and 6, and has allocated thereto a percentage $Y_i$ of 30% to be split up in tranches for the respective depository institutions in the second set. A different set of financial products may be purchased in this second set or time deposit instruments with different characteristics relative to the first set of depository institutions may be purchased, e.g., time deposit instruments with a shorter term compared to the term of the time deposit instruments purchased in the first set of depository institutions. The third set may comprise a different set of financial instruments, such as MMDA's or a set of equity funds, which may be determined based on one or more criteria. In an example with equity funds, the institutions 7, 8, 9 and 10 in the third set may comprise equity fund institutions, and may have allocated thereto a percentage Z, of 20% to be split up in tranches for the respective third set. As noted, a choice of financial products may be used to facilitate liquidity.

A yet further embodiment of the invention comprises allocating client funds across a number of depository institutions, with the number of depository institutions for the allocation determined based on one or more criteria, e.g., a tiering of the number of depository institutions for deposit based on the one or more criteria. For example, one criterion may comprise a balance of client funds managed by the system 100 in the program relative to a tiering table, with the tiering table comprising for each tier, a number, N, of depository institutions assigned to the respective range of balances. Another criterion may be the balance in all of the accounts for a client, or a client and the client's family and/or friends, managed by the system 100 (the program), or listed in accounts of a respective associated source institution, relative to tier ranges in a tiering table. Another criterion may be an overall client relationship with the system 100 (the program) or with one or more depository institutions participating in the program. Another criterion may be an overall amount of funds currently managed by the system 100 for a given associated source institution, e.g., a broker dealer or source depository institution.

Figure 5:
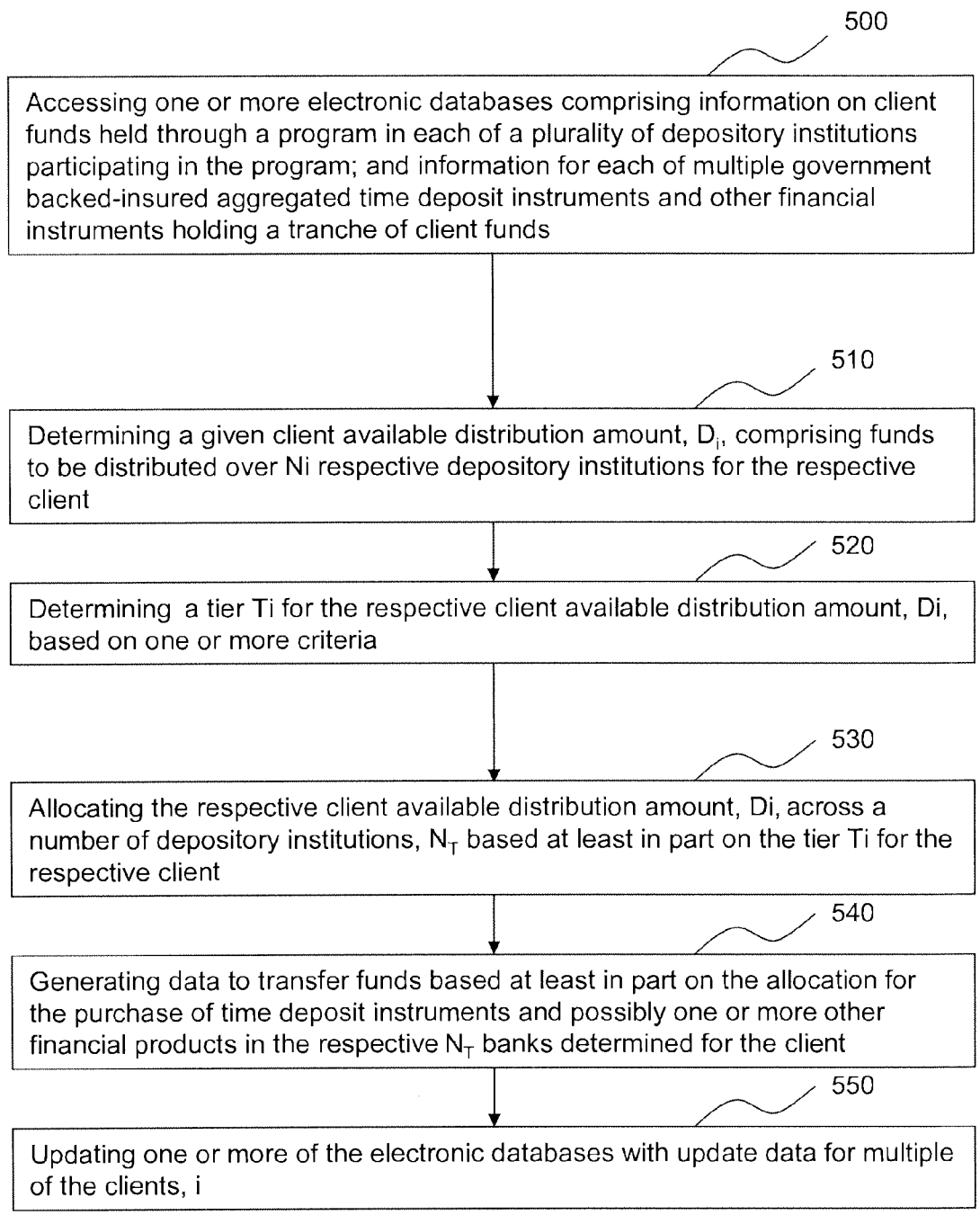
FIG. 5 is a schematic block diagram of a yet further embodiment.

Referring to FIG. 5, one embodiment for tiering, a computer-implemented operation of this embodiment may comprise performing, by the one or more computers, the following steps for each client, i, of multiple of the clients (note that this tiering option may be offered to only selected clients based on one or more criteria)

In block 500 in FIG. 5, an operation is represented of accessing one or more electronic databases comprising information on client funds held through a program in each of a plurality of depository institutions participating in the program; and information for each of multiple government backed-insured aggregated time deposit instruments and other financial instruments holding a tranche of client funds. Note that in one embodiment, one or more databases may comprise a balance of client funds managed by the system in a program and held in accounts in multiple of the depository institutions. In other embodiments, information in the one or more databases may comprise client relationship data and/or client tier levels, $N_T$. Additionally, the one or more databases may comprise one or more items of information for each of multiple government backed-insured aggregated time deposit instruments holding a tranche of client funds, comprising: (i) a rate for the respective aggregated time deposit instrument; (ii) an identification of the depository institution holding the respective aggregated time deposit instrument; (iii) a term of the respective aggregated time deposit instrument holding funds of the respective client. Information on other financial products holding client funds through the program may also be comprised in the one or more databases.

In block 510 in FIG. 5, a computer-implemented operation is represented of determining, by the one of more computers, a client available distribution amount, $D_i$, comprising funds to be distributed to multiple of the depository institutions in the program. This determination may be subject to one or more computer implemented rules, as discussed previously. The determining operation may be performed in a variety of different ways, such as by accessing a database or a Website, or calculating the data, or by having the data keyed into the system.

In block 520 in FIG. 5, a computer-implemented operation is represented of determining, by the one or more computers, a depository institution number tier, $T_i$, for the client available distribution amount, $D_i$, from among a plurality of tiers based on one or more criteria, wherein each tier has a number, $N_T$, of depository institutions electronically associated therewith or has associated with it a function for the tier for computing electronically the number, $N_T$, of depository institutions. In one embodiment, one of the criteria may comprise in which tier range the client available distribution amount $D_i$, or a total amount of client funds managed by the system 100 in the program, or a total amount from the associated source institution managed by the system 100 in the program, fits in a tier table comprising a set of deposit amount ranges, with a prescribed number of depository institutions, $N_T$, assigned to each respective tier range. Any of the other example criteria set forth herein may be used. As noted, the determining operation may be performed in a variety of different ways, such as by accessing a database or a Website, or calculating the data, or by having the data keyed into the system.

In block 530, a computer-implemented operation is represented of allocating, by the one of more computers, the client available distribution amount, $D_i$, across a number of depository institutions, $N_T$, equal to the number associated electronically with the tier, $T_i$, or determined from a function associated with that tier, $T_i$, so that a respective client portion, $P_i$, of the client available distribution amount, $D_i$, is allocated to each respective depository institution in the number of depository institutions, $N_T$, in the client's tier, $T_i$. In one embodiment of this Option, the client portions, $P_i$, allocated to each of the respective depository institutions, $N_T$, in the client's tier, $T_i$, are approximately equal, but do not exceed a predetermined amount, except for one or more safety depository institutions. In another embodiment, the client portions or tranches, $P_i$, may vary from depository institution to depository institution based on one or more criteria set forth by the client, or the source institution, or the system, or based on such criteria as a minimum cap and a maximum cap set for the respective depository institution. In these other embodiments, the client portions, $P_i$, may be determined in accordance with one or more of the computer-implemented methods. Note that a selection of depository institutions may be made by the client or by the source institution, or by the system 100 based on one or more criteria as previously described.

In one embodiment, the computer-implemented operation is performed of aggregating tranches from different clients of the same source institution, or from different source institutions, and calculating, by the one of more computers, for each respective depository institution of multiple of the depository institutions in the program, a respective purchase amount for allocation for purchase of one or more of the interest-bearing aggregated time deposit instruments to be held in the respective depository institution. The respective purchase amount comprises a sum of a plurality of respective clients' tranches, $P_i$, allocated to the respective depository institution for the purchase of the aggregated time deposit instrument. As noted, in some embodiments, client amounts that are not eligible to be distributed across multiple banks may also be included to form respective purchase amounts.

In block 540, a computer-implemented operation is represented of generating, by the one of more computers, data for instructions to transfer funds for the purchase of financial instruments in $N_T$ depository institutions, comprising purchase of one or more of the interest-bearing aggregated time deposit instruments in the respective depository institutions in the program. As noted above, other financial instruments may be purchased in one or more of these depository institutions. As noted previously, in some embodiments, the purchase data may be not comprise aggregations of tranches, but may be for a purchase of time deposit instruments and other financial instruments for individual clients.

In block 550, a computer-implemented operation is represented of updating, by the one or more computers, one or more of the electronic databases with update data for each of multiple of the clients, i, with the update data for each of the multiple clients comprising data for the respective client tranche, $P_i$, allocated to purchase one or more of the interest-bearing aggregated or non-aggregated time deposit instruments or other financial products in each respective depository institution in the number of depository institution, $N_T$, determined for the client based on the tier determined for that client. Note that in some instances, the client tranche, $P_i$, for the respective depository institution may be in excess of the FDIC insurance limit or may raise the total amount of client funds held in that depository institution to above the FDIC insurance limit, particularly if the respective depository institution is a safety depository institution for the respective client.

In a yet further embodiment, after the system has determined that a client, or a broker dealer, or financial intermediary, or source institution, has met one or more designated criteria, then the client, or broker dealer or source institution may be permitted to designate a number of depository institutions across which to deposit its client available distribution amount, $D_i$, and/or to designate a percentage to be deposited in each of these designated depository institutions.

Note that all of the embodiments disclosed herein may be implemented with the added operation of administering the client deposits/transfers to and/or withdrawals/transfers from respective client accounts in a month. In one implementation of this embodiment, data for a sequence of withdrawals/transfers or a manner of making withdrawals/transfers is generated so that more than six (6) withdrawals/transfers may be made in the month from one depository institution. In one embodiment, the system posts the deposits/transfers and withdrawals/transfers, or nets thereof, and sweep data against client accounts representing funds of the respective client managed by the system in the program, in the one or more databases. This added operation may comprise the back-end volume processing of large numbers of withdrawals in a month by check, debit card, credit card and/or ACH.

As noted, in variations of the previously described embodiments, one or more of the aggregated interest-bearing accounts held in the depository institutions may or may not be FDIC insured, and the respective depository institution may alternatively, hold an amount of collateral or exhibit other features to justify a determination that the respective depository institution is safe.

In a further variation that can be applied to modify each of the embodiments herein disclosed, the one or more of the electronic databases include client preference and/or exclusion information comprising a client's one or more preferences and/or one or more exclusions of one or more of the depository institutions to hold its funds. The memory for one or more of the computers stores computer-readable instructions that, when executed, cause the one or more computers to perform the step of determining the depository institutions in the program for allocation of tranches of the client available distribution amount, $D_i$, based at least in part, on the client preference and/or exclusion information.

In one embodiment of an account allocation sequence, first amounts are allocated to the depository institutions based on one or more criteria, such as meeting reciprocity requirements, maximum caps, minimum caps, stability ratings, yields and terms of deposit, to name a few. Then the respective client tranches may be shuffled among the depository institutions to substantially equal these allocated first amounts. Note also that the client tranches may be sorted in some defined manner, e.g., descending order based on client available distribution amount, $D_i$, (highest to lowest), or sorted numerically from lowest to highest. Thereafter, the allocation proceeds, client by client, to determine which depository institutions will receive tranches from the client available distribution amounts, $D_i$, to purchase the time deposit instruments.

Note also the system can reallocate client funds from a time deposit instrument to a non-time deposit instrument. This reallocation may be performed to provide liquidity to the respective client, and/or to maintain a desired system spread for a given transaction, or an interest rate, for example. In this respect, in one embodiment, the method further comprises: reallocating funds of a first client from a respective time deposit instrument to a non-time deposit financial instrument, and allocating funds of a second client to the respective time deposit instrument in place thereof; and withdrawing an amount of the funds of the first client from the non-time deposit financial instrument. Thus, the system can shuffle client funds between time deposit instruments and other financial products as desired.

As noted, in one embodiment, groupings of client tranches may be made to form purchase amounts for purchase of aggregated time deposit instruments and other financial products. The allocation method for the tranches and the formation of the purchase amounts for making the time deposit instrument purchases at the respective depository institutions may, in one embodiment, be based on the size of the respective client available distribution amount, $D_i$, and based on allocation business rules set for that client. Note that business rules may be attributed to a client account directly at the client account level, or to multiple accounts at the broker or office/branch level.

In one embodiment of business rule priority, client account specific rules may be used first to direct tranches from the client available distribution amounts, $D_i$. If the client has opted out of a particular bank, for example, because the client has funds in that bank via an account with another depository entity, or the client has designated that a first set of tranches is to be held in a particular set of depository institutions, then such client allocation for tranches will follow those rules in making the allocation of that client's funds. Then depository entity office/branch level allocation business rules of the given depository entity may be followed in an order subject to potential amount limits specified by the applicable rule(s) in allocating tranches of multiple client available distribution amounts, $D_i$. The allocation of tranches of client funds may also follow certain other business rules to minimize a volume of fund redistributions.

As noted, in some embodiments one or more safety depository institutions may be designated. A safety depository institution may be generally one of the larger and/or more stable depository institutions in the program, and so is less likely to experience depository institution failure, or it may comprise a depository institution with a certain level of collateral. In one embodiment, the safety depository institution may be selected at the broker level. In another embodiment, it may be selected at the client level. If a broker or system selected depository institution is opted out for a particular client, then the depository institution with the highest available capacity may be used as the safety depository institution for that account. Note that due to opt-out and other rules, there may be multiple safety depository institutions. The safety depository institution for a given client may be selected by rule.

Referring again to FIG. 1, in one embodiment, the management system 100 tracks the purchases of the aggregated or non-aggregated time deposit instruments held at the depository institutions 130-140, based on information generated by the management system computers, e.g., wires, messages, to name a few, and/or received by the management system 100 from the depository institutions and/or from other appropriate sources via contract or otherwise. The management system 100 maintains electronic records or has maintained for it, in one or more electronic databases, records on each source institution and its respective clients with funds in the depository institutions managed by the management system 100.

As explained more fully below, the management system 100 may automatically generate reports, for example in the form of e-mail messages, text messages, faxes, postings on prescribed web pages, to name a few, advising the source institution with the client relationships, of the day's purchases of aggregated or non-aggregated time deposit instruments and other financial products in the multiple depository institutions holding funds for clients of that depository entity. The management system 100 maintains or has maintained for it, computer software and/or hardware located at a main management system site, or at one or more remote sites that are in communication with the management system 100, that maintain databases and other program functions to track the purchases, and the aggregation into purchase amounts, and the transfer of these purchase amounts for the purchase of the aggregated time deposit instruments and other depository products in each of the depository institutions 130-140, and details of those instruments and depository products. Additionally, software is provided to generate data for instructions to transfer the funds from these depository institutions when the term of the respective aggregated or non-aggregated time deposit instrument has ended. Examples of such computer software and/or hardware will be discussed below.

In yet a further embodiment, an audit trail of allocations and reallocations of client funds at each of the depository institutions may be generated. In some embodiments, the system may send information that provides an intra day movement among depository institutions of the funds of the individual client, to the respective individual client, and/or to the associated source institution, and/or depository institutions, and/or to any other designated outside party. The process then creates outbound files for the depository institutions and the broker dealers or other source institutions maintaining the client relationships. A depository institution distribution file sent to the depository institution may include data for each client with funds in the program to be held by that depository institution, and the respective balance held in one or more aggregated or non-aggregated time deposit instruments or other financial products at the respective depository institution. A file may also be sent to each depository institution, which file includes the client's source institution account number, a balance for that client at the depository institution and an identification number, such as the last four digits of the client's TIN. Accordingly, the process in one embodiment, creates a transaction audit trail to record all changes in client funds and an identification of the depository institutions and the aggregated time deposit instruments or other financial products holding those funds and the amounts of client funds held therein.

In yet a further embodiment, an on-the-fly report of uninsured funds is generated and communicated by some convenient electronic means. The insurance process detects whether a client's assets at a particular depository institution are over a prescribed insurance limit or if a depository institution has deposits that exceed its collateral limit. In this manner, uninsured client funds will be written to the uninsured file to capture such client funds "on the fly." An uninsured account balance report thus will include all uninsured client funds with a listing of the aggregated balance of client funds per depository institution. Likewise, for program deposits that exceed a depository institution collateral limit or cause a depository institution to exceed its collateral limit, an excess deposits report may be generated.

The system further includes a message generator that generates one or more electronic messages and/or settlement wires regarding distribution of funds to each of the depository institutions for the purchase of the aggregated or non-aggregated time deposit instruments and other financial products in the depository institutions, as well as for fund withdrawals when the terms have expired (the time deposit instrument has matured) for the aggregated or non-aggregated time deposit instruments, or when a reallocation is performed to facilitate a withdrawal process, or in one embodiment, to facilitate volume withdrawal processing. In one embodiment, the system may perform a process to request instructions from a respective client or determine if instructions have been stored in the one or more databases on a reallocation of client funds obtained from time deposit instruments that have matured. Such a request for instructions may comprises an email to the client, or a letter in the mail, to name a few. In one embodiment, the system may automatically, or after instruction from the respective client or his/her broker dealer, reallocate funds from maturing time deposit instruments into other time deposit instruments, or into other financial instruments, such as MMDA's, or NOW accounts, or DDA's, to name a few. In one embodiment, these reallocations may be to one or more financial instruments in one or more depository institutions in accordance with a percentage set forth in the one or more databases, or in an client instruction, or based on a tiering table, as previously described.

Note that messages may, for example, be in the form of e-mail, facsimile, text message or other form of communication, and may be sent electronically, or by messenger, or by presentation in person, for example. Such messages may be sent to the source institutions and/or the depository institutions for providing notice of an action, or a request for approval of an action, and may include information such as, for example, an amount received from a time deposit instrument termination or a purchase or a withdrawal.

Figure 2:
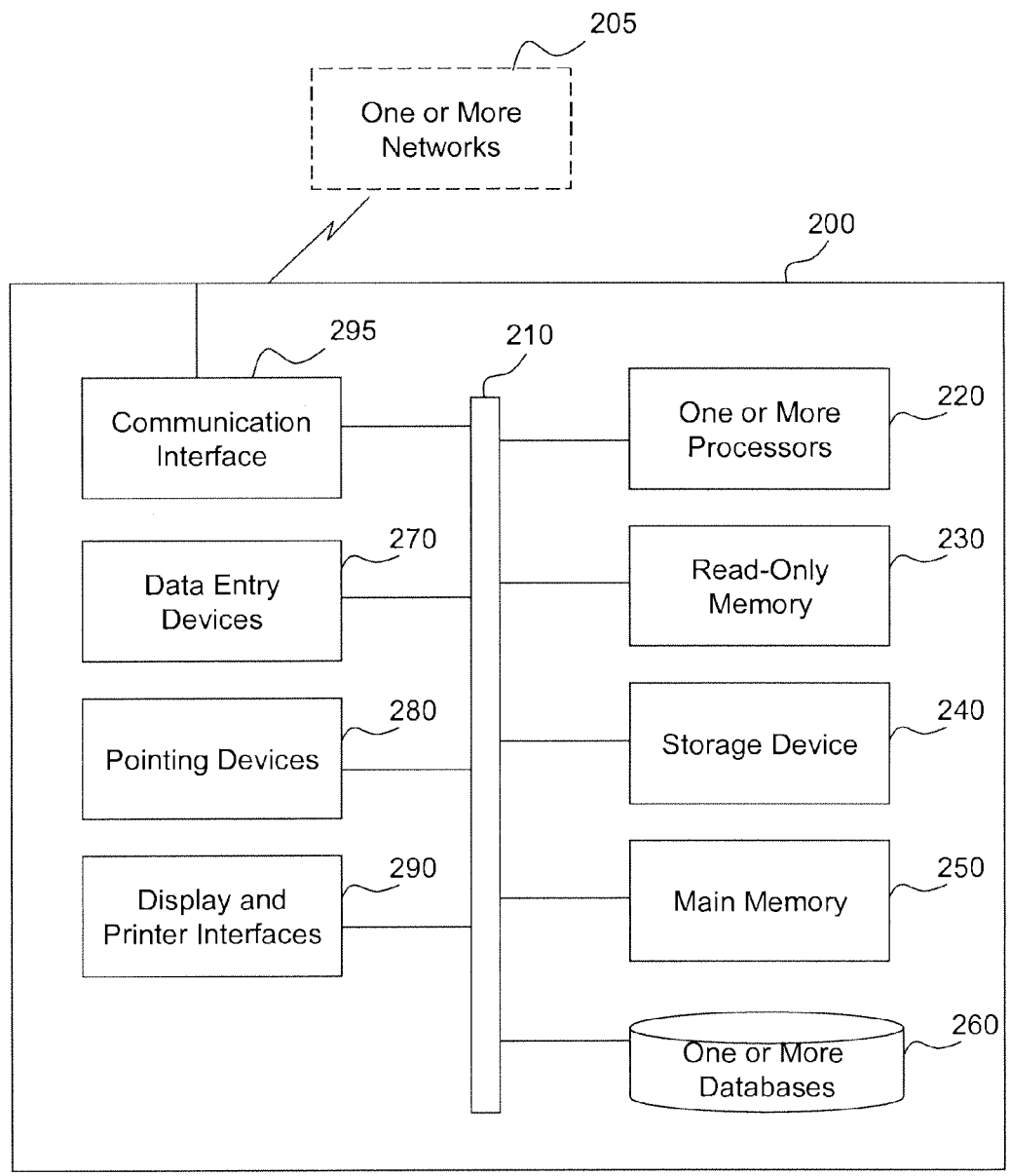
FIG. 2 is a schematic block diagram of an electronic system for implementing one or more of the embodiments.

FIG. 2 is a block diagram showing an embodiment of a management system 100 of FIG. 1, generally designated by reference number 200 in FIG. 2, according to an exemplary embodiment of the present invention. In one embodiment, the management system 200 according to the present invention may be communicatively coupled to one or more networks 205 via a communication interface 295. The one or more networks 205 may represent a generic network, which may correspond to a local area network (LAN), a wireless LAN, an Ethernet LAN, a token ring LAN, a wide area network (WAN), the Internet, a proprietary network, an intranet, a telephone network, a wireless network, and/or cloud computing networks, to name a few, and any combination thereof. Depending on the nature of the network employed for a particular application, the communication interface 295 may be implemented accordingly. The network 205 serves the purpose of delivering information between connected parties.

In one embodiment, the network 205 may comprise the Internet. The system 200 may communicate purchase data, tranche allocation data, and depository entity records to interested or authorized parties. The management system 200 may also or alternatively be communicatively coupled to a network 205 comprising a closed network (e.g., an intranet). The communication may comprise tranche allocation data and time deposit instrument purchases and purchases of other financial products and depository institution records to a limited number of receivers, potentially with an enhanced level of security. The management system 200 may be configured to communicate, via the one or more networks 205, with respective computer systems of the one or more source institutions, the depository institutions 130-140, and to the one or more control operating accounts in a depository institution or in an intermediary bank 110. By way of example, such communication may be used to manage the purchase of the time deposit instruments held at each depository institution and the movement of funds.

The management system 200 may comprise, in some embodiments, a computing platform for performing, controlling, and/or initiating computer-implemented operations, for example, via a server and the one or more networks 205. The computer platform may comprise system computers, as well as third party computers networked thereto. An exemplary management system 200 may operate under the control of computer-executable instructions to carry out the process steps described herein. Computer-executable instructions comprise, for example, instructions and data which cause, when executed, a general or special purpose computer system or processing device to perform a certain function or group of functions. Computer software for the management system 200 may comprise, in an embodiment, a set of software objects and/or program elements comprising computer-executable instructions collectively having the ability to execute a thread or logical chain of process steps in a single processor, or independently in a plurality of processors that may be distributed, while permitting a flow of data inputs/outputs between components and systems.

The management system 200 may include, one or more personal computers, workstations, notebook computers, servers, mobile computing devices, handheld devices, multi-processor systems, networked personal computers, minicomputers, mainframe computers, personal data assistants, tablets, Internet appliances (e.g., a computer with minimal memory, disk storage and processing power designed to connect to a network, especially the Internet, etc.), or controllers, to name a few.

The management system 200 may comprise, in one embodiment, a bus 210 or other communication component that couples various system elements 220-295, and is configured to communicate information between the various system elements 220-295.

As shown in FIG. 2, one or more computer processors 220 may be coupled with the bus 210 and may be configured to process and handle information and execute instructions. The management system 200 may include a main memory 250, such as a Random Access Memory (RAM) or other dynamic storage device, coupled to the bus 200, for storing information and instructions to be executed by the one or more processors 220. The main memory 250 also may be used for storing temporary variables or other intermediate information during execution of instructions by the one or more processors 220.

The management system 200 further may include a Read-Only Memory (ROM) 230 or other static storage device (e.g., EPROM, EAROM, EEPROM, PROM, flash, and the like) coupled to the bus 210 for storing static information and instructions for the one or more processors 220. Furthermore, a storage device 240, such as a magnetic disk or optical disk, such as a CD-ROM or other optical media, may be provided and coupled to the bus 210 for storing information and instructions.

In addition to the ROM 230, one or more databases 260 may be coupled to the bus 210 for storing static information and software instructions. Information stored in or maintained in the databases 260 may be provided in conformance with a database management system format such as, but not limited to, the Structured Query Language (SQL) format. Database query and access instructions, for example, in the form of one or more scripts, may be used which, when executed by a processor such as the processor 220, serve to access, store and retrieve data maintained in the database 260 according to the instructions contained in the script.

Furthermore, the management system 200 may comprise application software instructions which may implement a human-machine user interface portion for generating interactive electronic pages or display screens by which a user may provide data to and receive information from the management system 200 and the database 260. Interactive electronic pages may include user dialog boxes for accepting user entered information. In particular, the human-machine interface may comprise a Graphical User Interface (GUI) portion for prompting the user to enter data by providing an interactive dialog box or message box instructing the user to enter particular data, or to select from among a multitude of options provided using pull-down menus. A user may interact with the management system 200 via the graphical user interface by using a pointing device and/or data entry device. The GUI portion may place the output of the management system 200 in a format for presentation to a user via the display. In at least one embodiment, the GUI may be implemented as a sequence of Java instructions.

A data entry device 270, including alphanumeric and other keys, or a pointing device such as a mouse or trackball, or a scanner, to name a few, may be coupled to the bus 210 for communicating information and command selections to the processor 220. The data entry device 270 may be coupled to the bus 210 via an interface (not shown), wherein the interface may be, for example, a serial port, an RS-232 port, or the like.

In addition, the interface may be a wireless interface and provide connection-less communication via, for example, Bluetooth communication.

The management system 200 may be coupled via the bus 210 to a display or printer 290 for outputting information to a computer user. In addition, a user may use the display (e.g., touch screen) or a scanner to provide information to the management system 200.

According to at least one embodiment of the present invention, the various program operations as described herein may be provided by the management system 200 by the one or more processors 220 executing one or more sequences of computer-readable instructions contained in the main memory 250. Such instructions may be read into the main memory 250 from another computer-readable medium, such as the ROM 230, the storage device 240, or the database 260. Execution of the sequences of instructions contained in the main memory 250 may cause the one or more processors 220 to perform the process steps described herein. It should be appreciated that an embodiment of the management system 200 may perform fewer or additional processes as compared to those described herein. As noted, the one or more processors 220 may be arranged in a multi-processing arrangement. Alternatively, hard-wired circuitry may be used in place of or in combination with software instructions to implement the invention. Thus, embodiments of the invention are not limited to any specific combination of hardware circuitry and software.

The term "computer-readable medium" or "computer-readable storage medium," as used herein refers to any medium that is computer-readable and participates in providing instructions to the processor 220 for execution. Such a medium may be removable or non-removable and may take many forms, including, but not limited to, non-volatile media and volatile media. Non-volatile media include, for example, optical or magnetic disks, such as the storage device 240. Volatile media include dynamic memory, such as the main memory 250. Common forms of computer-readable media include, for example, floppy disk, a flexible disk, hard disk, magnetic tape, any other magnetic medium, a Compact Disc Read Only Memory (CD-ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, or any other medium from which a computer can read computer instructions. Combinations of the above are also included within the scope of machine-readable media. Machine-executable instructions comprise, for example, instructions and data which cause, when executed, a general purpose computer, special purpose computer, or a special purpose processing machine to perform a certain function or group of functions. It should be appreciated that the one or more databases 260, the main memory 250, the storage device 240, and the ROM 230 may, in some embodiments, be described as a "computer-readable medium" or a "computer-readable storage medium."

As previously noted, the management system 200 also comprises a communication interface 295 coupled to the bus 210 for providing one-way, two-way or multi-way data communication with the network 205, or directly with other devices. In one embodiment, the communication interface 295 may comprise a modem, a transceiver Integrated Services Digital Network (ISDN) card, a WAN card, an Ethernet interface, or the like, to provide a data communication connection to a corresponding type of communication medium. As another example, the communication interface 295 may comprise a LAN card to provide a data communication connection to a compatible LAN. Wireless links may also be implemented. In such wireless links, communication interface 295 may communicate with a base station communicatively coupled to a network server. In any such implementation, the communication interface 295 sends and receives electrical, electromagnetic, radio, infrared, laser, or optical signals that carry digital data streams representing various types of information. Any combination of the above interfaces may also be implemented.

In one embodiment, the communication interface 295 may be communicatively coupled to a web server configured to generate and output web content that is suitable for display using a web browser at a computing device. In an embodiment, the server may generate and transmit requested information through the communication interface 295 to a requesting terminal via Hypertext Transfer Markup Language (HTML) formatted pages, eXtensible Markup Language (XML) formatted pages, or the like, which may be provided as World Wide Web pages that may enable navigation by hyperlinks. The server program may be used to receive commands and data from the clients' terminals and source institution terminals, and depository institution terminals, access and process data from various sources, and output computer-executable instructions and data using the network 205. For example, code and data may be communicated to the computers of clients, source institution, and the depository institutions. One such downloaded application may, for example, provide data for client available distribution distributions as tranches, and may provide reporting, or message generation, as described herein.

The web server, in one embodiment, may correspond to a secure web application server operating behind a web server program that a service provider employs to run one or more web based application programs to carry out the methods described above in a secure fashion. Such a secure web application server may be configured to execute one or more web based application programs, respond to commands and data received from the clients (via a web page supported by the web server), and provide data and results to the clients. The web server and the web application server may be implemented using a single computing platform. Alternatively, it may be implemented using multiple separate and distributed computing platforms.

Figure 6:
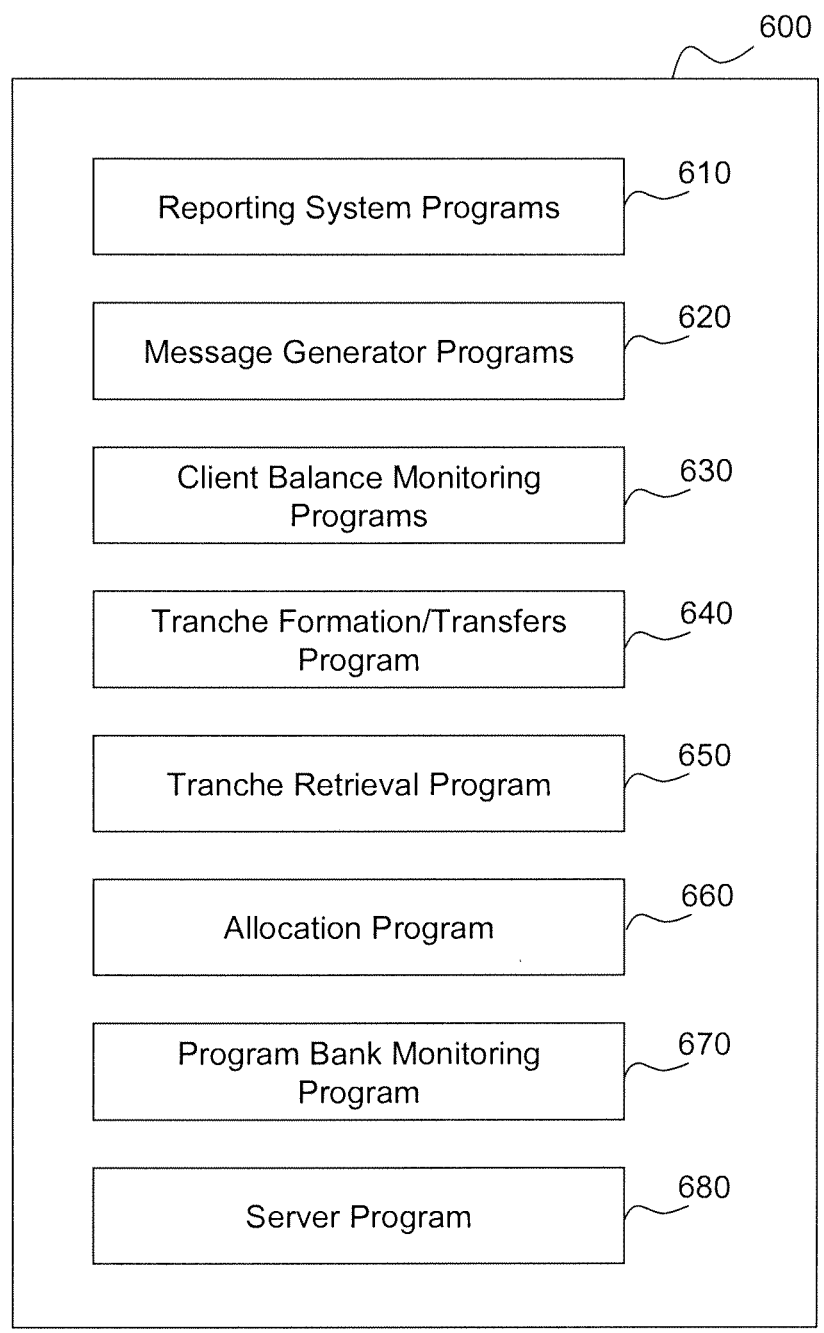
FIG. 6 is a schematic block diagram of an embodiment of a memory configuration that may be used to implement the present invention.

FIG. 6 is a block diagram showing portions of at least one embodiment of a memory configuration 600 storing programs used in the present system. This memory configuration may be applicable to the one or more databases 260, the main memory 250, the storage device 240, and/or the ROM 230, or a combination thereof. The memory configuration may comprise one memory, or distributed memories. In one embodiment, the memory configuration may comprise a reporting program 610 for generating reports on various aspects of the system operation, including allocation activity that identifies each of the depository institutions holding client tranches, and how much insurance is obtained from each of these identified depository institutions for the client's funds held in financial instruments therein. These reports could then be electronically transmitted or otherwise sent to the depository entities, clients, and the depository institutions. The memory configuration may further comprise a message generator program 620 for generating messages and instructions to the various depository institutions and other depository entities to initiate the movement of funds. The memory configuration may further comprise a total client balance monitoring program 630 for monitoring a balance of a client held in the system. The memory configuration may further comprise a tranche formation/transfer program 640 for processing tranche formation and transfer for the clients. The memory configuration may further comprise a tranche retrieval program 650, for processing retrieval instructions for funds, for example, for a time deposit instrument with a term that has expired, or for processing a withdrawal from a time deposit instrument, when it has been facilitated through a reallocation or facilitated through a withdrawal from other depository instruments. The memory configuration may further comprise an allocation program 660 for allocating tranches to the various depository institutions as described herein. The memory configuration may further comprise a depository institution monitoring program 670, for monitoring program depository institution caps and other parameters. In one embodiment, the memory configuration may comprise a server program 680. In another embodiment, the server program is external to the system, and/or may be operated by a third party.

These respective application programs comprise a sequence of programmed instructions which, upon execution, are operable to configure the management system 200 (shown in FIG. 2) to carry out the respective program operations described herein. The application programs may also include sequences of database access instructions, or scripts to effect storage and retrieval of data using the database 250.

As noted above, embodiments of the present invention may be practiced in a networked environment using logical connections to one or more remote computers having processors. Logical connections may include a local area network (LAN) and a wide area network (WAN) that are presented here by way of example and not limitation. Such networked environments are in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Embodiments of the invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention may be accomplished with programming techniques with rule based logic and other logic to accomplish the various database searching steps, correlation steps, comparison steps and decision steps. It should also be noted that the word "component" as used herein and in the claims, is intended to encompass implementations using one or more lines of software code, and/or hardware implementations. Additionally, it is understood that the claim term "a plurality" means more than one, and is not restricted to any particular previous reference to "a plurality," unless so indicated. Note that the term "based on" is to take its ordinary meaning as open-ended, and does not preclude other factors from being taken into consideration.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

We claim:

1. A method, comprising:
  A. accessing, using one or more computers, one or more electronic databases, stored on one or more computer-readable media, comprising:
    (1) client information for each of a plurality of respective clients, i, comprising information on client funds held through a program in each of a plurality of depository institutions participating in the program, with information for a respective client comprising:
      (i) a balance of funds of the client held through the program in each of multiple of the depository institutions holding funds of the respective client;
      (ii) a distribution percent value, $X_i$, of a given client deposit amount to be distributed in tranches to each of $N_i$ depository institutions; and
    (2) information for each of multiple government backed-insured aggregated time deposit instruments holding a tranche of client funds, comprising:
      (i) a rate for the respective aggregated time deposit instrument;
      (ii) an identification of the depository institution holding the respective aggregated time deposit instrument; and
      (iii) a term of the respective aggregated time deposit instrument holding funds of the respective client, and
  B. performing the following steps for one or more of the clients:
    (1) receiving, via the Internet and using the one or more computers, from one of the clients at least one client available distribution amount, $D_i$,
    (2) determining, using the one or more computers, an amount of a client tranche to be deposited in each of the $N_i$ depository institutions based at least in part on the percentage, $X_i$, and a value of the $N_i$ depository institutions for the respective client obtained from the one or more electronic databases, and the respective client available distribution amount, $D_i$, in order that the client tranches are approximately equal and the funds are insured with government-backed insurance;

(3) allocating substantially equally, using the one or more computers, respective client tranches to the $N_i$ depository institutions determined for the client, i;

(4) generating, using the one or more computers, data for instructions to transfer the respective client tranches and to purchase one or more financial instruments in each of the respective $N_i$ depository institutions, comprising a purchase of one or more aggregated time deposit instruments at multiple of the respective $N_i$ depository institutions; and (5) updating, using the one or more computers, one or more of the electronic databases with update data for each of multiple of the clients, i, with the update data for each of the multiple clients, i, comprising data for respective client tranches transferred to purchase the one or more aggregated time depository instruments at the respective $N_i$ depository institutions for the client.

2. The method as defined in claim 1, wherein the aggregated time deposit instruments holding the tranches may comprise one or more selected from the group of bonds, treasury bills, and certificates of deposit.

3. The method as defined in claim 1, wherein the generating instructions step comprises generating an instruction to transfer at least one of the respective client tranches for purchase for the client at one or more of the Ni depository institutions of a different type of depository instrument relative to the time deposit instrument, where one or more withdrawals can be made without penalty.

4. The method as defined in claim 3, further comprising:
receiving a request to withdraw an amount of funds for a given one of the clients; and
generating, by one or more computers, data for an instruction based at least in part on the amount of the request to withdraw, with the amount to be taken from one or more of the different type of depository instrument.

5. The method as defined in claim 4, wherein the different type of depository instrument is an interest-bearing aggregated deposit account holding funds of a plurality of the clients.

6. The method as defined in claim 3, wherein the different type of depository instrument is an aggregated money market deposit account that is insured by the Federal Deposit Insurance Corporation.

7. The method as defined in claim 1, further comprising:
aggregating, using the one or more computers, the respective client tranches of multiple of the different clients into a plurality of respective purchase amounts to purchase respective aggregated time deposit instrument from multiple of the depository institutions; and
generating data for instructions to transfer the respective purchase amounts to the respective depository institutions.

8. The method as defined in claim 7, further comprising:
selecting respective client tranches of multiple of the respective clients for aggregation into the respective purchase amounts for purchase of the aggregated time deposit instruments from multiple of the depository institutions based, at least in part, on one or more criteria.

9. The method as defined in claim 8, wherein one criterion is that only client tranches from client available distribution amounts, $D_i$, above a threshold amount, are aggregated into the respective purchase amounts for purchase of the aggregated time deposit instruments from the multiple depository institutions.

10. The method as defined in claim 8, wherein one criterion is that only client tranches from client available distribution amounts, $D_i$, associated in the one or more databases with a particular source institution are aggregated into the respective purchase amounts for purchase of the aggregated time deposit instruments from the multiple depository institutions.

11. The method as defined in claim 8, wherein one criterion is a term requested by the client for the client available deposit amount, $D_i$, meets at least one predetermined criterion.

12. The method as defined in claim 1, further comprising:
purchasing the aggregated time deposit instrument electronically using the one or more computers and via one or more electronic networks.

13. The method as defined in claim 1, further comprising:
receiving an order from a respective one of the depository institutions that is a source institution to distribute one or more client available distribution amounts, $D_i$ of funds of clients of the respective source depository institution, for the purchase of a plurality of aggregated time deposit instruments;
wherein the one or more databases further comprise information designating a source depository institution for each of multiple of the respective client available distribution amounts, $D_i$; and
wherein the allocating step further comprises:
selecting, using the one or more computers, at least one of the depository institutions participating in the program for purchase of one or more aggregated time deposit instruments based, at least in part, on whether or not one or more orders have been received from the respective at least one depository institution to distribute one or more client available distribution amounts, $D_i$, of clients of that respective one depository institution for the purchase of a plurality of aggregated financial instruments at other of the depository institutions participating in the program.

14. The method as defined in claim 13, wherein the selecting of the at least one depository institution for the purchase of one or more aggregated time deposit instruments is further based, at least in part, on whether a total of the one or more client available distribution amounts, Di, of funds received from the respective at least one depository institution and distributed to other depository institutions in the program, is more than an amount that the respective at least one depository institution has received in client tranches associated with other source institutions participating in the program.

15. The method as defined in claim 1, further comprising:
selecting, using the one or more computers, multiple of the depository institutions in the program for the purchase of one or more aggregated time deposit instruments based, at least in part, on how close a rate and term of an aggregated time deposit instrument available from the respective one depository institution matches a rate promised to the respective client, i;
aggregating, using the one or more computers, the respective client tranches of multiple of the different clients into a plurality of respective purchase amounts to purchase respective aggregated time deposit instruments from the multiple respective selected depository institutions; and
generating data for instructions to transfer the respective purchase amounts to the respective selected depository institutions.

16. The method as defined in claim 1, further comprising:
selecting, using the one or more computers, at least one of the depository institutions for the purchase of one or more time deposit instruments based, at least in part, on a stability grade rating for the respective at least one depository institution.

17. The method as defined in claim 1,
wherein the one or more databases further comprise data on a source institution for each of a plurality of the client available distribution amounts, $D_i$; and further comprising:
selecting, using the one or more computers, one or more of the depository institutions for the purchase of one or more aggregated time deposit instruments based, at least in part, on whether the respective depository institution is affiliated with the source institution for one or more of the client available distribution amounts, $D_i$ to be used to purchase the one or more aggregated time deposit instruments;
aggregating, using the one or more computers, the respective client tranches of multiple of the different clients into a plurality of respective purchase amounts to purchase respective aggregated time deposit instruments from the multiple respective selected depository institutions; and
generating data, using the one or more computers, for instructions to transfer the respective purchase amounts to the respective selected depository institutions.

18. The method as defined in claim 1, further comprising:
determining, using the one or more computers, a fee for facilitating purchases of time deposit instruments and other depository instruments based on one or more criteria.

19. The method as defined in claim 18, wherein the fee is determined by comparing the client available distribution amount, Di, to thresholds set forth in a tier table.

20. The method as defined in claim 1, wherein the government backed insurance is Federal Deposit Insurance Corporation (FDIC) insurance.

21. The method as defined in claim 1, further comprising:
determining client eligibility for having a given client available distribution amount, $D_i$, distributed in tranches among $N_i$ depository institutions, based on one or more criteria;
aggregating, using the one or more computers, the respective client tranches of multiple of the different clients that are determined to be eligible, to form a plurality of respective purchase amounts to purchase respective aggregated time deposit instruments from the multiple respective selected depository institutions; and
generating data for instructions to transfer the respective purchase amounts to the respective selected depository institutions.

22. The method as defined in claim 21, wherein the one or more criteria comprises whether the client available distribution amount, Di, for a given client equals or exceeds a threshold amount.

23. The method as defined in claim 21, wherein the one or more criteria comprises a relationship level with one of the depository institutions.

24. The method as defined in claim 1, further comprising:
allocating, using the one or more computers, a remainder amount, $R_i$ of the given client available distribution amount, $D_i$, for the respective client, that occurs when the client percentage ($X_i$) times the number of depository institutions ($N_i$) determined for the client is less than 100, to one or more of the depository institutions; and generating, using the one or more computers, data for instructions to transfer the remainder amount, R, to purchase one or more financial instruments.

25. The method as defined in claim 24, wherein the instructions to purchase one or more financial instruments with the remainder amount, Ri comprise instructions to purchase at least one non-time deposit financial instrument.

26. The method as defined in claim 1, wherein the percentage, Xi, for a respective client is received by a communication from or on behalf of the respective client.

27. The method as defined in claim 1, further comprising:
reallocating funds of a first client from a respective time deposit instrument to a non-time deposit financial instrument, and allocating funds of a second client to the respective time deposit instrument in place thereof; and
withdrawing an amount of the funds of the first client from the non-time deposit financial instrument.

28. The method as defined in claim 1, wherein the percentage, Xi, for each of multiple of the clients is different.

29. A system, comprising:
one or more computers comprising memory wherein the memory stores computer-readable instructions comprising program code that, when executed, cause the one or more computers to perform the steps:
A. accessing, using the one or more computers, one or more electronic databases, stored on one or more computer-readable media, comprising:
(1) client information for each of a plurality of respective clients, i, comprising information on client funds held through a program in each of a plurality of depository institutions participating in the program, with information for a respective client comprising:
(i) a balance of funds of the client held through the program in each of multiple of the depository institutions holding funds of the respective client;
(ii) a distribution percent value, $X_i$, of a given client deposit amount to be distributed in tranches to each of $N_i$ depository institutions; and
(2) information for each of multiple government backed-insured aggregated time deposit instruments holding a tranche of client funds, comprising:
(i) a rate for the respective aggregated time deposit instrument;
(ii) an identification of the depository institution holding the respective aggregated time deposit instrument; and
(iii) a term of the respective aggregated time deposit instrument holding funds of the respective client, and
B. performing the following steps for one or more of the clients:
(1) receiving, via the Internet and using the one or more computers, from one of the clients at least one client available distribution amount, $D_i$,
(2) determining, using the one or more computers, an amount of a client tranche to be deposited in each of the $N_i$ depository institutions based at least in part on the percentage, $X_i$, and a value of the $N_i$ depository institutions for the respective client obtained from the one or more electronic databases, and the respective client available distribution amount, $D_i$, in order that the client tranches are approximately equal and the funds are insured with government-backed insurance;

(3) allocating substantially equally, using the one or more computers, respective client tranches to the $N_i$ depository institutions determined for the client, i;
(4) generating, using the one or more computers, data for instructions to transfer the respective client tranches and to purchase one or more financial instruments in each of the respective $N_i$ depository institutions, comprising a purchase of one or more aggregated time deposit instruments at multiple of the respective $N_i$ depository institutions; and
(5) updating, using the one or more computers, one or more of the electronic databases with update data for each of multiple of the clients, i, with the update data for each of the multiple clients, i, comprising data for respective client tranches transferred to purchase the one or more aggregated time depository instruments at the respective $N_i$ depository institutions for the client.

30. The system as defined in claim 28, wherein the percentage, $X_i$, for each of multiple of the clients is different.

* * * * *